United States Patent [19]

Sekizawa et al.

[11] Patent Number: 5,028,991
[45] Date of Patent: Jul. 2, 1991

[54] IMAGE SIGNAL PROCESSING APPARATUS FOR USE IN COLOR IMAGE REPRODUCTION

[75] Inventors: Hidekazu Sekizawa, Yokohama; Akito Iwamoto, Kamakura; Shuzo Hirahara, Yokohama; Naofumi Yamamoto, Kawasaki; Tutomu Saito, Yokohama; Kazuhiko Higuchi, Kawasaki; Yuzo Koike, Tokyo, all of Japan

[73] Assignee: Kabushiki Kaisha Toshiba, Kawasaki, Japan

[21] Appl. No.: 400,925

[22] Filed: Aug. 30, 1989

[30] Foreign Application Priority Data

Aug. 30, 1988 [JP] Japan .................. 63-213698

[51] Int. Cl.$^5$ .............................................. G03F 3/08
[52] U.S. Cl. ...................................... 358/75; 358/80; 358/77; 355/38
[58] Field of Search ................. 358/80, 75, 77, 457, 358/443, 447; 355/38

[56] References Cited

U.S. PATENT DOCUMENTS

| | | | |
|---|---|---|---|
| 4,538,182 | 8/1985 | Saito et al. | 358/80 |
| 4,631,578 | 12/1986 | Saraki et al. | 358/80 |
| 4,698,669 | 10/1987 | Sekizawa et al. | 358/80 X |
| 4,700,236 | 10/1988 | Abe | 358/80 X |
| 4,723,173 | 2/1988 | Tanioka | 358/283 |
| 4,727,430 | 2/1988 | Miwa | 358/80 X |
| 4,734,762 | 3/1988 | Aoki et al. | 358/80 |
| 4,745,467 | 5/1988 | Sekizawa et al. | 358/80 |
| 4,782,398 | 11/1988 | Mita | 358/283 X |
| 4,786,976 | 11/1988 | Takao et al. | 382/53 X |
| 4,792,847 | 12/1988 | Shimazaki et al. | 358/80 |
| 4,821,334 | 4/1989 | Ogino et al. | 382/50 |
| 4,929,979 | 5/1990 | Kimoto et al. | 358/80 |
| 4,931,864 | 6/1990 | Kawamura et al. | 358/80 |

FOREIGN PATENT DOCUMENTS 57-185767 11/1982 Japan .
63-10882 1/1988 Japan .

OTHER PUBLICATIONS

J. F. Jarvis, *Computer Graphics and Image Processing*, May, 1977, vol. 6, No. 5 pp. 452–484.

Primary Examiner—Howard W. Britton
Assistant Examiner—Michael H. Lee
Attorney, Agent, or Firm—Oblon, Spivak, McClelland, Maier & Neustadt

[57] ABSTRACT

A color multi-function type copying machine is disclosed which includes an image input unit for optically sensing an input image and generating an image signal. A function memory stores an ink color used in a color frame to be written in the input image in order to designate its partial image region and a specific image edit function assigned to the ink color and desired to be executed by an operator so that the ink color and the specific image edit function can be rewritten. When a closed loop-like color frame of a selected color is written in the input image, a color frame region detecting unit detects a shape and a color of the color frame. In response to the detection result, the memory is accessed to determine an image edit function corresponding to a first selected ink color of the detected color frame. A color edit unit executes one or a plurality of image signal processing corresponding to the determined image edit function for the input image signal. The edited image signal is supplied to a color printing unit via a signal processing unit and is reproduced therein.

15 Claims, 39 Drawing Sheets

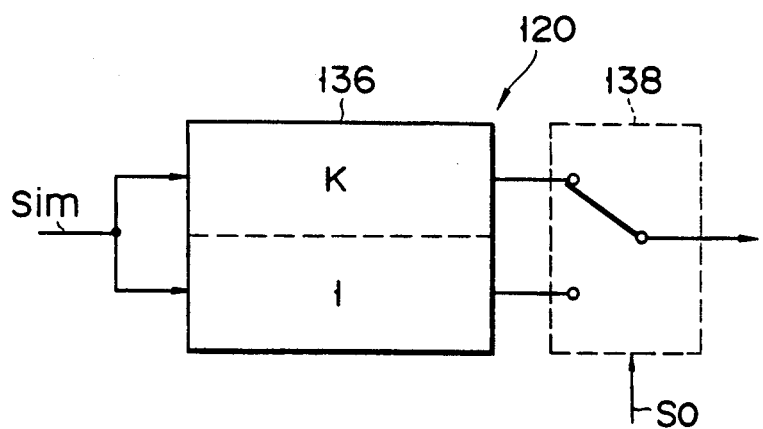
F I G. 7A
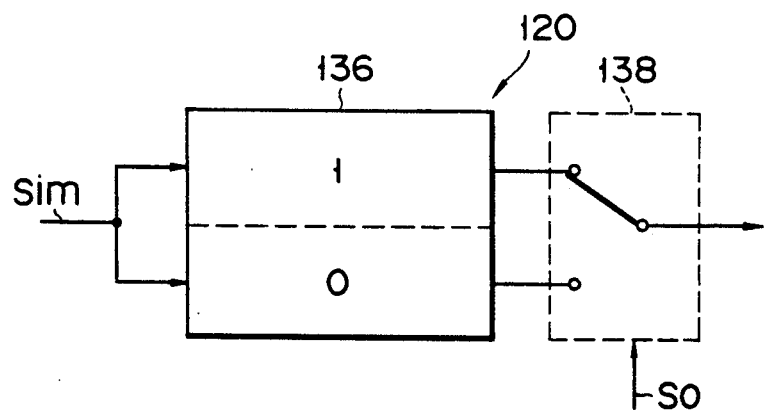
F I G. 7B

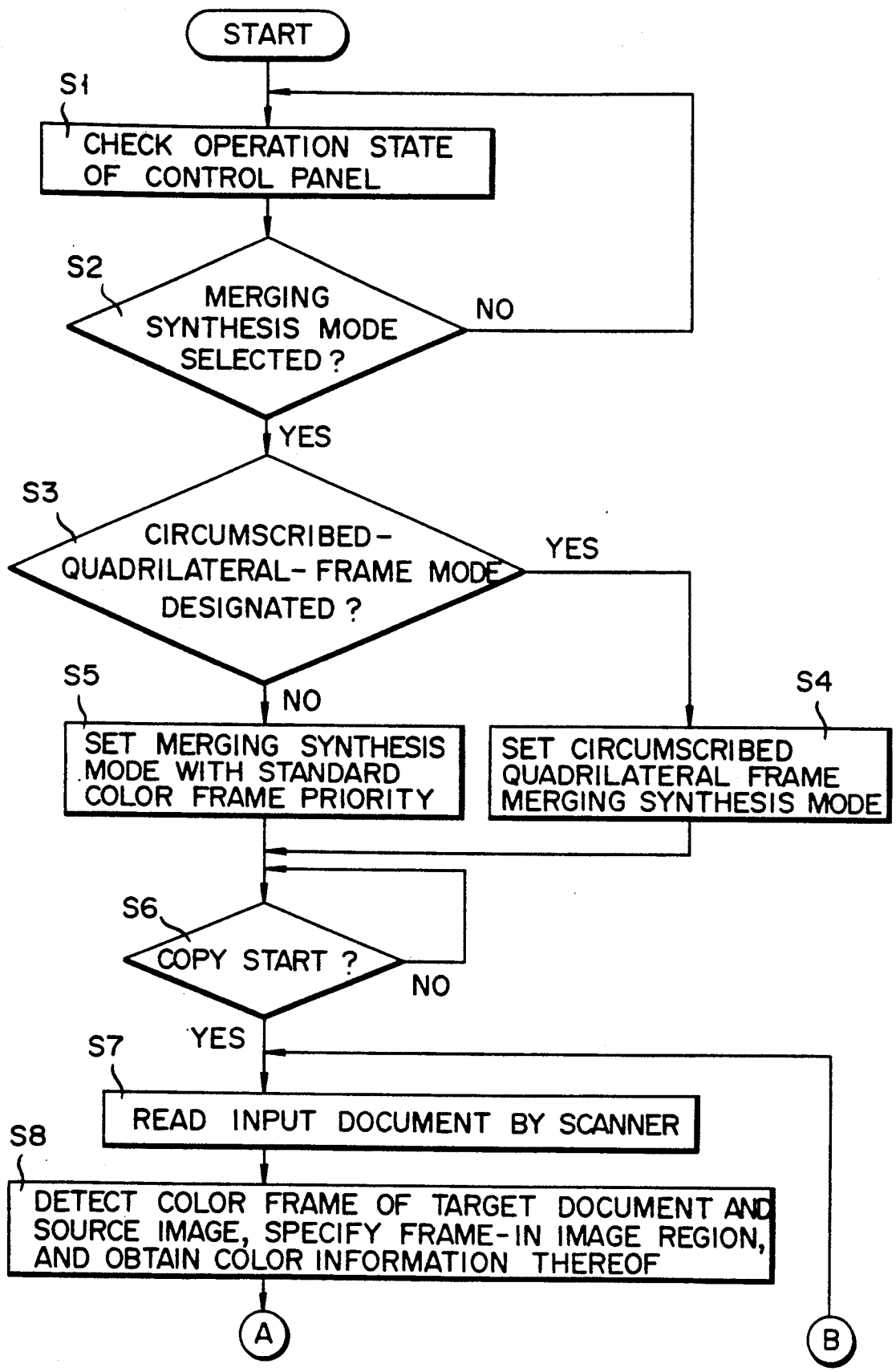
F I G. 13A

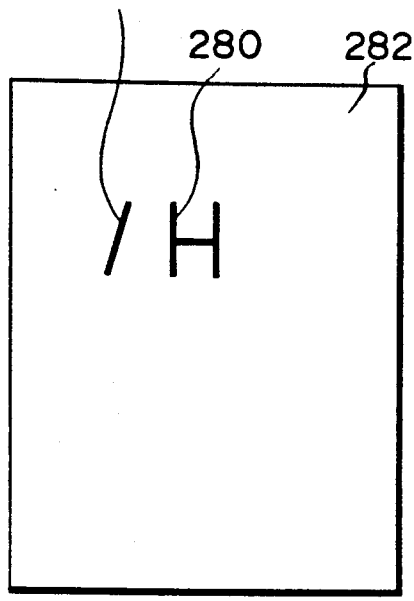
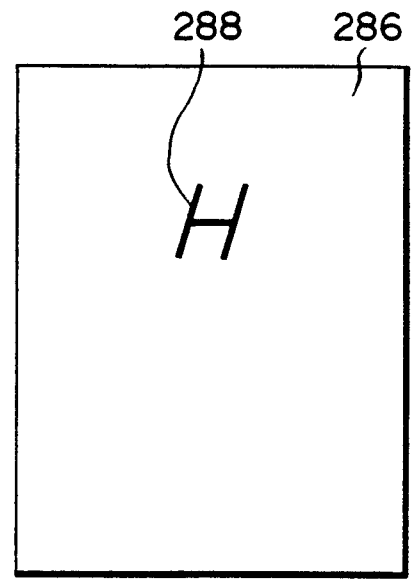
F I G. 15A     F I G. 15B
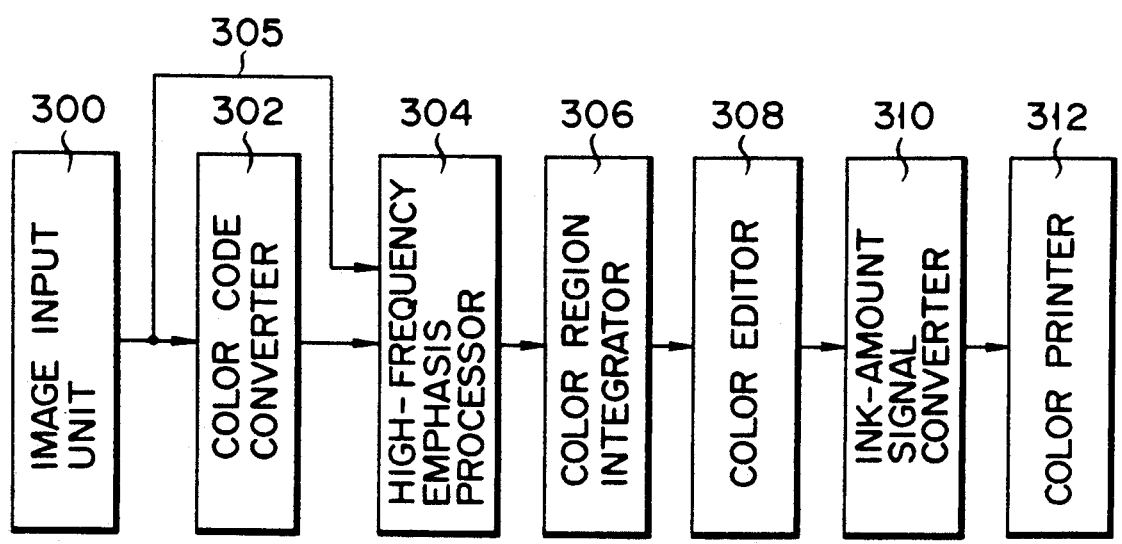
F I G. 16

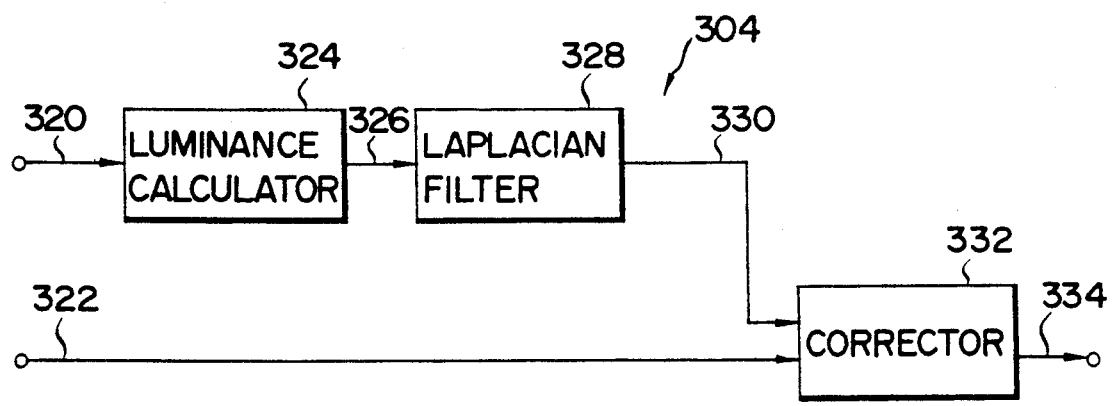
F I G. 18
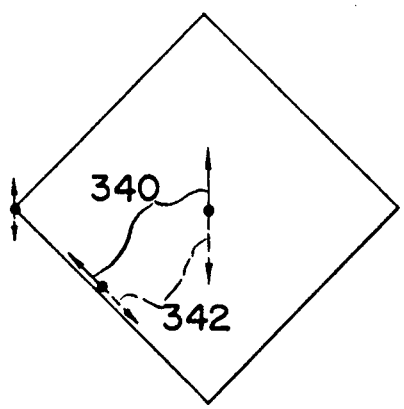
F I G. 19

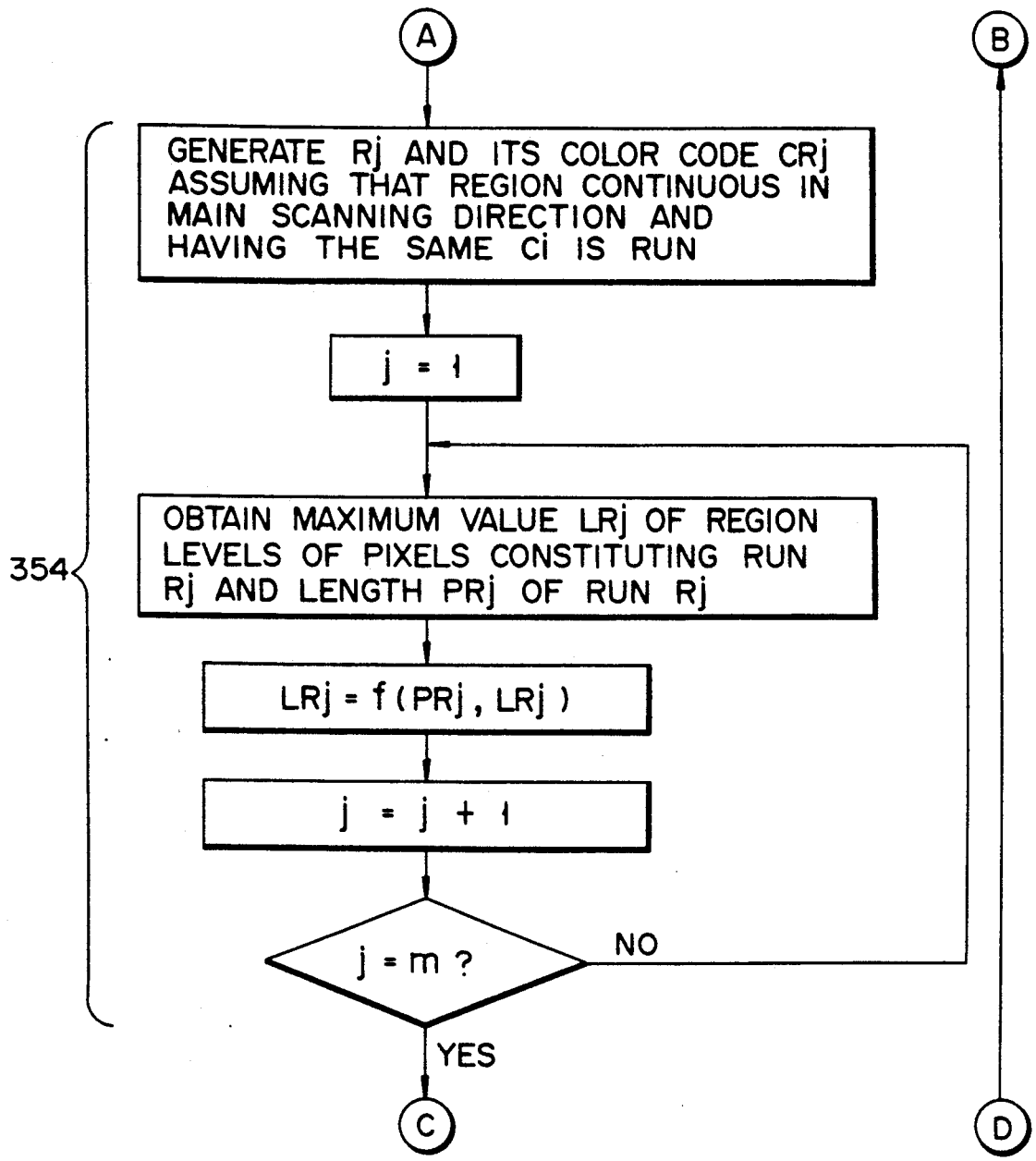
F I G. 20B

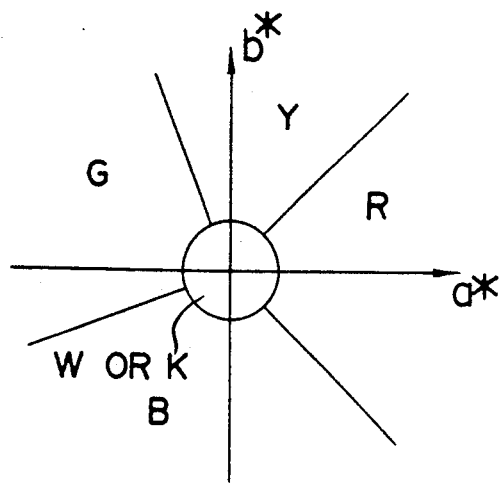
F I G. 25A
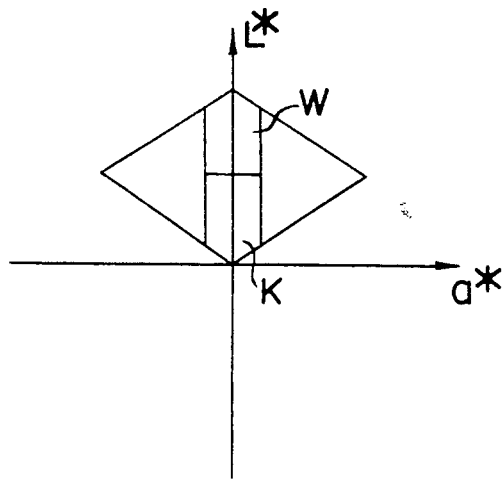
F I G. 25B
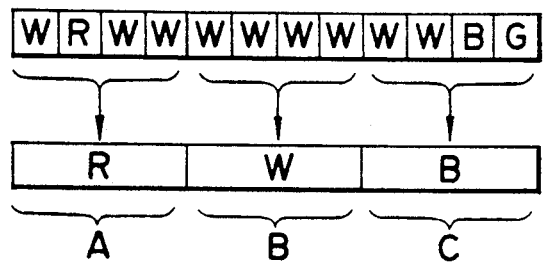
F I G. 26

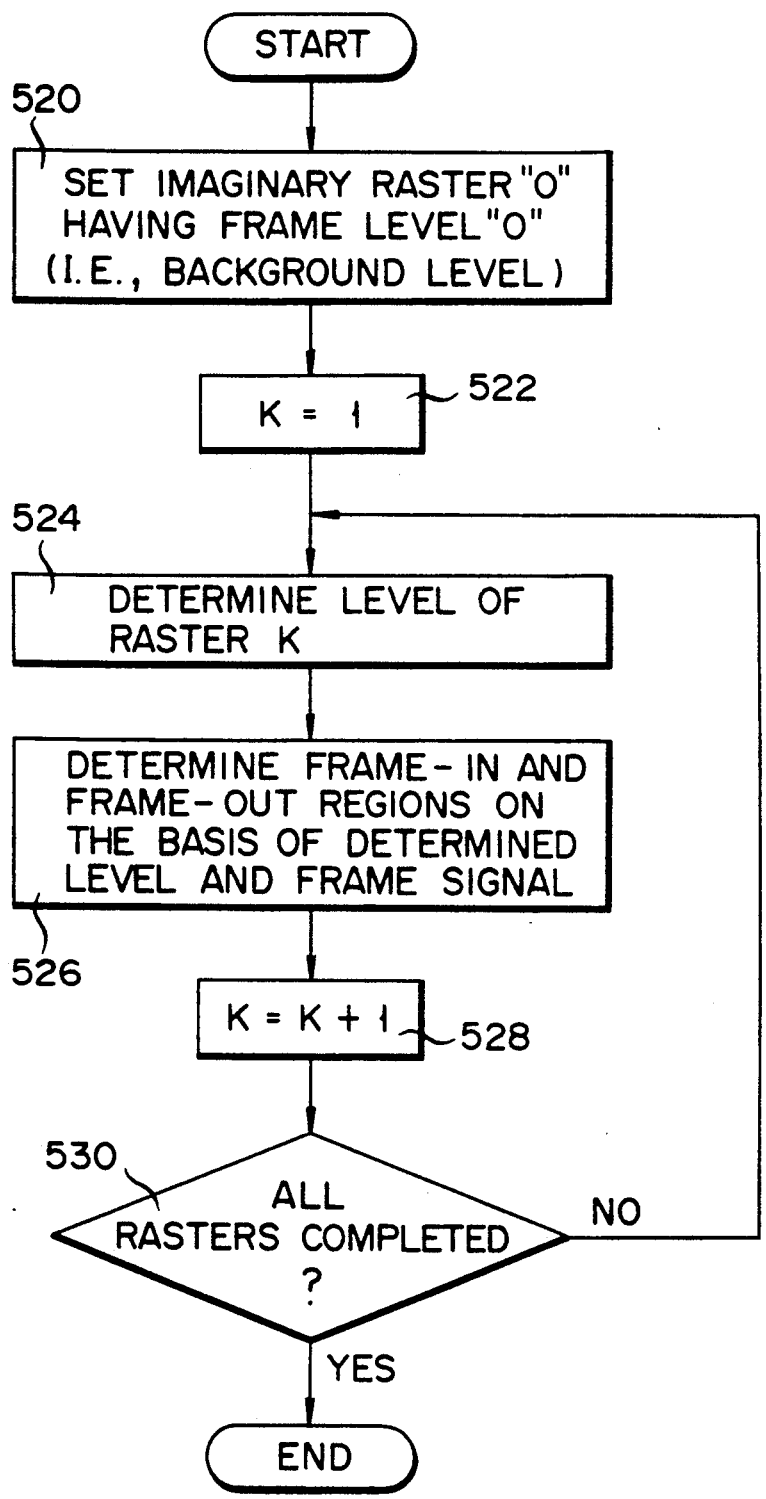
F I G. 27A

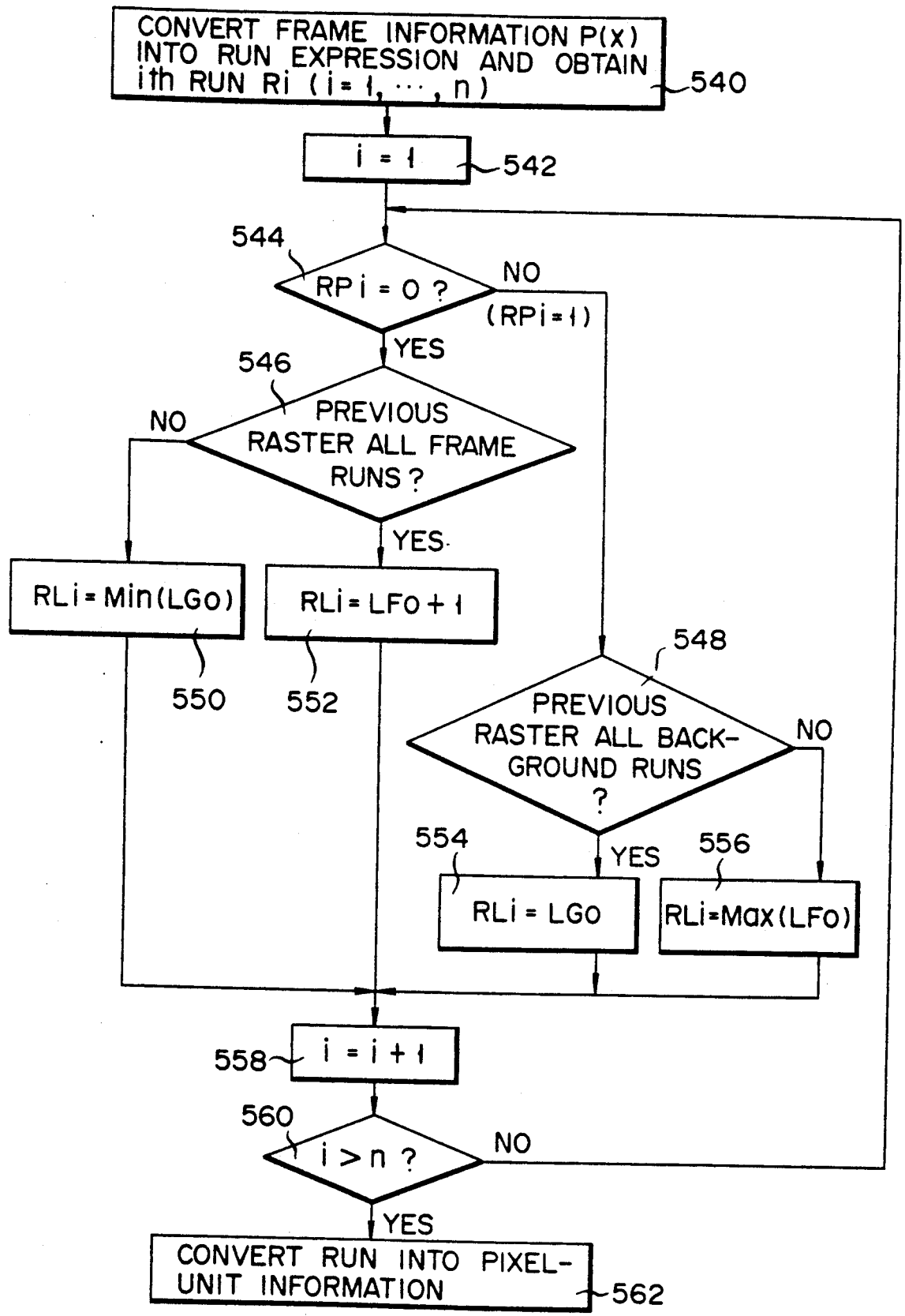
F I G. 27B

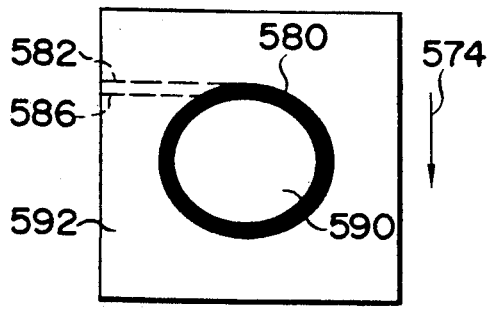
F I G. 31A
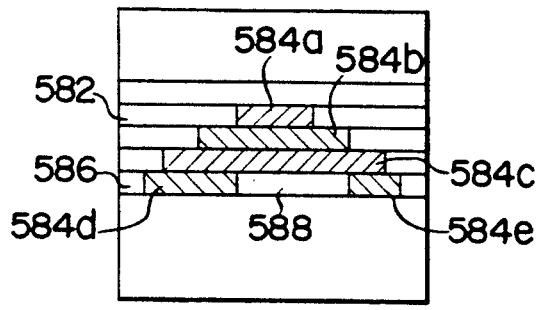
F I G. 31B
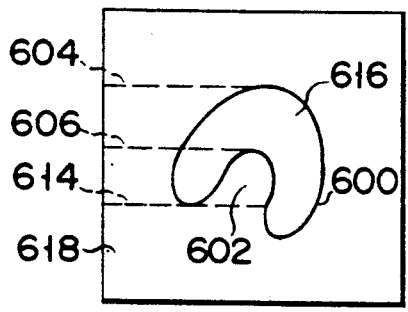
F I G. 32A
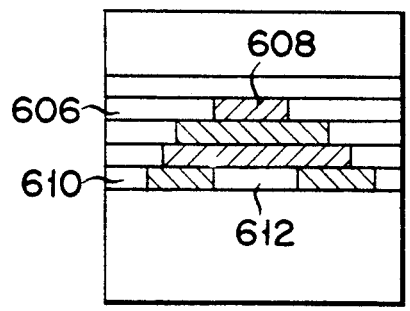
F I G. 32B
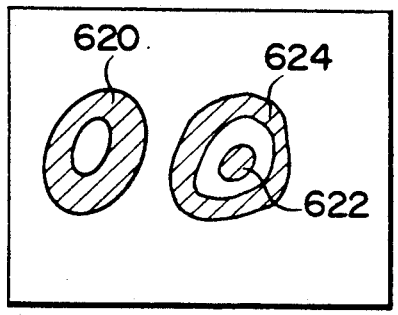
F I G. 33
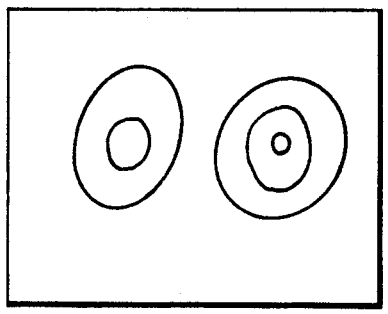
F I G. 34

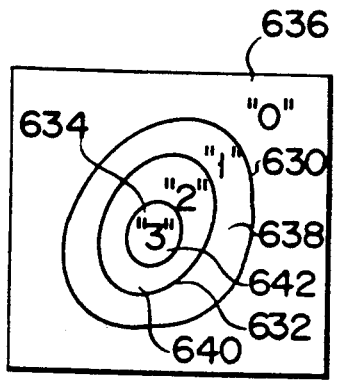
F I G. 35
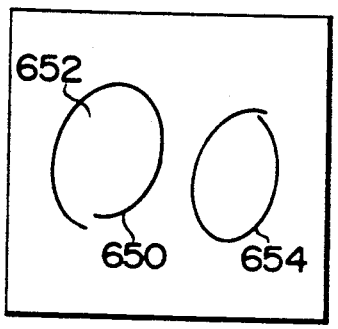
F I G. 36
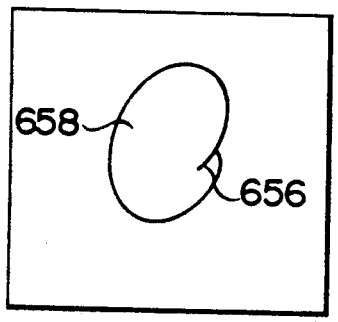
F I G. 37A
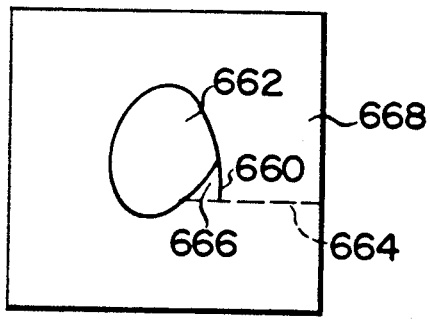
F I G. 37B

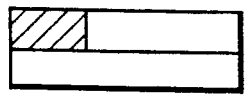 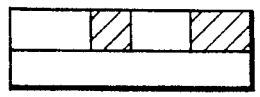 
F I G. 40A   F I G. 40B   F I G. 40C
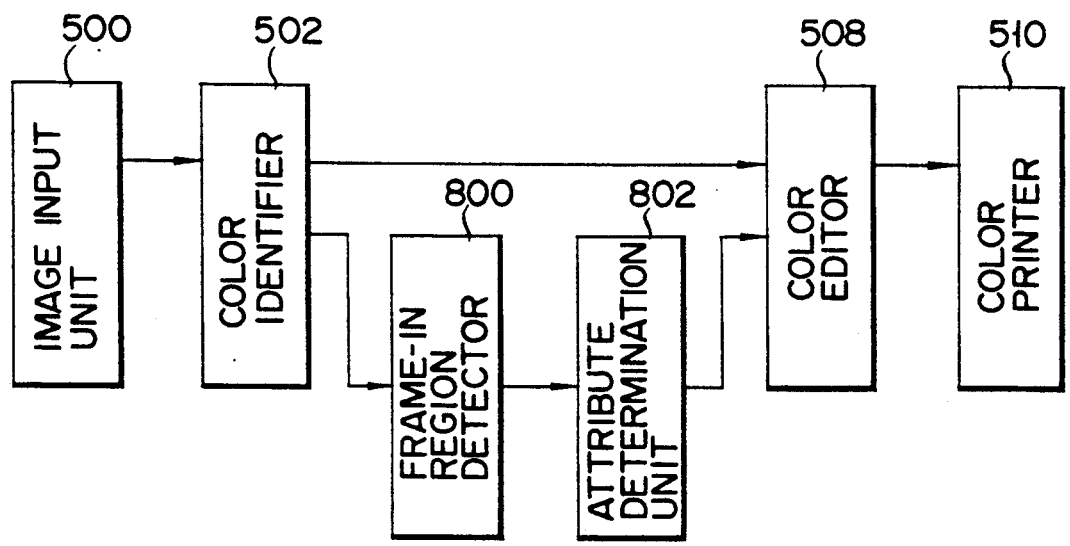
F I G. 41

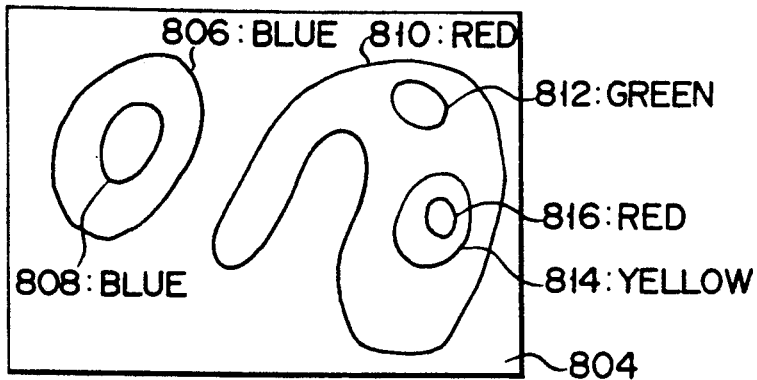
F I G. 42
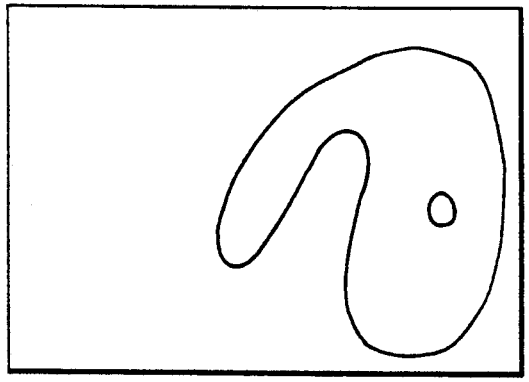
F I G. 43A
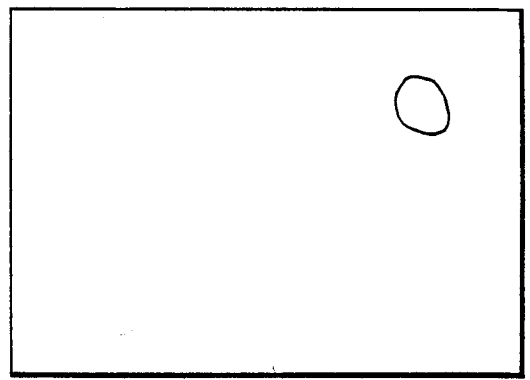
F I G. 43B
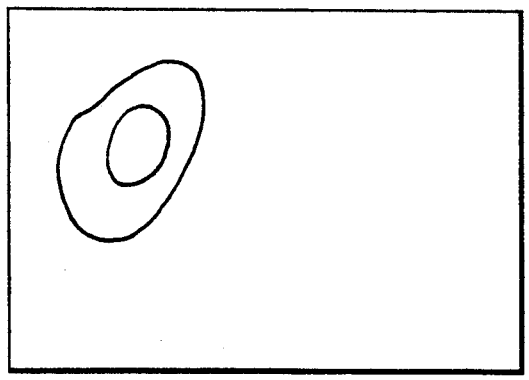
F I G. 43C
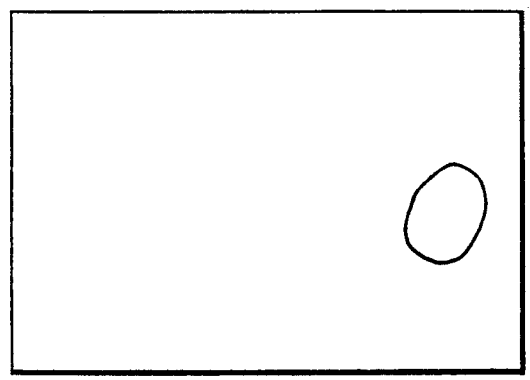
F I G. 43D

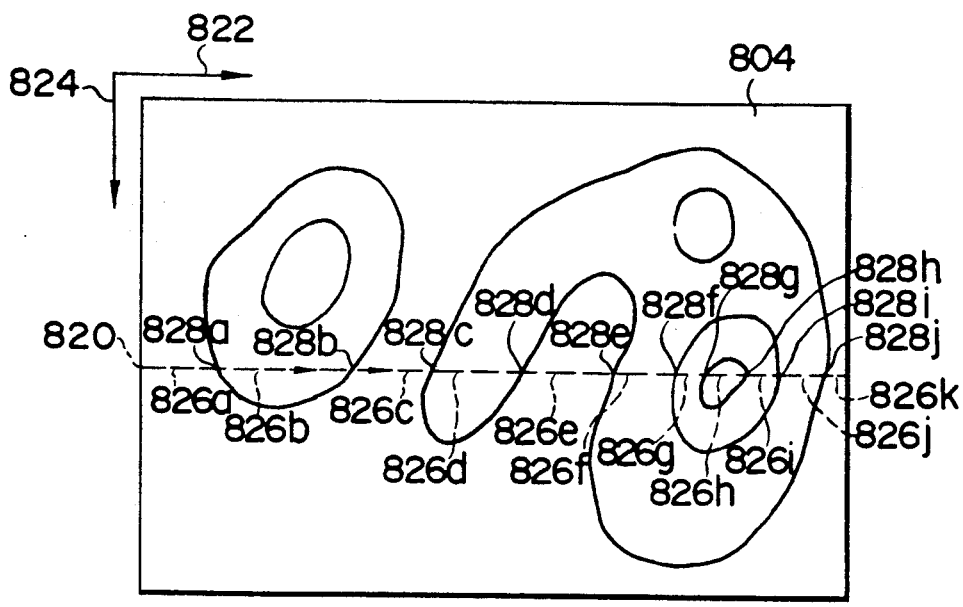
F I G. 47A
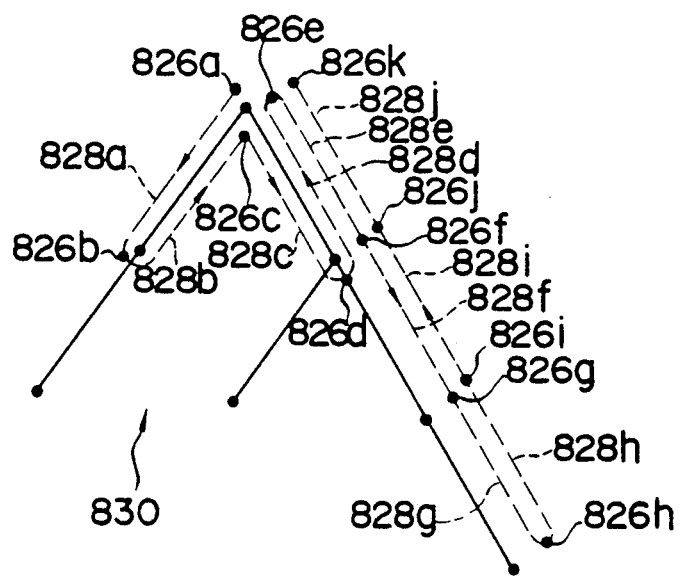
F I G. 47B

IMAGE SIGNAL PROCESSING APPARATUS FOR USE IN COLOR IMAGE REPRODUCTION

BACKGROUND OF THE INVENTION

1. Field of the Invention

The present invention relates to an image signal processing apparatus and, more particularly, to electric color copying machines for automatically editing/processing input images to generate color reproduced images edited in accordance with requests of operators.

2. Description of the Related Art

Recently, as multi-function type copying machines have been developed, variously processed color copied images have been able to be easily produced in an office. Typically, at the time of copying of an input document, a multi-function type copying machine capable of partially performing coloring (color designation copying), partially or entirely trimming, masking, or magnifying/reducing (coordinate conversion image processing) an input image, or partially merging another document image into one input image (synthesis of input images) has been developed for office applications.

Generally, in a conventional multi-function type color copying machine, a coordinate input unit such as a tablet or keyboard is provided in addition to processing function designation switches so that an operator can manually designate a target image region of an input document. Typically, in order to partially, desirably color a document image, an operator (1) designates coordinates of a partial region of an input document to be colored by using the coordinate input unit (e.g., designates coordinates of two edges of a diagonal of a rectangular region), (2) operates function designation switches arranged on an operation panel of the copying machine, and then (3) depresses a copy start button. Such a complex operation of a plurality of keys forces the operator to waste a long time, thereby reducing efficiency of a copying operation. In addition, undesired image edit processing may be performed by an erroneous key operation. This reduces productivity of document forming/editing in an office.

"Original Editing System Using Facsimile", Yasuhito SUENAGA et al., Articles of the Institute of Electronics and Communication Engineers of Japan, Vol., J63-D, No. 12, December 1980 describes an automatic editing system arranged in such a manner that an operator performs write designation by using a pen, instead of the above coordinate input unit, for a document region to be processed. Similar editing systems are also disclosed in Japanese Patent Disclosure (KOKAI) 59-81,759 and 57-185,969. According to such proposed systems, in order to partially color and copy a document systems, for example, an operator need only handwrite a closed loop on document paper by using a color pen. In order to redden the partial region, the operator handwrites a red closed loop. At this time, the copying machine automatically detects the shape and color of the loop by optical scanning and reddens only a corresponding region of a copied image. With such an arrangement, however, in order to perform copying processing of partial coloring plus image synthesis, complex key and tablet operations for designating direct movement of a partial image between documents are still required. Therefore, efficient multi-functional color copying processing cannot be expected.

SUMMARY OF THE INVENTION

It is therefore an object of the present invention to provide a new and improved image signal processing apparatus capable of improving efficiency and reliability of input image reproduction processing including a plurality of types of image processing/editing operations.

In accordance with the above object, the present invention is addressed to a specific color image signal processing apparatus for use in an image reproduction system. The color image signal processing apparatus includes an image input section for optically sensing an image on input paper and generating an electrical image signal. A memory section stores ink colors used in a color frame written in the input image in order to designate a partial image region and specific image edit functions assigned to the respective frame colors and desired to be executed by an operator such that the ink colors and the image edit functions correspond to each other and can be rewritten. In response to the image signal, when a color frame of a closed loop having a selected color is written in the input image, a detecting section detects the shape and color of the color frame and generates a detection result signal. An edit function determining section is connected to the detecting section and the memory section and accesses the memory section in response to the detecting result signal, thereby determining an image edit function corresponding to a first selected ink color of the detected color frame and generating an operation mode set signal. A signal processing section is connected to the function determining section and executes image signal processing corresponding to the image edit function for the image signal in response to the operation mode set signal, thereby generating an edited image signal. An image output section is connected to the signal processing section and generates a reproduced image in response to the edited image signal. The memory stores image edit functions and edit parameters selected by the operator as the specific image edit function designation data.

The present invention and its objects and advantages will become more apparent in a detailed description of preferred embodiments to be presented below.

BRIEF DESCRIPTION OF THE DRAWINGS

In the detailed description of preferred embodiments of the present invention presented below, reference is made to the accompanying drawings of which:

FIGS. 7A and 7B are diagrams showing an internal arrangement of a color change table, included in the color editor shown in FIG. 6, for performing color change editing;

FIGS. 13A and 13B are flowcharts for explaining main steps of image synthetic copying processing;

FIGS. 15A and 15B are plan views showing an input document subjected to image deformation copying and its copied product;

FIG. 16 is a block diagram showing an arrangement of a main part of an image signal processing apparatus according to another embodiment of the present invention;

FIG. 18 is a diagram showing an internal circuit arrangement of a high-frequency emphasis processing unit shown in FIG. 16;

FIG. 19 is a diagram showing a model space for defining correction processing for high-frequency signal;

FIGS. 20A to 20C are diagrams showing a flowchart for explaining integration processing executed by a color region integration unit shown in FIG. 16;

FIGS. 25A and 25B are diagrams showing Lab spaces used in color identification;

FIG. 26 is a diagram showing a string of pixels of a color code signal and a pixel string obtained upon thin-out processing;

FIG. 27A is a flowchart for explaining color frame identification processing executed by a frame-in region detecting unit shown in FIG. 24;

FIG. 27B is a flowchart for explaining sub-steps of a raster level determining step shown in FIG. 27A;

FIGS. 31A through FIG. 37B are diagrams showing various handwritten color frames;

FIGS. 40A to 40C are diagrams showing several examples each representing a pair of a present raster and a previous raster adjacent thereto;

FIG. 41 is a block diagram showing a main part of an image signal processing apparatus according to still another embodiment of the present invention;

FIG. 42 is a diagram showing a plan view of a monochromatic input document on which various color frames are written;

FIGS. 43A to 43D are diagrams showing colors of the color frames shown in FIG. 42, respectively;

FIGS. 47A to 47C are diagrams schematically presenting an input image plan view, a hierarchical structure of in-frame regions, and an attribute determination result obtained when the attribute determination processing shown in FIG. 46 is performed for a certain raster of the input image shown in FIG. 42

DETAILED DESCRIPTION OF PREFERRED EMBODIMENTS

Figure 1:
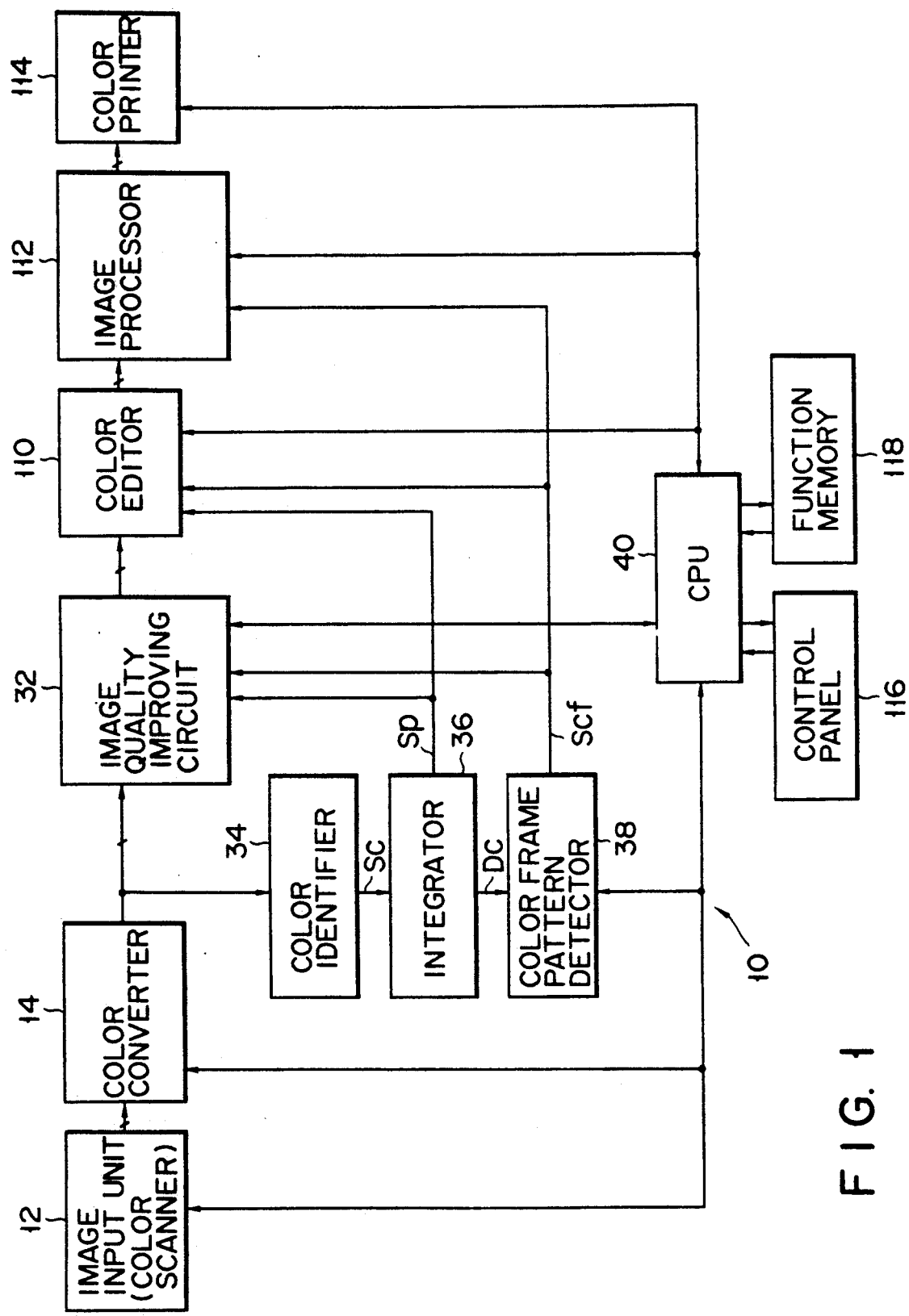
FIG. 1 is a diagram schematically showing an overall arrangement of a multi-function type color copying machine according to a preferred embodiment of the present invention.

Referring to FIG. 1, a multi-function type color copying machine according to a preferred embodiment of the present invention is generally designated by reference numeral "10". The copying machine 10 has a color image input unit 12 for inputting an input image such as paper documents produced in an office. The input unit 12 has a known arrangement including, e.g., a color image scanner, an analog-to-digital converting circuit, and a shading correction circuit. The scanner normalizes a readout image by using a known white reference board and produces electrical color image signals (R, G, and B) corresponding to the input image. The image input unit 12 is connected to a color conversion circuit 14. The color converter 14 converts the color image signals (R, G, and B) representing the reflectivity of light into ink amount signals (Y, M, and C). The ink amount signals (Y, M, and C) designate ink amounts of reference colors required upon image printing.

Figure 2:
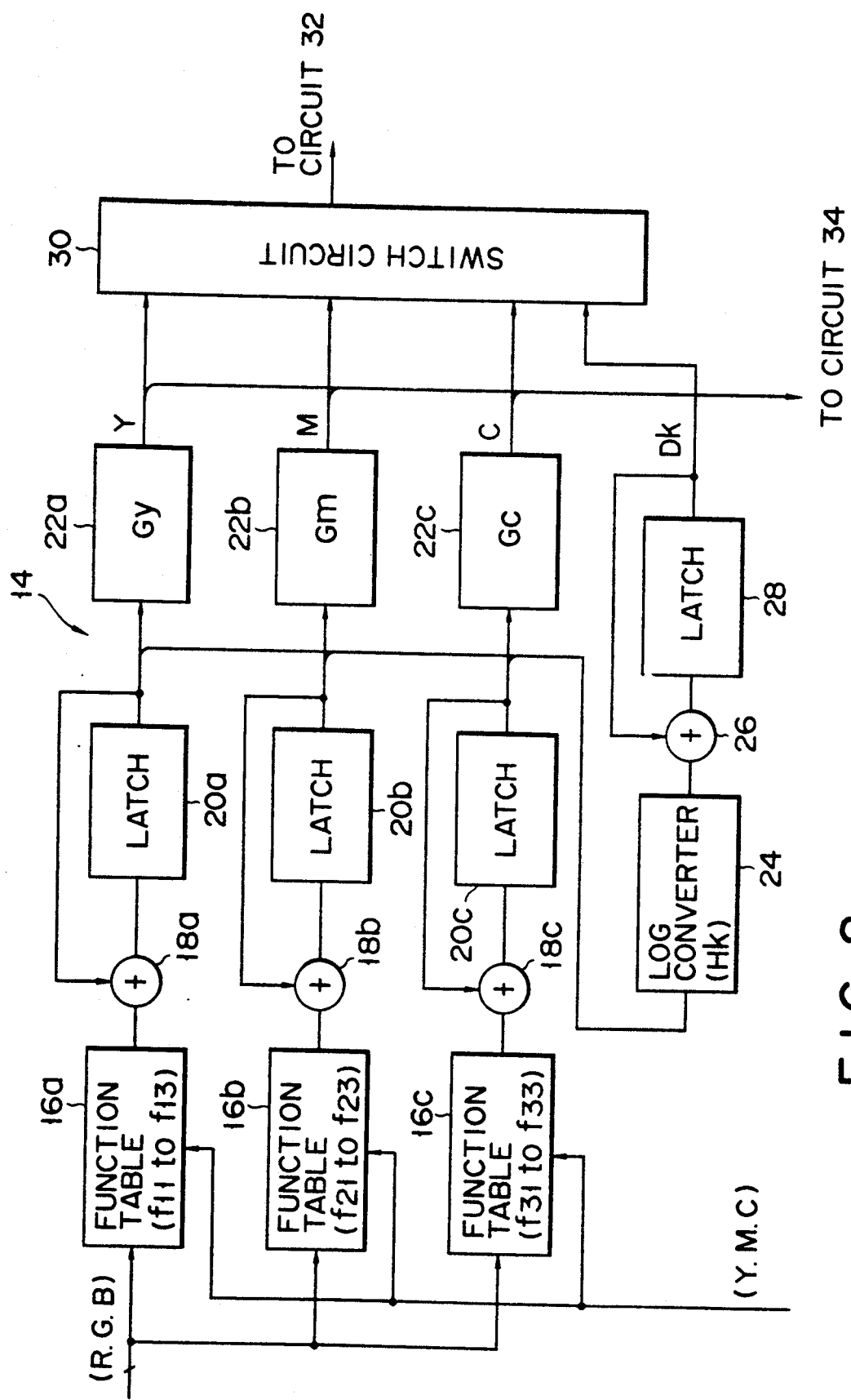
FIG. 2 is a diagram showing an internal arrangement of a color converter included in the copying machine shown in FIG. 1.

As shown in FIG. 2, the color converter 14 has function table units 16a, 16b, and 16c. The color signals (R, G, and B) read and normalized by the color scanner of the image input unit 12 are supplied to the function table units 16. A function table stored in each unit 16 is a known conventional table and may be similar to that disclosed in Japanese Patent Application No. 62-213,534. Each function table unit 16 is connected to a series circuit consisting of an adder 18 and a latch circuit 20. The series circuits execute a matrix represented below and produce conversion output signals Dy, Dm, and Dc, respectively:

$$\begin{bmatrix} Dy \\ Dm \\ Dc \end{bmatrix} = \begin{bmatrix} f11 & f12 & F13 \\ f21 & f22 & F23 \\ f31 & f32 & F33 \end{bmatrix} \begin{bmatrix} R \\ G \\ B \end{bmatrix} \quad (1)$$

The conversion output signals Dy, Dm, and Dc are supplied to conversion table units 22a, 22b, and 22c, respectively. These table units 22 convert the signals Dy, Dm, and Dc into ink amount signals Y (Yellow), M (Magenta), and C (Cyan), respectively.

The latch circuits 20a, 20b, and 20c are connected to a series circuit consisting of a log converter 24, an adder 26, and a latch circuit 28. Output signals from the latch circuits 20 are supplied to the adder 26 and the latch circuit 28 to execute an equation presented below by using a function Hk stored in the log converter 24, thereby obtaining a black intermediate signal Dk:

$$Dk = Hk(Dy) + Hk(Dm) + Hk(Dc) \quad (2)$$

As is understood from the above equation, the black intermediate signal Dk corresponds to a density value of a product of the ink amount signals Y, M, and C.

The signals Y, M, C, and Dk are transmitted via a switch circuit 30 to an image quality improving circuit 32 (FIG. 1) and used in image printing executed by a hard copy generating unit (114 in FIG. 1) such as a color printer to be described later. At the same time, the signals Y, M, and C are directly supplied to a color identification circuit 34 (FIG. 1) and used in input image color frame detection. Note that the black intermediate signal Dk is converted into an ink amount signal black board by a gamma (Υ) corrector (82 in FIG. 5) included in the image quality improving circuit 32 shown FIG. 1, thereby improving the quality of black image.

Referring back to FIG. 1, the color identification circuit 34 identifies a color of each image portion of an input image. The color identifier 3 is connected to an integration processing circuit 36. In order to compensate for a color variation (e.g., nonuniformity in color density derived from a painting variation of a color pen) in an input image, the integrator 36 executes integrated color information processing. The integrator 36 is connected to a color frame pattern detecting circuit 38. These circuits 12, 14, 32, and 38 are connected to and controlled by a CPU 40.

The color identifier 34 receives the color signals Y, M, and C and converts the signals into a digital code signal. This code signal Sc includes a 4-bit hue code H, 2-bit saturation code S, and 2-bit lightness code V. This data conversion can easily be performed by using a conversion table stored in a ROM (not shown) arranged in the color identifier 34. According to this embodiment, the number of bits of the hue code H is increased twice those of the remaining codes S and V. If necessary, one bit can be added to each of the saturation and lightness codes S and V to obtain a 3-bit code. In this case, when a fluorescent color is assigned to the added bit, even a color image written with a fluorescent pen which is popular in an office and the like can be dealt with. With the use of the code signal having the above bit arrangement, color variation correction processing calculation by the integrator 36 can be simplified and accurately performed, since when adjacent color regions in the input image are to be integrated, nearness between the colors can be efficiently determined.

Figure 3:
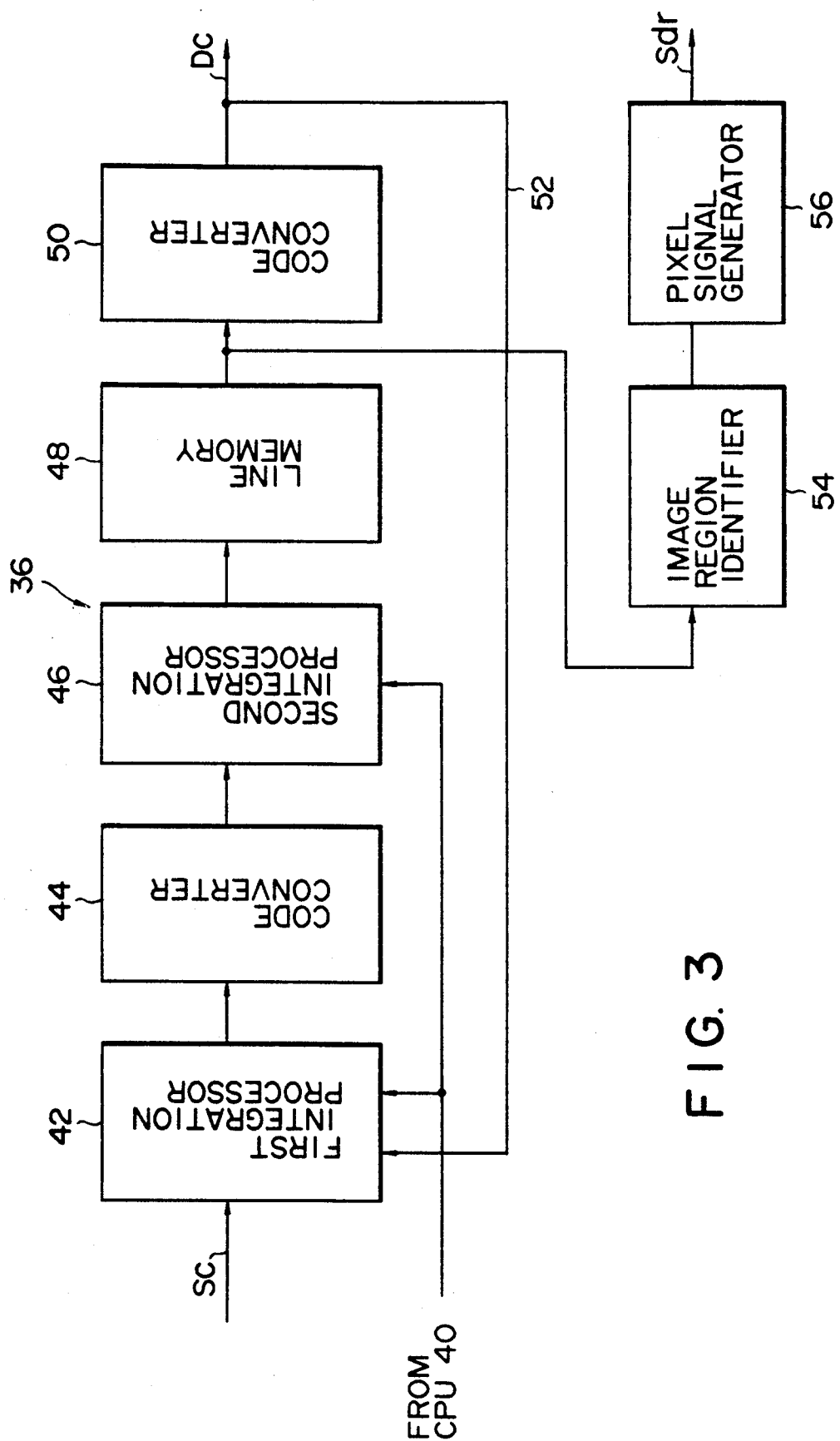
FIG. 3 is a diagram showing a internal arrangement of an integrator included in the copying machine shown in FIG. 1.

As shown in FIG. 3, the integrator 36 includes a vertical integration processor (first integration processor) 42 for receiving the color code signal Sc. The processor 42 functions to remove or eliminate color noise such as a vertical color variation from an input image on the basis of the color code signal Sc. The processor 42 determines a color code of the region of the input image line currently being scanned, on the basis of the continuity between a region of an input image line currently being raster-scanned by the color scanner of the input image unit 12 and a determined color region of an input image line which is already, completely scanned. For example, if a color of an input image line region currently being scanned is the same as that of an immediately preceding image line region, the processor 42 assigns the same color code thereto. If a color of an input image line region currently being scanned is similar to that of an immediately preceding image line region, the processor 42 assigns the same color code as long as the similarity falls within a predetermined range. With this integration processing, the continuity of colors of an input image in a vertical direction can be held, and a color variation therefore can be minimized. According to this embodiment, in this color code assigning processing, the color continuity is determined on the basis of mainly the 4-bit hue code H. In other words, a saturation or lightness difference between adjacent image regions is considered comparatively insensitive as compared with color continuity determination therebetween. In this manner, color variation erroneous recognition of a color pen used to designate a region in an input image can be maximally compensated for.

As shown in FIG. 3, the first integration processor 42 is connected to a code converting circuit 44 which converts an output signal from the processor 42 into a run code signal (to be referred to as a "transverse run code signal" or "horizontal run code signal" hereinafter). At this time, a weighting coefficient of the vertical color continuity of an image input is calculated. This weighting coefficient will be referred to as a "longitudinal run code signal" or "vertical run code signal" hereinafter. This code signal is supplied to a horizontal integration processor (second integration processor) which checks color continuity in a horizontal direction of the input image and performs color code assigning processing (i.e., horizontal integration processing) between adjacent image regions on the basis of the vertical run code signal. In this case, color information including, e.g., color determination in each region and a color difference between the adjacent regions and distance information representing how long the determined color continues are used as integration conditions. Since shape information representing small undurations on a contour edge of a color frame pattern contained in the input image is not used as an important integration condition, color frame recognition can be improved in its efficiency.

Such color integration is performed on the basis of the above run code, and the integration result is stored in units of image lines in a line memory 48 which functions as a run code memory. The run code data stored in the memory 48 is subjected to code conversion performed by another code converting circuit 50. As a result, the run code data is converted into pixel color code data Dc whose color variation is corrected. The pixel color code data Dc not only functions as the output signal from the integration processor 36 but also is fed back to the vertical integration processor 42 together with the vertical run code information (vertical weighting coefficient). With such an arrangement, a color code signal whose color variation is corrected can be obtained. As this color code signal, a signal representing a flattened frame obtained by removing undulations from an edge portion of an actual color frame may be produced by arbitrarily modifying the above integration conditions. Such a signal is rather suitable to detect a color frame handwritten on an input image with a color pen or the like by the operator.

It should be noted that the line memory 48 stores both the vertical run data (vertical weighting coefficient) and the horizontal run code signal (line length data). This enables identification of a character part and a halftone image region o the basis of size information about image components of a general document image and/or a color image. More specifically, the line memory 48 which functions as a run code memory is connected to an image region identifier 54 as shown in FIG. 3. The image region identifier 54 identifies a character image region and a halftone image region in an input image in such a manner that (1) if horizontal run information is short, e.g., about 0.1 to 0.4 mm (this frequently occurs in a dot image), the identifier 54 replaces a white level with a black level of the region, then, (2) if the horizontal run information is comparatively long, e.g., about 10 to 20 mm, the identifier 54 determines that the region is a halftone image, and (3) if the horizontal run information is shorter than that, the identifier 54 determines that the region is a character density-image region. An identification signal output from the image region identifier 54 is supplied to a pixel signal generator 56. On the basis of the identification signal, the pixel signal generator 56 generates a pixel signal Sp for each image region of the input image. This signal Sp is supplied as a density-image region signal Sdr to a region identifier (84 in FIG. 5 to be described later) of the image quality improving circuit 32. The black level region identified as a character density image region is magnified in both directions by a predetermined number of pixels and then converted into the pixel signal Sp. With such an arrangement, generation of noise upon character/halftone image switching can be prevented. When the above identification signal is supplied to the image quality improving circuit 32 (FIG. 1), region identification can be performed in combination with an identifier provided in the image quality improving circuit 32. Therefore, the region identification efficiency can be improved.

Figure 4:
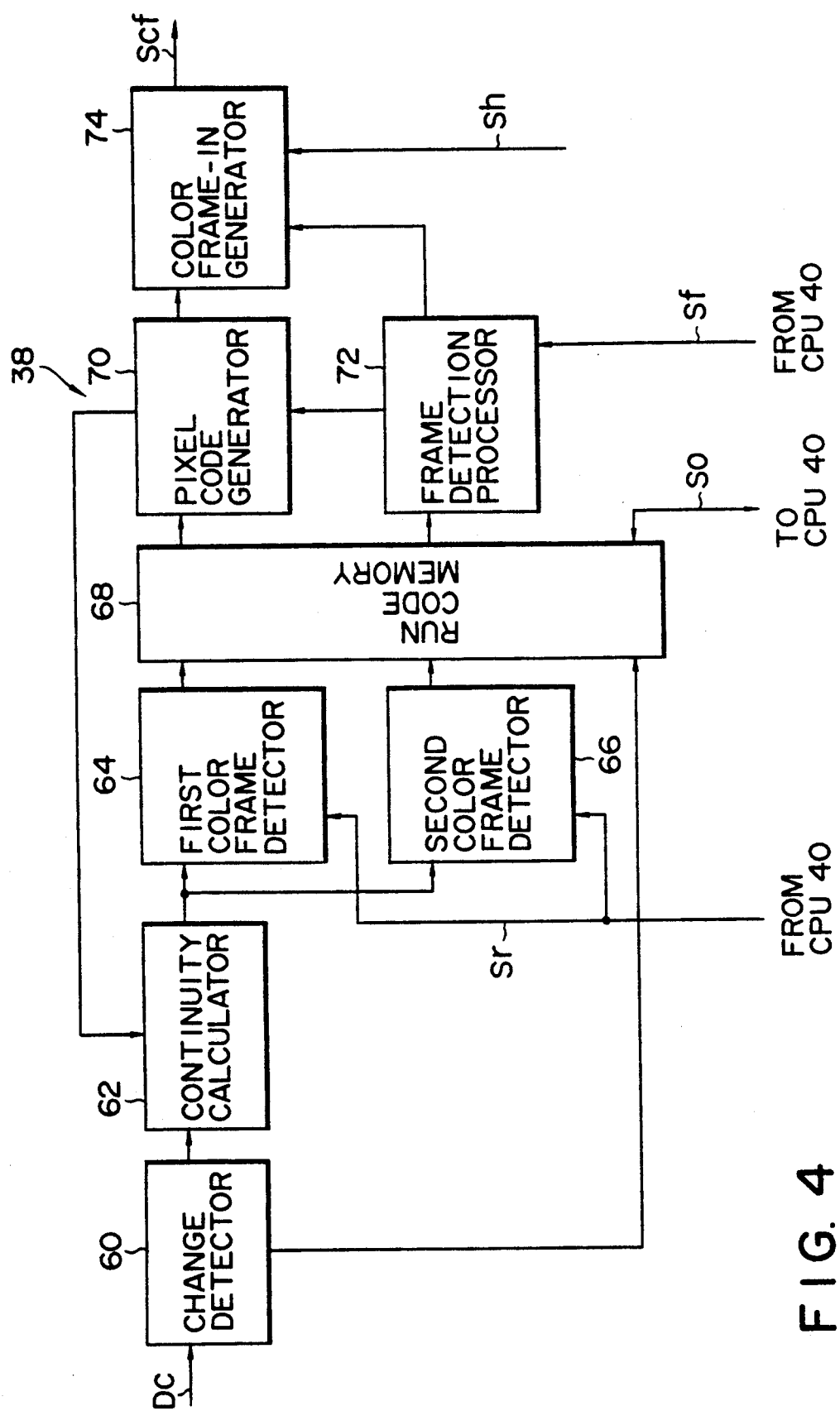
FIG. 4 is a diagram showing an internal arrangement of a color frame detector included in the copying machine shown in FIG. 1.

An internal arrangement of the color frame pattern detecting circuit 38 shown in FIG. 1 is shown in detail in FIG. 4. A change detector 60 is provided for detecting change points of the color-variation-corrected pixel color code data Dc supplied thereto. This change point detection is performed by calculating an exclusive OR between current code data Dci and immediately preceding code data Dc(i−1). The detection result of the detector 60 is supplied to a color continuity calculating circuit 62 which calculates a weighting coefficient representing continuity between line images in the vertical direction of the input image. The calculation result is supplied in parallel to a first color frame detector 64 for detecting a color frame pattern having a free shape (irregular shape) and a second color frame detector 66 for performing pre-processing for detecting a color frame pattern having a circumscribed quadrilateral shape (regular shape). The frame detectors 64 and 66 are supplied with a color priority designation signal Sr from the CPU 40 (FIG. 1). Whether an image region to be processed in the input image is a frame-in region or a frame-out region is determined by a combination of recognition processing for each pixel and the run code described above.

The free-shape or first color frame detector 64 assigns the same code as the continuous in-frame pixel code to a pixel whose in-frame code (color and level) is already determined on a currently scanned image line. If adjacent pixels have the same color but different density levels, a code of a pixel having the smaller density level is assigned to the both. Alternatively, the free-shape frame detector 64 generates a new region for a pixel whose in-frame code (color and level) is not determined yet on a currently scanned image line. At this time, only when in-frame codes at both ends of pixels adjacent to each other with a color frame therebetween are equal to each other and the pixels has the same frame color, the level value is incremented by one. Only when in-frame codes at both ends of pixels adjacent to each other with a color frame therebetween are different and the pixels have the same frame color, a larger one of level values of the in-frame codes is selected. In other cases, the lowest level of frame colors is automatically assigned to the new region. When both of a pixel on an image line currently being scanned and a pixel on an immediately preceding line are located on a color frame, the circumscribed-quadrilateral-shape detection pre-processor or second color frame detector 66 automatically increments the vertical weighting coefficient by one. If the pixel has a predetermined specific code, the same code is assigned to the pixel.

The detection results from the frame detectors 64 and 66 are stored in the run code memory 68 such as a DRAM. Each time the change detector 60 detects a frame change, information such as a frame color code representing a frame color, a level code representing a frame overlapping structure (e.g., "2" for a double frame and "3" for a triple frame), a vertical run code representing a continuous distance in the vertical direction of an input image, and a horizontal run code representing a continuous distance in the horizontal direction are simultaneously recorded. Therefore, each time the color frame code changes, the color frame code and coordinates of the circumscribed-quadrilateral-frame detection code change point are recorded, and a memory address is updated.

As shown in FIG. 4, the run code memory 68 is connected to a pixel code generator 70 and a circumscribed-quadrilateral-frame detection processor 72. The memory 68 exchanges a color code signal So with the CPU 40 (FIG. 1). The processor 72 is supplied with a color frame control signal Sf from the CPU 40 (FIG. 1). The generator 70 and the processor 72 are connected to a color frame-in code signal generating circuit 74 which is supplied with a frame switch signal Sh from the CPU 40 (FIG. 1).

In this copying machine, upon start of color copying processing of an input image, whether a frame written in an input image is a free-shape frame or a circumscribed-quadrilateral frame is designated (as will be described in detail later with reference to FIG. 10B). In a free-shape-frame detection mode, the first color frame detector 64 and the pixel code generator 70 are rendered operative under the control of the CPU 40. The generator 70 generates a pixel code required to detect a free-shape frame, on the basis of the frame-in signal stored in the run code memory 68. The generated pixel code is fed back to the color continuity calculating circuit 62 and at the same time transmitted to the frame-in color code generator 74. The generator 74 generates an actual color frame-in code signal Scf in the frame, on the basis of the color code and the color level supplied thereto. In a circumscribed-quadrilateral frame detection mode, the second color frame detector 66 and the circumscribed-quadrilateral-frame detection processor 72 are rendered operative under the control of the CPU 40. On the bases of the information stored in the run code memory 68, the processor 72 generates a frame-in signal which is supplied to the pixel code generator 70 and converted into a pixel code required for frame detection thereby. This pixel code is transmitted to the generator 74 as in the free-shape-frame detection mode, and the generator 74 generates the actual color frame-in code Scf.

More specifically, the processor 72 detects a color frame loner than a predetermined unit length in the horizontal direction of the input image, on the basis of the color frame code and the coordinate data of the detected color code change point stored in the memory 68. When a weighting coefficient of the frame in the vertical direction of the input image is smaller than a predetermined unit value, the processor 72 determines the color frame pixel as a start mark and assigns specific codes SL and SR at left and right ends of the code coordinates, respectively. Alternatively, when the weighting coefficient of the frame in the vertical direction of the input image is larger than the above unit value, the generator 74 determines the color frame pixel as an end mark and assigns specific codes EL and ER at left and right ends of the code coordinates, respectively. Once the specific code SL is generated, the generator 74 continuously generates the color frame-in code until the corresponding specific code SR is generated. That is, a frame-in signal is generated for pixels located between the pixels assigned with a pair of the specific codes SL and SR. Similarly, once the specific code EL is generated, the generator 74 continuously generates the color frame-in code until the corresponding specific code ER is generated. That is, a frame-in signal is generated for pixels located between the pixel assigned with a pair of the specific codes EL and ER. The generator 74 produces the actual color frame-in signal Scf, on the basis of the color frame-in code signal generated as described above for each pixel and in response to the frame switch signal Sh from the CPU 40. It should be noted that the CPU 40 can directly access the run code memory 68 to read out the color frame code signal stored therein or can select a frame designation mode by this signal.

Figure 5:
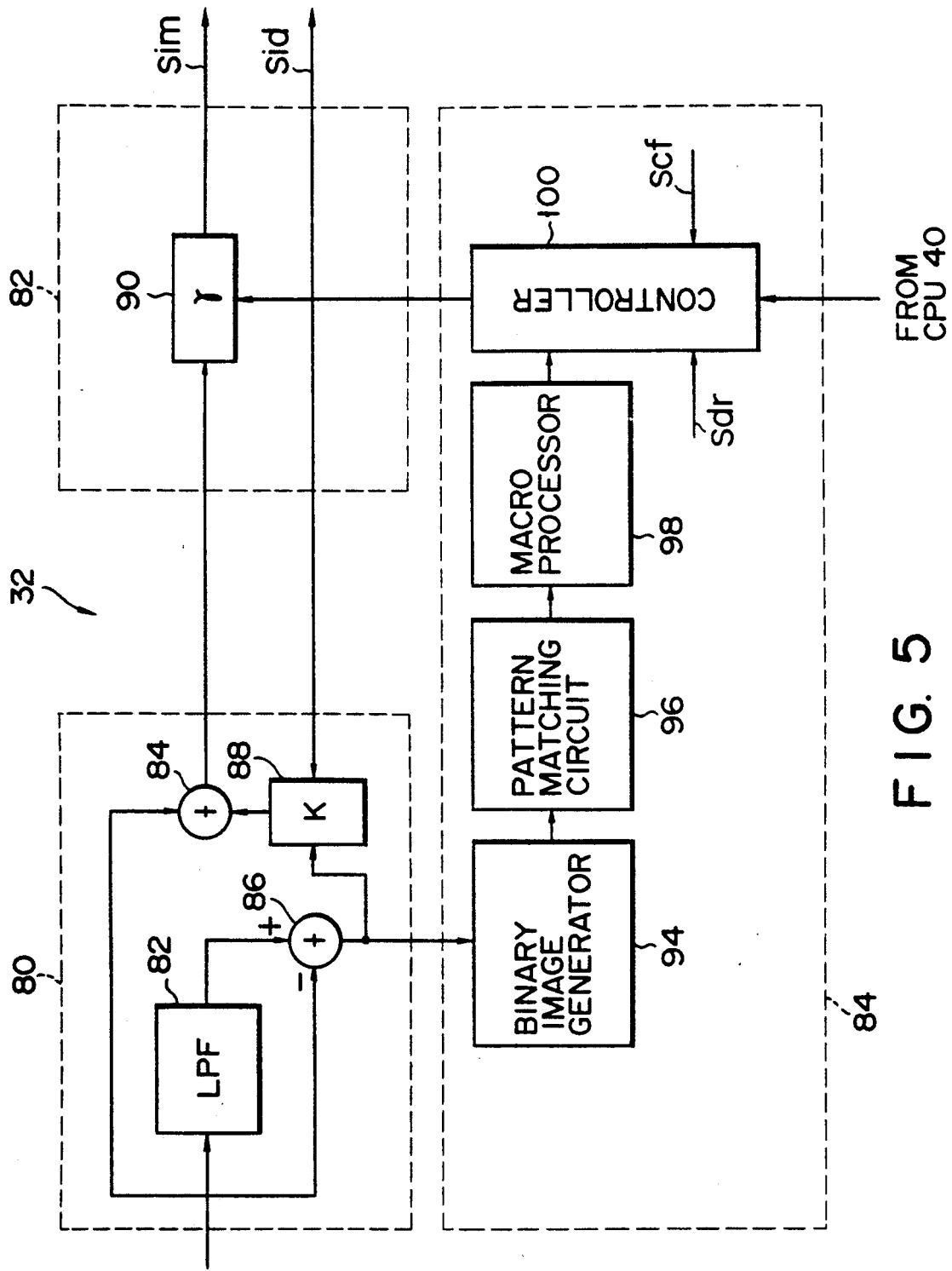
FIG. 5 is a diagram showing an internal arrangement of an image quality improving circuit included in the copying machine shown in FIG. 1.

A principal concept of the image quality improving circuit 32 shown in FIG. 1 is disclosed in Published Unexamined Japanese Patent Application No. 60-204,177. An example of an internal circuit arrangement of the circuit 32 is shown in FIG. 5. The image quality improving circuit 32 comprises a filter circuit 80 for improving special frequency characteristics of an input image signal, a gamma ($\gamma$) corrector 82 for improving gamma characteristics, and a region identifier 84 for controlling operations of these circuits. The filter circuit 80 receives the ink amount signals (Y, M, and C) and the black intermediate signal Dk supplied from the color converter 14. The filter circuit 80 has a low-pass filter 82, adders 84 and 86, and a coefficient processor 88. The gamma corrector 83 has a gamma characteristic change processor 90. The region identifier 92 has a binary image generator 94 for generating signal of filter circuit 80, a macro processor 98, and a controller 100 for controlling execution of proper processing for each region. The controller 100 receives the density-image region signal Sdr and the color frame-in signal Scf and controls the circuit 90 to execute proper image quality improving processing in accordance with a type of input image region under the control of the CPU 40. For example, if the image region is a character or diagram, the controller 100 emphasizes a high-frequency component of an input image signal Sim and rapidly corrects the characteristics. If the image region is a dot image, the controller 100 cuts the high-frequency component of the input image signal Sim to relax the gamma characteristics, thereby minimizing moire noise.

Referring back to FIG. 1, other components of the color copying machine according to this embodiment will be described below. As shown in FIG. 1, the image signals output from the image quality improving circuit 32, i.e., the ink amount signals (Y, M, and C) and the black intermediate signal Dk subjected to the image quality improving processing are sequentially transmitted to a color editor 110 and an image processor 112 and output from a color printing unit 114 as a hard copy. In accordance with an image editing command input from a control panel 116 manually operated by an operator, the CPU 40 determines editing processing for the image signal and controls the color editor 110 and the image processor 112. The color editor 110 executes editing processing for, e.g., coloring a designated input image region under the control of the CPU 40; and the image processor 112 executes image processing for, e.g., magnifying, reducing, and moving the input image under the control of the CPU 40. The CPU 40 is associated with a function memory 118. The function memory 118 stores therein a table representing a relationship between colors of a frame for region designation to be handwritten by an operator on a paper document (input image) to be copied and types of image editing processing functions to be assigned to the colors. This table also stores various parameters (e.g., magnification of magnifying/reducing copying and color conversion designation) of the image editing processing function assigned to the color of the frame to be handwritten on the paper document and priority therebetween. The stored data, i.e., types of editing functions to be assigned to the frame colors can be arbitrarily changed under the control of the CPU 40 if desired by an operator. This memory may be a RAM. The importance of the function memory 118 will become more apparent in a description to be presented below.

Figure 6:
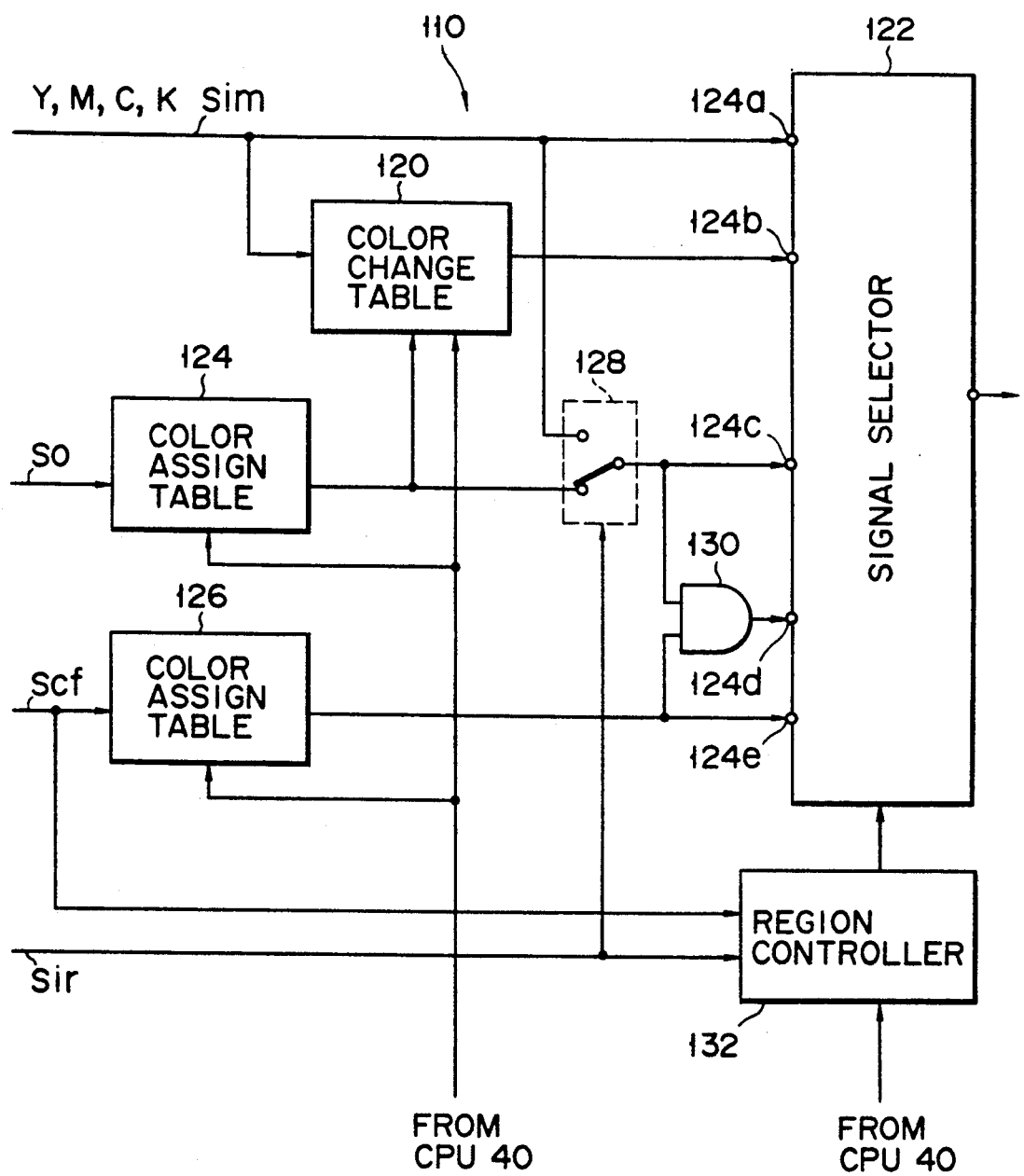
FIG. 6 is a diagram showing an internal arrangement of a color editor included in the copying machine shown in FIG. 1.

FIG. 6 shows a circuit portion for performing color changing editing of an internal circuit arrangement of the image editor 110. A color change table circuit 120 has a k-multiple conversion table and a l-multiple conversion table and selectively performing k- or l-multiple processing for the image signal Sim consisting of the ink amount signals Y, M, C, and K. An output signal of the color change table circuit 120 is supplied to a signal selector 122. In response to the color code signal So and the color frame-in signal Scf, color assign table circuits 124 and 126 determine colors to be assigned on the basis of color assign tables thereof. The color assign table circuit 124 is connected to the signal selector 122 via a switch circuit 128. An output signal of the circuit 126 is directly supplied to the signal selector 122. An AND circuit 130 adds an output signal of the switch circuit 128 and the output signal of the color assign table circuit 126. In response to an image region signal Sir for specifying an image region to be processed, an image region control circuit 132 controls a region of an input image to be color-edited and supplies the signal selector 122 with a control signal for specifying a function type of color editing to be executed for the region. In response to the control signal, the signal selector 122 selects one of a normal image output (not executing editing processing) mode terminal 124a, a color change mode terminal 124b, a multicolor editing mode terminal 124c, a color-editing mode terminal 124d, and a painting (trimming or masking) mode terminal 124e. For example, in order to change a color of specific image region of an input image to a selected color, the color change mode terminal 124b is selected. As a result, the image signal Sim is output from the selector 122 via the color change table circuit 120.

While the color change mode terminal 124b is selected, the color change table circuit 120 cannot only perform normal color change editing but also extract a region of a specific color from an input image. In the normal color change mode, as shown in FIG. 7A, the circuit 120 sets k-multiple table data for color conversion in a first memory space of its internal table storage memory 136, and at the same time sets l-multiple table data for color non-conversion in a second memory space of the memory 136. In response to the color code signal So, the switch circuit 138 selectively outputs the conversion results in the first and second memory spaces in the table storage memory 136. That is, only when an image region of a designated color is extracted, the circuit 120 performs k-multiple processing for the image signal Sim but transmits image signals of other regions without performing the processing. The value of the k-multiple table is properly determined by the CPU 40 in accordance with a color designated upon color conversion. If a chroma key is desired, as shown in FIG. 7B, the circuit 120 sets l-multiple table data in the first memory space of the internal table storage memory 136, and at the same time sets 0-multiple table data in the second memory space of the memory 136. When the switch circuit 138 selectively outputs the conversion results in the first and second memory spaces of the table storage memory 136 in response to the color code signal So, only the region of the specific color can be extracted from the input image. By combining this function with merging synthesization processing to be described later, another image can be comparatively easily merged in the specific color region.

Figure 8:
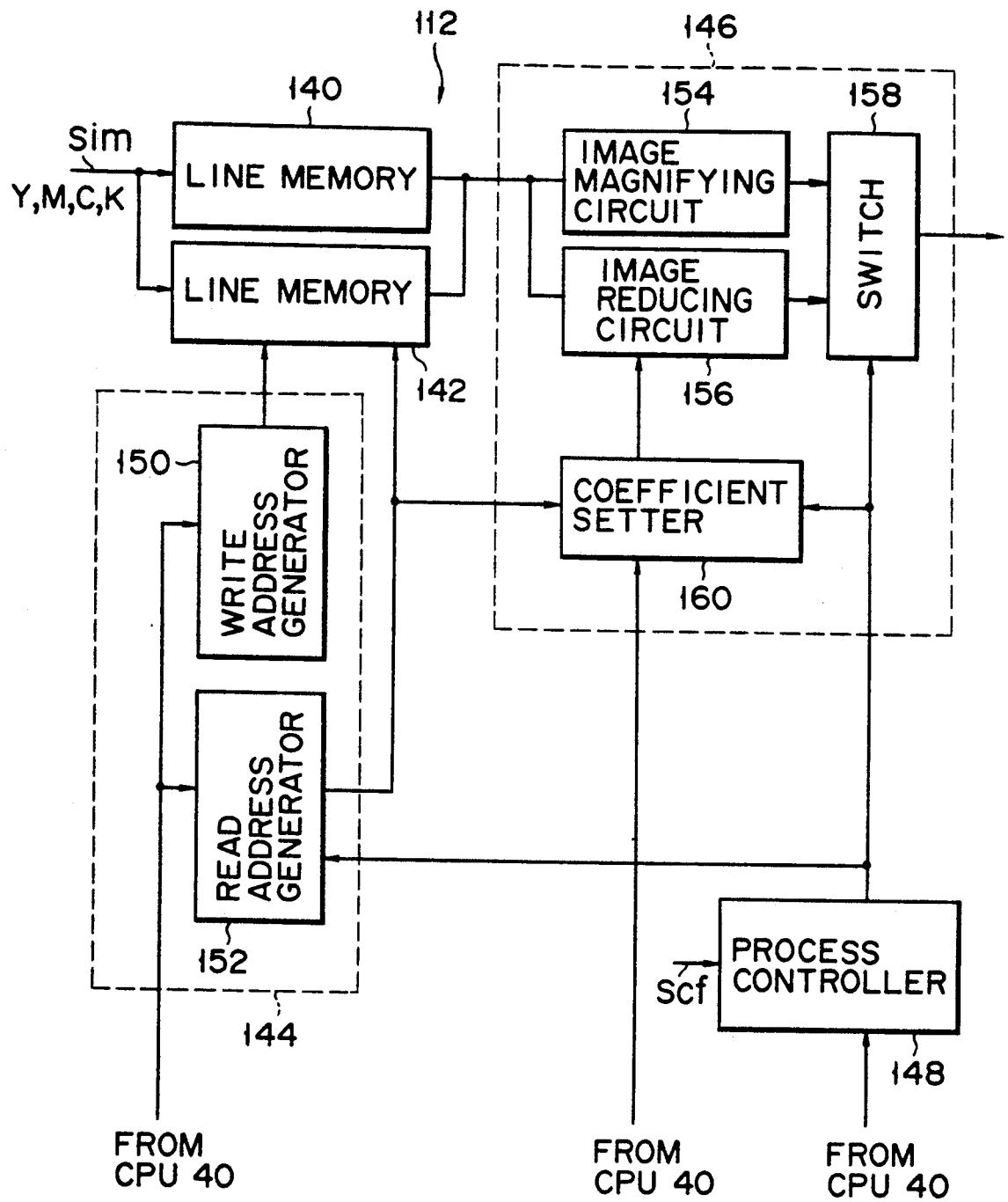
FIG. 8 is a diagram showing an internal arrangement of an image processor, included in the copying machine shown in FIG. 1, for performing coordinate conversion processing such as magnifying, reducing, or moving of an image.

As shown in FIG. 8, the image processor 122 for performing coordinate conversion processing for, e.g., magnifying, reducing, or moving an image comprises line memories 140 and 142, an address control circuit 144, an interpolation circuit 146, and an image processing controller 148. The address control circuit 144 has a write address generator 150 and a read address generator 152. The generators 150 and 152 perform address designation for executing a write/read operation for line image components of input images sequentially stored in the two line memories 140 and 142, respectively. The interpolation circuit 146 has an image magnifying circuit 154 for executing image magnifying processing, an image reducing circuit 156 for executing image reducing processing, and a switch circuit 158 for selectively generating an output signal from the circuit 154 or 156. Each processing is executed under the control of a process controller 148. A coefficient setter 160 selects a coefficient representing a magnification or reduction ratio of an image from a memory content stored therein and supplies the selected coefficient to the image magnifying and reducing circuits 154 and 156.

Figure 9:
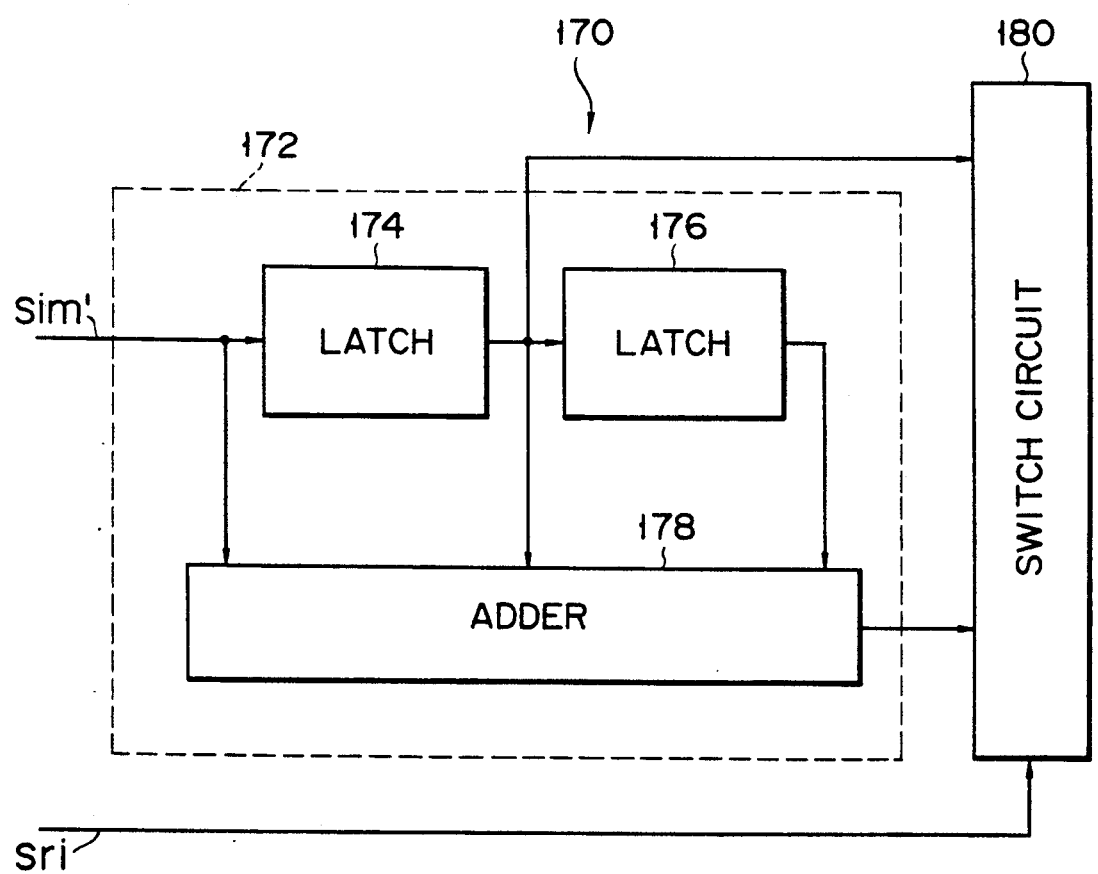
FIG. 9 is a diagram showing an internal arrangement of a moire noise eliminating circuit included in the image processor shown in FIG. 8.

The image processor 112 is provided with a moire noise eliminating circuit 170 whose internal circuit arrangement is shown in FIG. 9. The moire noise eliminating circuit 170 is effective when a periodic structure is constituted by three pixels such as a multilevel dither. The circuit 170 performs primary low-pass filtering processing to remove a specific frequency component which may produce moire noise due to frequency shift of an image component cut off upon image magnification/reduction. In the circuit 170, a low-pass filter circuit 172 has a series circuit of two latch circuits 174 and 176. The input and the output of each latch circuit are connected to an adder 178. A switch circuit 180 functions to selectively generate output signals from the first latch circuit 174 and the adder 178. An image signal Sim' subjected to the magnifying/reducing processing is sequentially delayed by the two latch circuits 174 and 176 to obtain delay signals of three pixels. These delayed pixel signals are added and output by the adder 178. An image region of a specific type (e.g., a dot-image region) in which moire can be generated can be determined by an output signal (image region identification result signal) Sri from the image region identifier 92 shown in FIG. 5. Therefore, when the switch circuit 180 selectively switches the document image signal and the delayed image signal in response to the signal Sri, generation of moire can be prevented throughout the entire input image. The pixel delaying number and adding number may be modified in accordance with the cycle of a periodic structure such as a multilevel dither, thereby to obtain more effective results. The circuit 170, however, need not always be used if the image printer 114 uses a sublimate ink which can express halftone for each pixel.

A color copying operation of the embodiment having the above arrangement will be described below. The automatic editing color copying machine 10 according to this embodiment is available to execute, in addition to normal color copying (color copying of a color input image), special copying operations such as partial color copying of a monochrome input image, image quality conversion, magnifying copying, reducing copying, partial image merge processing between a plurality of input images, and combinations thereof. In order to perform these special copying operations, necessary edit function processing execution data, i.e., document region designation, an edit processing function to be executed, and parameters thereof (such as designation of a color to be added and a magnification rate) are not set by manually operating proper buttons on the control panel 116 normally equipped to the copying machine 10 by an operator but automatically set in the machine by reading color information of a color frame handwritten on an input document for region designation by the operator. Colors and edit function execution data assigned thereto are stored in the function memory 118. In other words, when edit function execution data desired by an operator is set to colors to be used in a handwritten frame and stored in the memory 118, the copying machine 10 (1) detects a color of a color frame contained in an input image by the color scanner and (2) accesses the memory 118 for each time copying is started, thereby rapidly determining and executing a type of edit function to be performed for an input image portion in the detected color frame.

ASSIGNMENT OF EDIT FUNCTION TO COLOR OF HANDWRITTEN FRAME

Figure 10A:
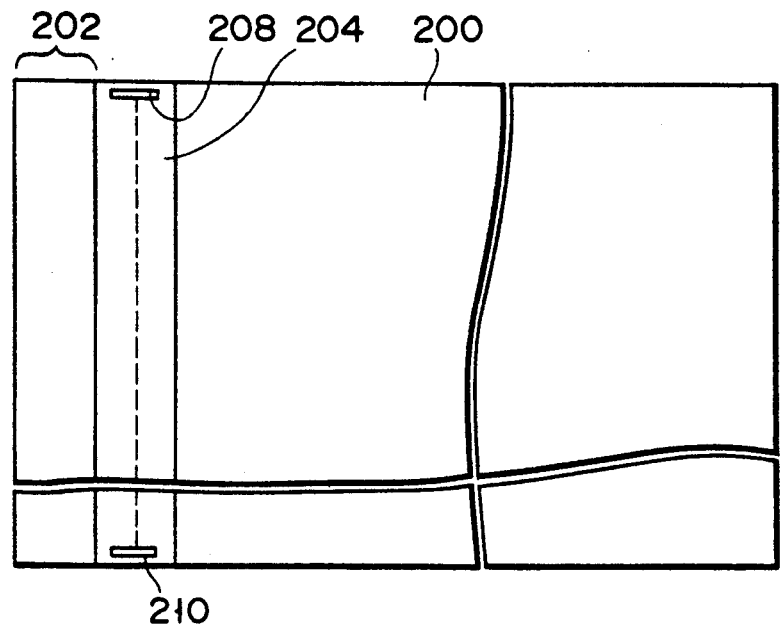
FIG. 10A is a plan view showing a paper document to be edited and copied by the copying machine shown in FIG. 1.

As shown in FIG. 10A, a paper document (input image) 200 which is desired to be edited and copied by an operator has a non-image portion 202. This non-image portion 202 is considered as a peripheral margin region in which no image is present. A band-like edit function designating marking sheet 204 is positioned on document paper 200 in adjacent to the non-image portion 202 thereof. Sheet 204 is read by the color image scanner of the image input unit 12, and may be output by printer 114. This sheet 204 has a marking area the width of which is preferably same as that of non-image portion 202, whereby, when sheet 204 is separately input since the sheet image corresponds to a non-image portion of a hard copy produced by printer 114, the image of marking sheet 204 will be prevented from being printed by printer 114, so that a printed hard copy image may be prevented from becoming poor in its appearance. As shown in FIG. 10B in boxes 206a, 206b, ..., 206h, ... for allowing an operator to designate a color or colors of a color frame to be handwritten in the input image, an edit function (edit mode desired to be performed for the input image by the operator) to be assigned to the color or colors, and parameters thereof by painting with a color pen or the like. The marking sheet 204 has a start mark 208 and an end mark 210 along its scanning direction, thereby preventing occurrence of erroneous operation, such as incorrect mode setting against the operator's intention, which is made due to the misidentification of a normal document image as a part of mode-designating mark image.

The operator sets a color or colors of a frame to be handwritten to designate a region, an edit function to be assigned thereto, and parameters of the function on the marking sheet 204 with a color pen or a marker similar to the color pen (none is shown). As a simplest case, for example, assume that frame-in red copying is desired to be performed for the free-shape region of the input document (or its equally-magnified copy) 200. In this case, the operator (1) paints the marking box 206a in order to designate a free-shape-frame detection mode, (2) paints the marking box 206c in order to designate a frame-in reddening mode, (3) paints with red one of the marking boxes 206f labeled as "Frame Color" in order to set red as a color to be used in a region designating frame, and (4) paints with red one of the marking boxes 206g labeled as "Output Color" in order to set red as a color after printing of an image portion designated as the region. In this manner, when a red free-shape frame is directly handwritten on the input image 200, a function of color-copying only the frame-in image region with red and normally copying the remaining portion is registered on the marking sheet 204. The marking sheet 204 marked as described above is optically read by the scanner of the image input unit 12. The read data is processed by the color converter 14, the color identifier 34, and the integrator 36 and then stored as a color frame-edit function assignment correspondence table in the function memory 118 under the control of the CPU 40.

It should be noted that the frame color-edit function correspondence information designated and registered as described above is held in the function memory 118 until a reset switch (not shown) arranged on the control panel 116 is depressed or a predetermined time elapses. With such an arrangement, another operator can easily register another frame color-edit function assignment correspondence information.

1. Color-Edit Reproduction of Input Image 1-a. Color-Copying of Input Image

Figure 11A:
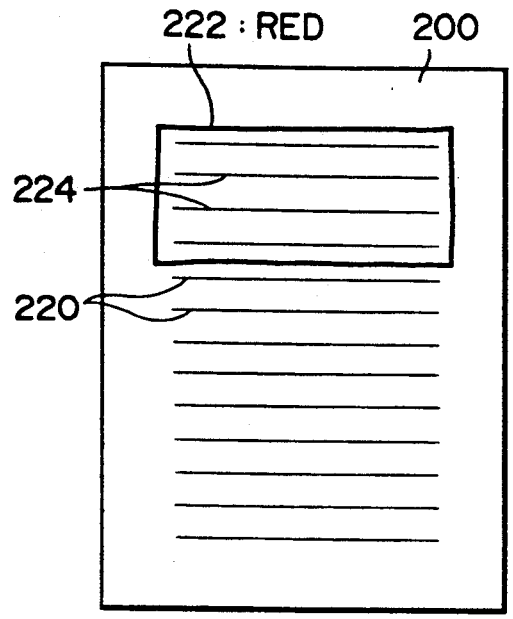
FIGS. 11A to 11D are plan views showing paper documents to be color-edited/copied, on which various color frames are handwritten by an operator.

FIG. 11A shows an example of an input document in which a region designation frame is written by an operator. The input paper document 200 has a character image 220. A desired rectangular frame region 222, for example, is handwritten in red ink in the document 200. A character image 224 surrounded by L-shaped marks 222 is a region to be color-copied in red in accordance with the example presented above.

The input document 200 is read by the color image scanner of the image input unit 12 to obtain a read image signal. This image signal is (1) converted into ink amount signals Y, M, C, and K by the color conversion circuit 14 and (2) converted into a color code signal Dc by the color identifier 34 and the integrator 36. The color frame pattern detector 38 detects four corners of the frame 222 and extracts a code signal of an image portion in the red frame 222 from the color code signal Dc, thereby specifying the frame-in character image region 224. A color frame-in code signal Scf output from the detector 38 is supplied to the color editor 110. The color editor 110 executes red-coloring processing for the frame-in character image region 224.

More specifically, in the circuit arrangement of the image editor 110 shown in FIG. 6, the switch circuit 128 is changed over to connect a transmission line of an image signal Sim to the first input of the AND circuit 130. In response to the frame-in code signal Scf, the color assign table circuit 126 generates an output signal for designate a mixing ratio of color inks Y, M, and C suitable for color printing in the printer 114. The AND circuits 130 adds the output signal of circuit 126 and the image signal SiM. An output signal from the AND circuit is supplied to the color-edit mode terminal 124d of the signal selector 122. Under such conditions, the image quality improving circuit 32 is supplied with a black ink amount signal K common for the color ink amount signals Y, M, and C from the color converter 14. Therefore, while a color ink component Y is printed, for example, an addition result between a density ratio of this ink component and the black ink amount signal is obtained. If no ink components are present in the coloring processing, printing is not performed. A color frame signal component is removed from the image signal output from the image quality improving circuit 32. After printing of each of the color inks is completed, black ink is printed. That is, the region 224 designated by the frame 222 in the input image document 200 shown in FIG. 11A is printed in the designated color (red); the other normal character image portion is printed in black.

1-b. Frame-In Paint-Copying of Input Image

Figure 10B:
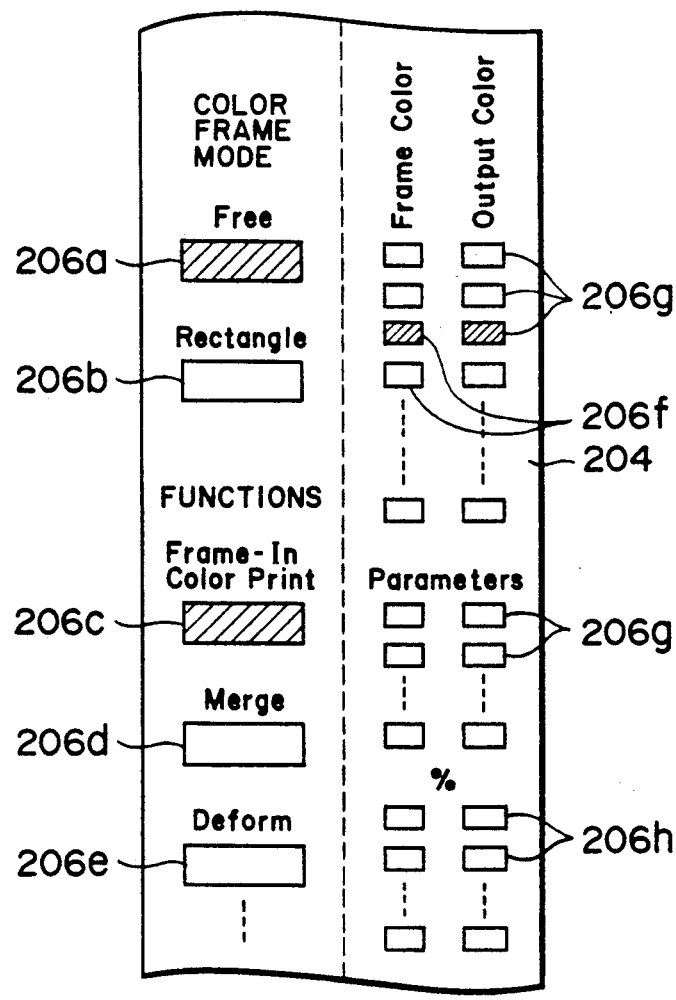
FIG. 10B is an enlarged plan view showing a main part of a band-like edit function designating marking attached to the paper document shown in FIG. 10A.
Figure 11B:
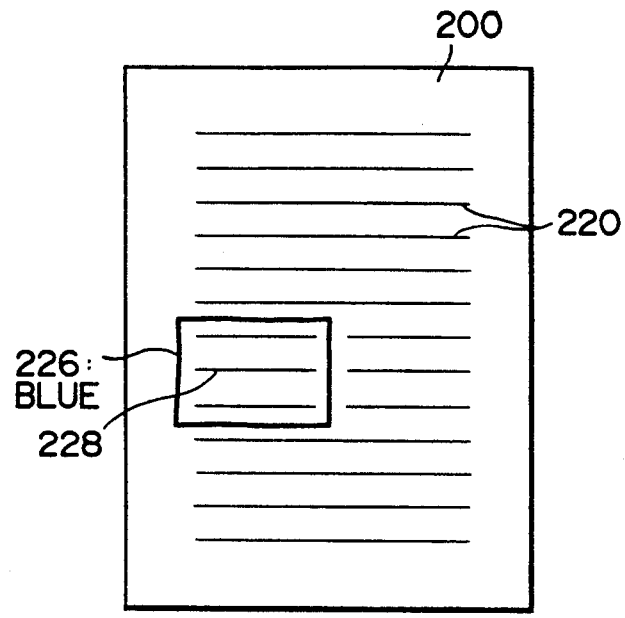

In order to paint only a desired character region in a desired color in the monochromatic paper document 200, an operator handwrites a rectangular color frame 226 on the document 200 by a pen of an arbitrary color, e.g., blue as shown in FIG. 11B. In this case, an edit function is designated by using the marking sheet 204 shown in FIGS. 10A and 10B in the same manner as described above. Registered correlation data between a color to be used in a frame, a color edit function, and its edit parameters is additionally stored in the function memory 118 under the control of the CPU 40. That is, when a blue color frame is detected in an input document image, processing condition information representing that the frame-in image region is automatically color-painted/copied is registered in the copying machine 10.

The image signal read by the image input unit 12 is converted into color ink amount signals Y, M, and C by the color converter 14 and converted into a color code signal by the color identifier 34 and the integrator 36 as described above. On the basis of the color code signal, the color frame pattern detector 38 detects a frame-in character image region (in this embodiment, the region is surrounded by a blue frame 226 as shown in FIG. 11B) 228 from the input image. The color editor 110 paints a background of the detected frame-in character image region 228 in a desired color (the character image is kept black).

At this time, in the circuit arrangement of the image editor 110 shown in FIG. 6, the color assign table circuit 126 generates an output signal for designating a mixing ratio of color inks Y, M, and C suitable for color printing in the printer 114 in response to the frame-in code signal Scf. This signal is supplied to the painting mode terminal 124e of the signal selector 122, whereas the image signal supplied from the image quality improving circuit 32 is supplied to the normal image terminal 124a of the signal selector 122. The signal selector 122 selectively outputs these signals in such a manner that the painting mode terminal 124e is selected when a color ink image component is to be printed and the normal image output terminal 124a is selected when a black ink component is to be printed. As a result, a white background of the region 228 designated by the blue frame 226 in the input image document 200 shown in FIG. 11B is printed in the designated color, while the character image of the region is printed black. Normal monochromatic copying is performed in the remaining image region.

1-c. Partial Copying of Input Image

Figure 11C:
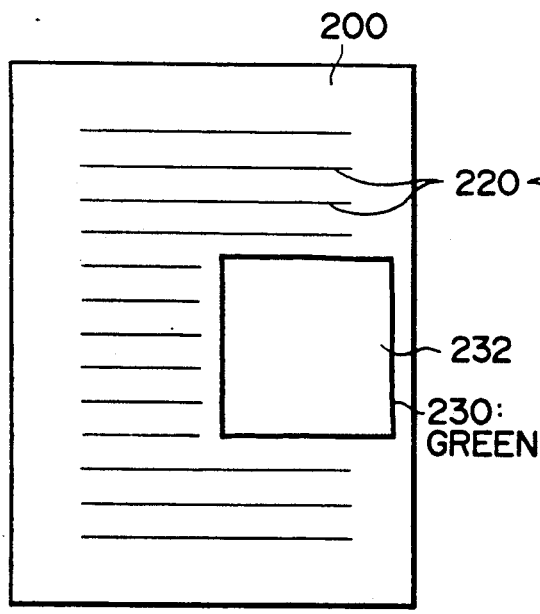

In order to perform masking copying in which a character image in a certain region of the input image 200 is erased and then copying is performed, for example, an operator handwrites a rectangular color frame 230 on the document 200 with a pen of an arbitrary color, e.g., green as shown in FIG. 11C. In this case, an edit function is designated by using the marking sheet 204 shown in FIGS. 10A and 10B in the same manner as described above. Registered correlation data between a color to be used in a frame, a color edit function, and its edit parameters is additionally stored in the function memory 118 under the control of the CPU 40. That is, when a green color frame is detected in an input document image, processing condition information representing that the frame-in image region is automatically masked/edited is registered in the copying machine 10.

When a masking copying mode is set, the color editor 110 converts an output signal from the color assign table circuit 126, corresponding to only a green frame-in region 232 detected by the color frame pattern detector 38, into a white printing code representing non-printing. Therefore, by adding the output signal from the color assign table circuit 126 and an image signal Sim by the AND circuit 130 (see FIG. 6), printing can be inhibited for only the input image region designated by the color frame 230. Trimming copying is opposite to masking copying; signal processing in trimming printing is substantially similar to that described above except that the color editor 110 converts an output signal from the color assign table circuit 126, corresponding to the remaining image region 220 other than a color frame-in region detected by the color frame pattern detector 38, into a white printing code representing non-printing.

1-d. Change-Scale Copying of Input Image

Figure 11D:
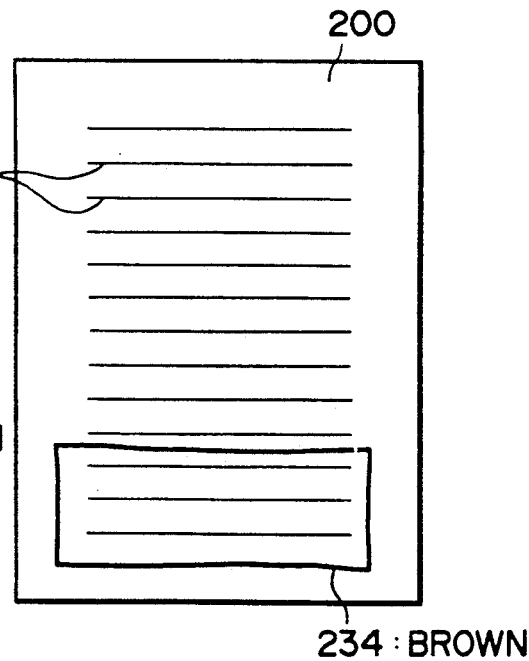

In order to copy a desired character region in a different scale (magnifying/reduced scale), an operator handwrites a color frame 234 on the document 200 with a pen of an arbitrary color, e.g., brown as shown in FIG. 11D. In this case, an edit function is designated by using the marking sheet 204 shown in FIGS. 10A and 10B in the same manner as described above. Registered correlation data between a color to be used in a frame, an edit function, and its edit parameters is additionally stored in the function memory 118 under the control of the CPU 40. That is, when a brown color frame is detected in an input document image, processing condition information representing that the frame-in image region is automatically reproduced in a selected scale is registered in the copying machine 10. A detection operation of the color frame 234 is similar to that in the edit mode described above, and a magnifying/reducing operation of an input image is similar to that in a conventional copying machine.

It should be noted that the respective edit mode have been independently described above; however, two or more different edit functions can be simultaneously executed. In this case, different edit functions for different colors may be simultaneously marking-registered on the marking sheet 204 shown in FIG. 10B. The registration result is stored in the function memory 118 in the same manner as described above.

2. Merging Synthetic Edit Reproduction between Input Images

Figure 12:
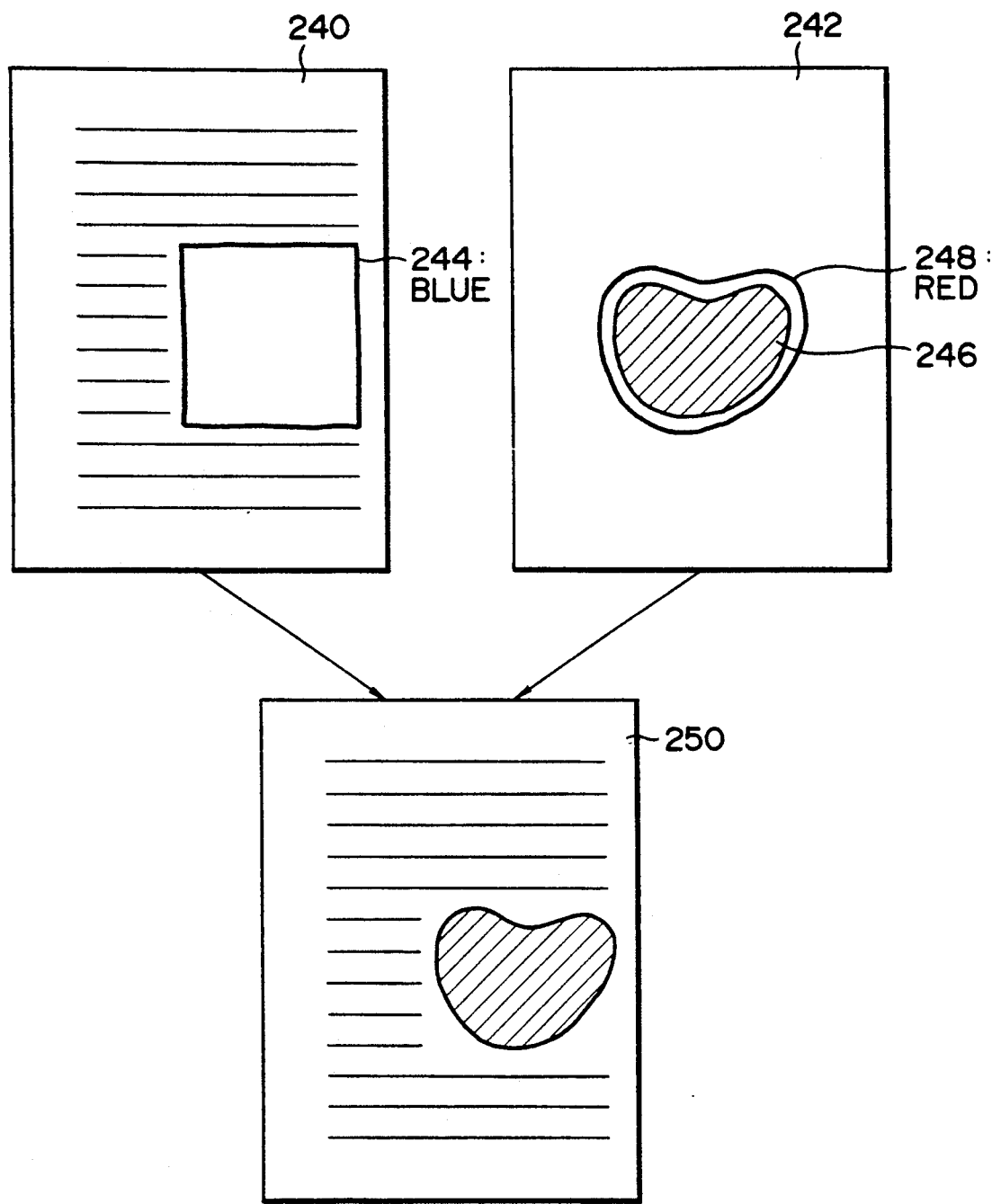
FIG. 12 is a plan view showing paper documents to be color-edited/copied, on which various color frames for designating image synthetic copying are handwritten by an operator, and their copied product.

FIG. 12 shows an example of image merging between two paper documents 240 and 242. In this example, an image region surrounded by a color frame 244 handwritten by an operator is synthesized with a color image component 246 surrounded by a color frame 248 prepared and handwritten on the other paper 242. The image 246 is referred to as a "source image" hereinafter; and the document paper 240 is referred to as a "target document". The paper 242 is white paper, and the source image 246 is adhered thereon. Designation of an edit function desired by the operator, i.e., registration of a basic edit function representing "if regions surrounded by designated color frames are present in different input images, they are synthesized and reproduced" and its edit parameters (e.g., equal-scale synthesis, change-scale synthesis, or a change-scale ratio in change-scale synthesis) are performed by using the marking sheet 204 shown in FIGS. 10A and 10B as described above.

More specifically, in order to register a free-shape frame detection mode in the copying machine 10, a warm color such as red, redish purple, or orange is used; in order to register a rectangular frame detection mode, a cold color such as blue or bluish purple is used. In this example, blue is used in the color frame 244 for designating a merging region of the target document 240, whereas red is used in the color frame 248 for designating the source image component 246. Such color designation information is read as edit function assign information by the image input unit 12 and stored in the function memory 118 as described above.

An operation will be described below with reference to also flowcharts shown in FIGS. 13A and 13B. First, the operator depresses a synthetic reproduction key (not shown) provided on the control panel 116 to set the input images 240 and 242 on the scanner of the image input unit 12. The CPU 40 checks an operation state on the control panel 116 set by the operator at step S1. At step 2, whether the merging synthetic mode is selected on the control panel 116 is checked. At step S3, whether the circumscribed-quadrilateral frame mode is selected on the control panel 116 is checked. If it is determined at step S3 that the circumscribed-quadrilateral frame mode is selected on the control panel 116, the mode is set in accordance with the designation (step S4). If the circumscribed-quadrilateral frame mode is not selected on the control panel 116 at step S3, a standard color-frame-priority merging synthetic mode is set (step S6). Subsequently, at step S7, whether a copy start button (not shown) is depressed on the control panel 116 is checked. If copy start is designated, the image input unit 12 starts scanning/reading the target document 240 and the source image 242.

When the target document 240 is read, the CPU 40 automatically sets the copying machine 10 in the rectangular frame detection mode in accordance with color information of the color frame 244 registered in the memory 116. The color frame pattern detector 38 detects the color frame 244 of the target document 240 and specifies the merging region (step S8). In order to read the input image 242, the scanner of the image input unit 12 scans the source image 246 and the color frame 248 along its main scanning direction. Of the read image signal, a portion in which a color frame code is first produced is determined to be a color frame. The CPU 40 checks whether the color code is of a warm or cold color (steps S9 and S10). When the warm color code is determined, the copying machine 10 is automatically set in the free frame detection mode (step S11). When the cold color code is determined, the copying machine 10 is automatically set in the rectangular detection mode (step S12). When a color code image is detected from the input image 242 which is sequentially read, the source image 246 is determined to be a color image.

Figure 13B:
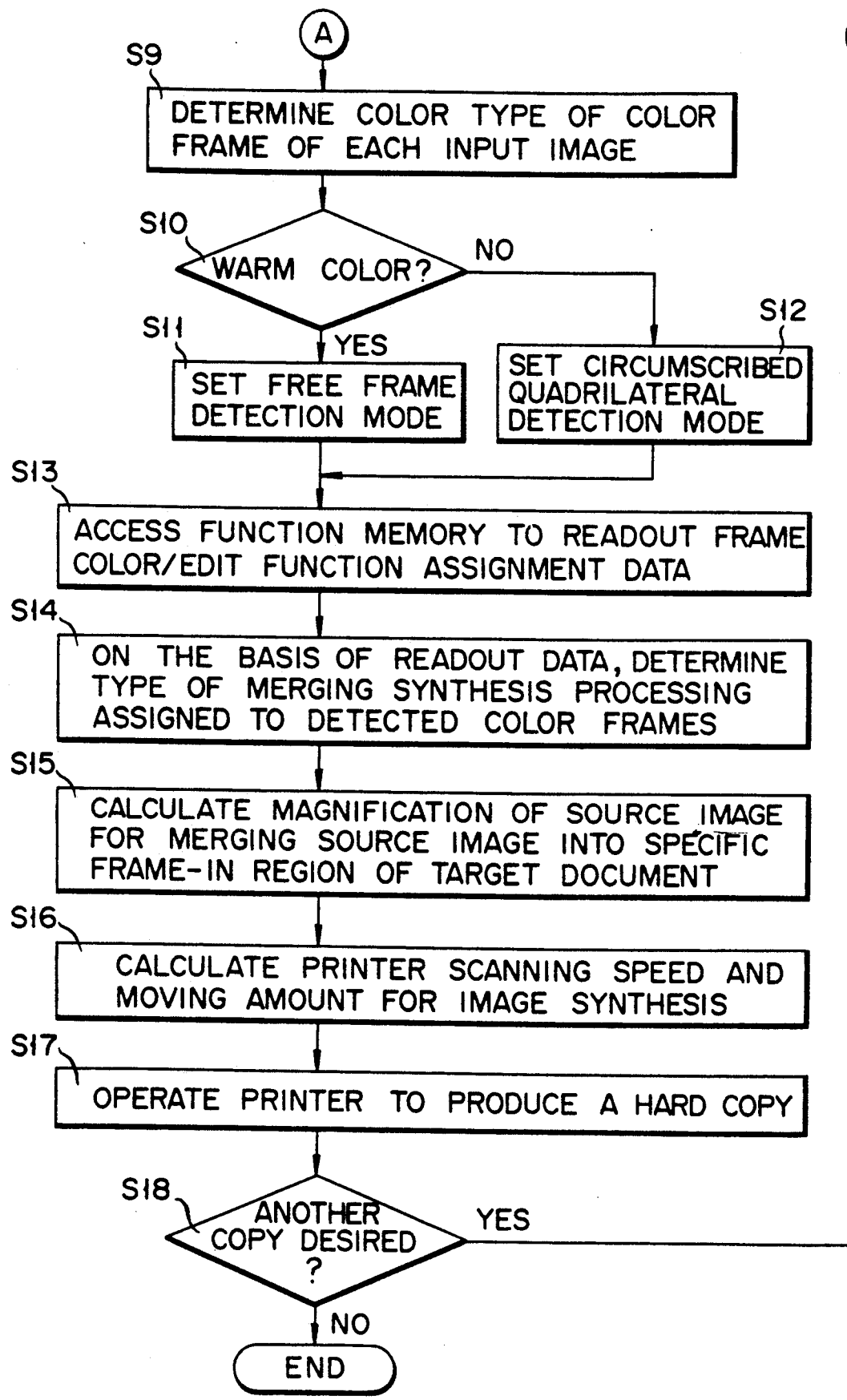

As shown in FIG. 13B, at step S13, the CPU 40 accesses the function memory 118 and reads out frame color/edit function assign data registered therein. At step S14, on the basis of the readout data, the CPU 40 determines a type and parameters of merging synthetic processing assigned to the color frame detected on each of the input images 240 and 242. Thereafter, actual reproduction processing is executed in accordance with the determination result. That is, at step S15, in order to properly merge and synthesize the source image 246 in the designated frame-in region 244 of the target document 240, a magnification for magnifying/reducing the source image 246 is calculated. At step S16, a printing operation speed and an actual moving amount of the printing unit 114 are calculated. Thereafter, at step S17, the printer 114 becomes operative and generates a synthetic hard copy 250. As shown in FIG. 12, in the hard copy 250, the normally color-copied image component 246 is merged in the designated merging region 244 of the target document 240. Finally, at step S18, whether image merging synthetic reproduction is desired for other input images in the same edit function set state by the operator is checked. If Y (YES) at step S18, the flow returns to step S7 shown in FIG. 13A. If N (NO) at step S18, the merging synthetic reproduction operation is ended.

Figure 14:
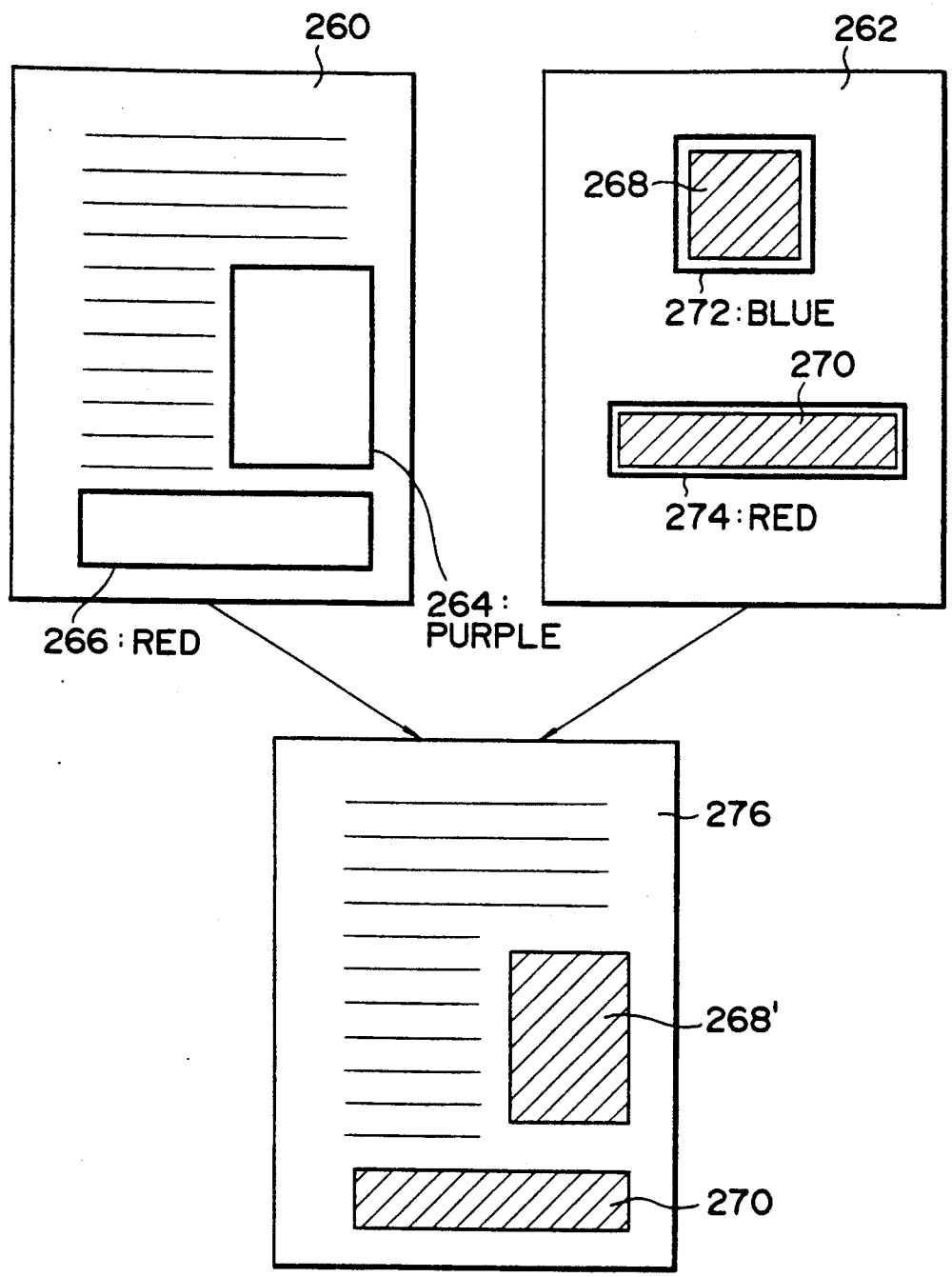
FIG. 14 is a plan view of paper documents to be color-edited/copied, on which various color frames for designating image synthetic copying are handwritten by an operator, and their copied product.

FIG. 14 shows another example of image merging between two paper documents 260 and 262. In this example, image regions surrounded by rectangular color frames 264 and 266 handwritten by an operator are synthesized with first and second color image components 268 and 270 surrounded by rectangular color frames 272 and 274 handwritten by the operator on the other paper 262. The paper 262 is white paper, and the source images 268 and 270 are adhered thereon. In this case, registration of a synthetic edit function and its edit parameters (e.g., equal-scale synthesis, change-scale synthesis, or magnification of change-scale synthesis) is executed by using the marking sheet 204 shown in FIGS. 10A and 10B as described above.

According to this example, the first source image 268 is reproduced in different scales independently in vertical and horizontal directions and synthesized in the rectangular region 264 of the target document 260, whereas the second source image 270 is reproduced (copied) in an equal scale in the rectangular region 266 of the target document 260. In this case, assignment between a frame color and an edit function is performed as follows. The color frame 272 for designating the first source image 268 is of the same color type (either a warm or cold color type) as the color frame 264 for designating the merging region of the target document 260; e.g., the color frame 264 is of bluish purple, and the color frame 272 is of blue. The color frame 274 for designating the second source image 270 is of the same color as the color frame 266 for designating the merging region of the target document 260, e.g., red. In this example, since a free-shape frame is not used at all in edit copying, the copying machine 10 is simply set in the rectangular detection mode. This mode setting may be performed by a predetermined key operation on the control panel 118 or by registering designation representing this mode setting on the marking sheet 204.

The source image 270 and the target document region 266 which are designated to be the same color are subjected to the similar edit processing under the control of the CPU 40, and the source image 270 is synthesized with the target region 266 on the reproduced image paper 276. As for the source image 268 and the target document region 264 which are designated to be the same color type, a maximum size of the target region 264 and an actual size of the source image 268 are detected on the basis of the stored contents in the run code memory 68 (see FIG. 4). The CPU 40 calculates a magnification and a moving amount capable of precisely fitting the source image 268 in the target region 264. The calculation result is supplied to the image processor 112. Therefore, the reproduction result output from the color printer 114 becomes a change-scale reproduced image 268' as shown in FIG. 14.

3. Other Edit Reproduction of Input Image

The color copy processing concept of the present invention in which a basic edit function and its edit parameters are automatically set on the basis of color information assigned to color frames handwritten on an input image can be applied to various specially edited copies other than those described above.

For example, as shown in FIG. 15A, in order to modify and copy a selected image component on an input document 282, e.g., an English character "H" image pattern 280, an operator operates the control panel 116 to designate a modification reproduction mode and handwrites a color mark 284 for designating a modified pattern on the input document 282. In this example, the color mark 284 is a line segment mark for designating inclination for converting vertical lines of the "H" image 280 into oblique lines. A color of the color mark 284 can be arbitrarily selected by the operator, e.g., the color mark 284 may be an orange line segment. In this case, a relationship between orange information and a modification copy edit function is registered by using the marking sheet 204 as shown in FIG. 10B and stored in the function memory 118 as described above. When the input document 282 as described above is read by the image input unit 12, the circuit 38 detects the color mark 284 from the input image, and the "H" image 280 is modified and printed by the image processor 112, thereby obtaining a hard copy 286 shown in FIG. 15B, which has an italic letter "H" image 288.

The present invention is also effective in reproduction in which only a predetermined image region of an input image is subjected to image quality improving processing (e.g., gamma characteristic change or spatial frequency designation change). In this case, in order to designate a region of an input image to be subjected to image quality conversion, an operator handwrites a frame with a color pen of an arbitrary color. In this case, edit function designation is performed by using the marking sheet 204 shown in FIGS. 10A and 10B in the same manner as described above. Registered correlation data between a color to be used in a frame, an image quality improving image processing function, and its parameters are additionally stored in the function memory 118 under the control of the CPU 40. That is, processing condition information is registered in the copying machine 10, which information represents that if a color frame of a designated color is detected in an input document image, the frame-in image region is automatically subjected to image quality improving processing of a designated type and is reproduced.

According to the automatic editing color copying machine 10 of the embodiment of the present invention described above, execution function designation information for a color edit function desired by an operator, its edit parameters, and a priority order between the parameters is automatically specified upon reproduction execution on the basis of color information of color frames handwritten on input image paper. Therefore, the operator can be free from a cumbersome operation of frequently depressed keys on the control panel 116. This enables rapid and efficient edit copy processing.

Assignment between colors to be used in color frames and execution designation information about the desired color edit function, its edit parameters and a priority order between the parameters is manually performed on the marking sheet 204 shown in FIG. 10B by the operator, and the assignment data is stored and registered in the function memory 118. In order to actually perform edit reproduction, the CPU 40 accesses the frame color/edit function correspondence data in the memory 118 and automatically determines a color frame-in region to be processed and the type and degree of editing to be executed for the region. Therefore, until the stored contents in the function memory 118 are updated, the operator can repeatedly execute the same edit reproduction for input images having different designated regions. This largely contributes to promotion of rapid and efficient edit copy processing.

The main structure for performing actual image processing of the above color edit copying machine 10 (i.e., the series-connected component of the circuits 12, 14, 32, 110, and 114) may be modified as shown in FIG. 16 in order to copy images such as a graphic pattern or color graph generated by a computer-aided design (CAD) (generally called a "multicolor image").

As shown in FIG. 16, an image input unit 300 includes a color scanner as in the embodiment shown in FIG. 1. The image input unit 300 is connected to a color code converter 302. The color code converter 302 is connected to a high-frequency emphasis processor 304 for emphasizing a high-frequency component of an input image signal. An output signal from the image input unit 300 is supplied to the color code converter 302 and also allowed to be directly supplied to the high-frequency emphasis processor 304 by a signal line 305. The high-frequency emphasis processor 304 is connected to an image printing unit 312 via a color region integrator 306, a color editor 308, and an ink-amount signal converter 310. The image printing unit 312 includes a color printer.

The image input unit 300 includes, e.g., a known color line image sensor (not shown), which moves in a direction (to be referred to as a "sub-scanning direction" hereinafter) perpendicular to its longitudinal direction (to be referred to as a "main scanning direction" hereinafter) and scans an input image to read every line image information of the input image, thereby generating an analog raster scan signal. This raster scan signal is subjected to analog-to-digital conversion and shading correction to obtain a digital RGB image signal. The shading correction processing is executed to compensate for variations in gains or offsets in elements of the line sensor and to correct a white balance of the RGB signal. As a result, the read image signal is normalized to have a "0" level in a black pixel and a "1" level in a white pixel. It should be noted that the longitudinal direction of the color line image sensor is called a "main scanning direction"; and the moving direction of the image sensor is called a "sub-scanning direction".

The color code converter 302 converts the RGB image signal into a color code signal which is, e.g., a 7-bit code signal wherein input image color codes correspond to 128 types of colors. This number of bits may be insufficient in reproduction of a continuous-tone image such as a natural image but is sufficient in reproduction of a multicolor image which is an object to be copied in this embodiment. Color code conversion is performed by using a known look-up table (may be referred to as an "LUT" hereinafter). In this case, by performing a matrix conversion and/or color correct calculation before the look-up table is accessed, a color space can be properly modified to increase conversion efficiency.

Figure 17A:
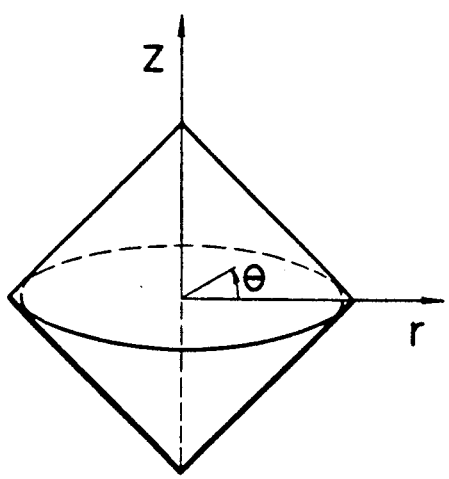
FIGS. 17A to 17C are diagrams showing a color space used in a color code converter shown in FIG. 16.
Figure 17B:
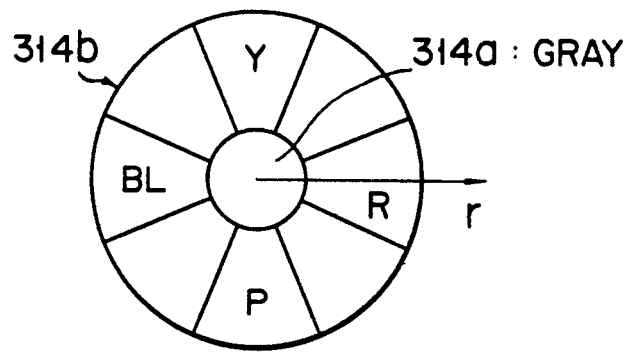
Figure 17C:
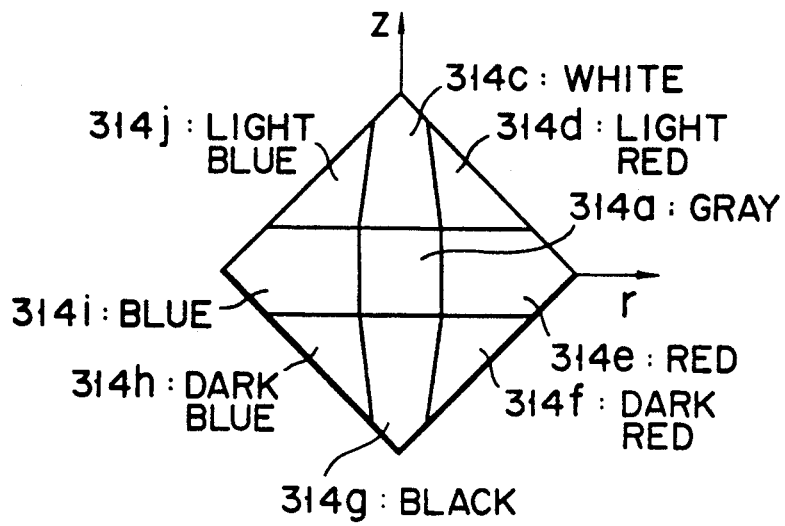

Color codes need not be uniformly divided and assigned on a color space. For example, when the color space is a cylindrical coordinate type LAB space in which its z, r, and θ axes represent luminance, saturation, and hue, respectively, as shown in FIG. 17A, examples of color assignment on a horizontal plane perpendicular to the z axis and a vertical plane including the r and z axes are shown in FIGS. 17B and 17C, respectively. More specifically, on the horizontal plane as shown in FIG. 17B, gray is assigned to a central region 314a, and its annular peripheral region 314b is divided into, e.g., eight portions. In FIG. 17B, reference symbols "Y", "R", "P", and "BL" represent yellow, red, purple, and blue, respectively. On the vertical plane in the LAB space as shown in FIG. 17C, around a central region 314a to which gray is assigned, a white region 314c, a light red region 314d, a red region 314e, a dark red region 314f, a black region 314g, a dark blue region 314h, a blue region 314i, and a light blue region 314j are defined. With such a color assignment, the number of divided colors in the hue direction is larger than those in the luminance and saturation directions.

The color code conversion processing by the color code converter 302 is also effective for an image component written with a color fluorescent pen included in an input image. Generally, presently available color fluorescent inks are limited in number, colors of a fluorescent pen are assigned with codes different from corresponding normal inks. Therefore, an image component written in fluorescent ink in a multicolor image written in fluorescent ink can be effectively distinguished from other image components written in normal ink.

The color code signal does not always faithfully reproduce a document color image of an input document. Generally, an undesired intermediate color is often appears in an edge portion or a color lighter than an actual color code is often generated in a thin line image portion such as a character due to incomplete reading of an edge of a contour portion of an input image. Such phenomena lead to mixing of color noise into a color code signal or partial erasure/flattening of a line image. In order to remove such problems, the high-frequency emphasis unit 304 emphasizes an edge of a read input image, and the color region integrator 306 performs integration processing for a color region to delete an insignificant color region included in the read input image.

The high-frequency emphasis processor 304 extracts high-frequency information of a document image and corrects the color code signal output from the color code converter 302 in accordance with the extracted high-frequency information in such a manner that contour edges of the input image are properly emphasized. As shown in FIG. 18, the processor 304 receives a color image signal 320 as an output signal from the image input unit 300 and a color code signal 322 as an output signal from the color code converter 302. A luminance calculator 324 calculates the luminance of the input image in response to the color image signal 320. The luminance calculator 324 includes, e.g., an adder (not shown) which calculates an addition average of RGB signals and generates a luminance signal 326. The luminance signal 326 is supplied to a Laplacian filter circuit 328. The Laplacian filter circuit 328 filters the luminance signal 326 to generate a high-frequency signal 330 wherein its U-shaped portion has a positive polarity and its inverted U-shaped portion has a negative polarity. The high-frequency signal 330 is supplied to a high-frequency corrector 332 incorporating a look-up table.

The high-frequency corrector 332 performs high-frequency correction processing for the color code signal 322 by using the high-frequency signal 330, thereby generating a high-frequency-corrected color code signal 334.

As indicated by solid lines 340 shown in FIG. 19, when the high-frequency signal 330 is positive, the high-frequency corrector 332 corrects the color code signal 322 such that the luminance is decreased and the saturation is increased in the color space. When the high-frequency signal 330 is negative, the high-frequency corrector 332 corrects the color code signal 322 such that both the luminance and the saturation are increased in the color space, as indicated by broken lines 342 in FIG. 19. The look-up table incorporated in the high-frequency corrector 332 has five quantization levels divided by four threshold values, i.e., (1) the absolute value is large and positive, (2) small and positive, (3) almost zero, (4) small and negative, and (5) large and negative. The high-frequency corrector 332 quantizes the high-frequency signal 330 by using these quantization levels and performs the correction processing for the color code signal 322 supplied thereto by accessing the contents of the table. The table contents are predetermined on the basis of frequency response characteristics of sensing elements of the input image, frequency response characteristics of the Laplacian filter circuit 328, a conversion relation from a color signal to a luminance signal, and the like. With the above processing, the color code signal 322 is properly corrected into a luminance signal in accordance with the degree of a high-frequency component actually contained in the input image, thereby allowing the color code signal to faithfully reproduce a document color image of the input document.

Corrected color code signal 334 is subsequently subjected to removal of color blot and color noise by the color region integrator 306 (see FIG. 16). The integrator 306 performs a kind of labeling processing, i.e., discriminates a meaningful color region and a meaningless color region in the color code signal of the read input image. When a meaningless region is detected, the integrator 306 integrates it into a meaningful region. The "meaningful color region" is a color region having a comparatively large area on an input document and has a color difference of a predetermined level or more from adjacent regions. The color region integrator 306 utilizes this property to perform integration processing in accordance with the following manner:

(1) When two adjacent color regions (or pixels) are present on an input image and a color difference, i.e., a color distance in the color space between the regions is smaller than a first threshold value, the integrator 306 integrates the regions into one region (this integration processing is repeatedly executed until all of the color regions or pixels are completely processed);

(2) When two adjacent color regions are present in an input image and a color difference between the regions is smaller than a second reference threshold value and one of the region sizes is smaller than a predetermined threshold value, the smaller region is integrated into the larger region. In this case, the first color difference threshold value is determined on the basis of a color that men visually or commonly feel close or a color fluctuation degree caused by color variation. The second color difference threshold value is determined on the basis of a color change degree caused by noise mixing. The region size threshold value is determined on the basis of an average size of a color region produced by noise or defocus imaging.

In a normal multicolor image, regions smaller in color difference are rarely adjacent to each other. Each color region has meaningful information, and an isolated region which is small in size is rarely present. Therefore, by performing the above color region integration processing, a region having a small color difference and a small color region can be recognized as a color blot and color noise, respectively, and removed.

According to this embodiment, an image signal is dealt with a raster scan signal and processed realtime. For this reason, the color region integration processing for a current raster is performed by using a color code of the current raster, a color code of a previous raster already subjected to the color region integration processing, and a region level of the previous raster. The region level is a value representing the size of a color region. By sequentially supplying region level data along the sub-scanning direction of the image input unit 300, a rough size of the color region may be represented.

Figure 20A:
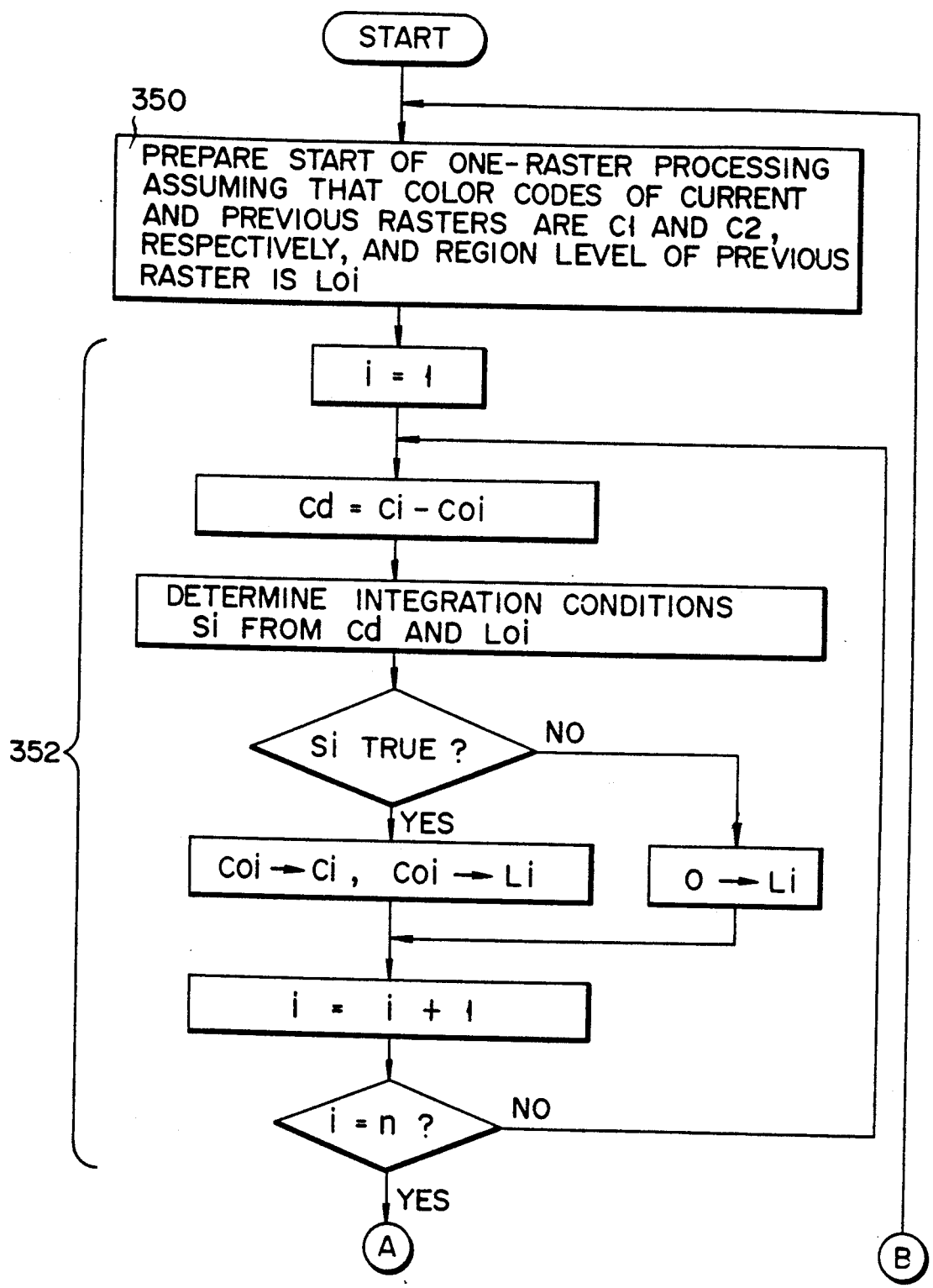
Figure 20C:
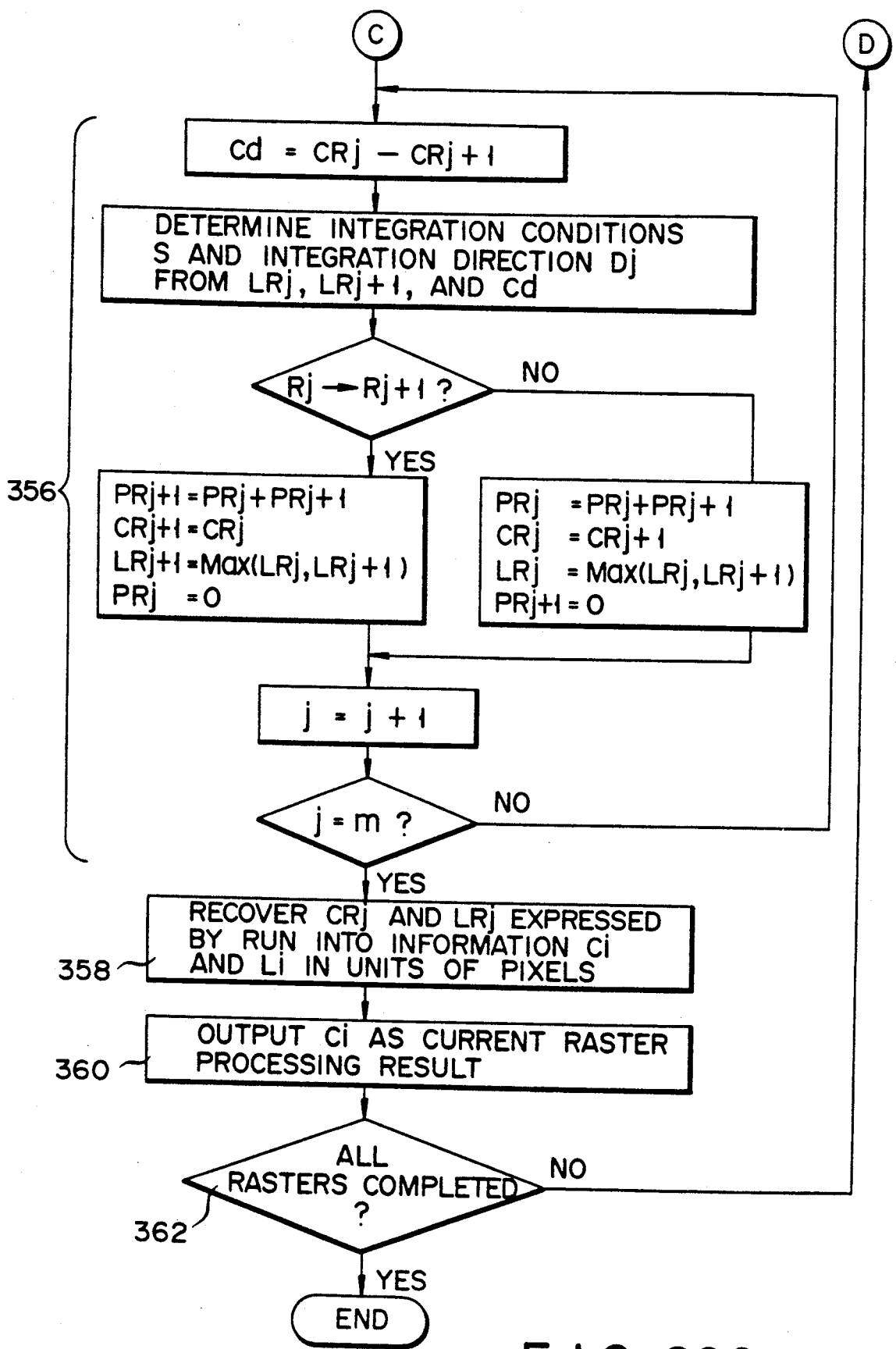

The integration processing performed by the color region integrator 306 is shown in detail in flowcharts of FIGS. 20A to 20C. At step 350, one-raster processing is prepared to be started assuming that a color code of an ith pixel of a current raster is a variable $C_i$, a color code (color integration result) of a previous raster is a variable $C0_i$, and a region level of the previous raster is a variable $L0_i$. At step 352, the color region integration processing in the subscanning direction is executed, wherein a pixel number i ranges from 0 to n (integer) and is sequentially incremented. The color code $C_i$ is compared with the previous raster color code $C0_i$ at the same main scanning position, thereby obtaining a color difference Cd therebetween. Subsequently, by using the color difference Cd and the previous raster region level $L0_i$, an integration condition $S_i$ in the sub-scanning direction is determined.

Subsequently, whether any of pixels of the current raster is present in the same region as that of the previous raster is checked on the basis of the integration reference. That is, the integration processing is executed for a pixel having a small color difference and a high region level; and the integration processing is not executed for a pixel having a large color difference and a low region level. This determination is performed by checking whether the integration condition is true. If YES is determined, the color code $C_i$ of the pixel is replaced with the previous raster color code $C0_i$, and the previous raster region level $L0_i$ is set as a current pixel region level $L_i$. As a result, pixels in the current raster contained in the same region as that of the previous region are integrated thereto. If the determination condition $S_i$ is not established, i.e., NO is determined, the current pixel code $C_i$ is not changed, and the region level $L_i$ is assigned to zero.

Subsequently, at step 354 in FIG. 20B, run formation processing is executed wherein a color region having the same color code continuously in the main scanning direction is called a "run". Assume that the jth run is Rj, its color code is CRj, its region level is LRj, and its run length is PRj (e.g., the number of pixels). The region level LRj is determined on the basis of a maximum value of a region level and a length (run length) of each of pixels constituting the run Rj. If the maximum value or run length of the region level is large, the run region level LRj is increased. If both of the maximum value and run length of the region level are small, the run region level LRj is decreased. Therefore, the run region level LRj has a value substantially corresponding to the size of the color region. An updated run region level is determined for the run Rj on the basis of PRj and LRj. The above processing is repeatedly executed for all the runs one-by-one.

Subsequently, as shown in FIG. 20C, at step 356, integration processing in the main scanning direction is executed wherein whether two adjacent runs are to be integrated is checked on the basis of a color difference therebetween, a region level, and a run length. If the integration conditions are satisfied, the integration processing is executed. More specifically, after a color difference Cd between two adjacent runs Rj and Rj+1 is calculated, the integration condition S and the integration direction Dj are determined on the basis of LRj, LRj+1, and Cd. In this case, the integration condition is substantially the same as the integration condition in the sub-scanning direction as described above. If the integration condition is true, integration direction detection is performed to check whether the integration direction Dj is "Rj+1→" or "Ri←Rj+1". If Dj="Rj→Rj+1", (1) the length PRj of the run Rj to be integrated is added to the length PRj+1 of the integrating run Rj+1, and the sum is set as the length of the integrating run Rj+1, (2) the color code CRj+1 of the run Rj+1 is set as the color code CRj, (3) the maximum value of both the run lengths is obtained and set as the region level of the integrating run Rj+1, and (4) the run Rj is deleted (PRj=0). On the other hand, if Dj="Rj←Rj+1", the parameters "j" and "j+1" are switched to perform processing opposite to the above processing. It should be noted that if the integration condition S is not true, i.e., the condition S is not established, attributes of the pixels are not changed at all. The above processing is repeatedly executed for all the runs in the same manner.

Subsequently, at step 358 in FIG. 20C, the color code CRj and the region level LRj represented in units of runs are converted (recovered) to the color code $C_i$ and the region level $L_i$ in units of pixels. At step 360, the color code $C_i$ is output as the color integration result of the current raster, thereby completing one-raster processing. The color integration result is used as a "previous raster processing result" in the next raster processing. At step 362, whether the raster processing is completely performed for one image is checked. If N is determined, the flow returns to step 356, and the above processing steps are repeatedly executed.

Figure 21:
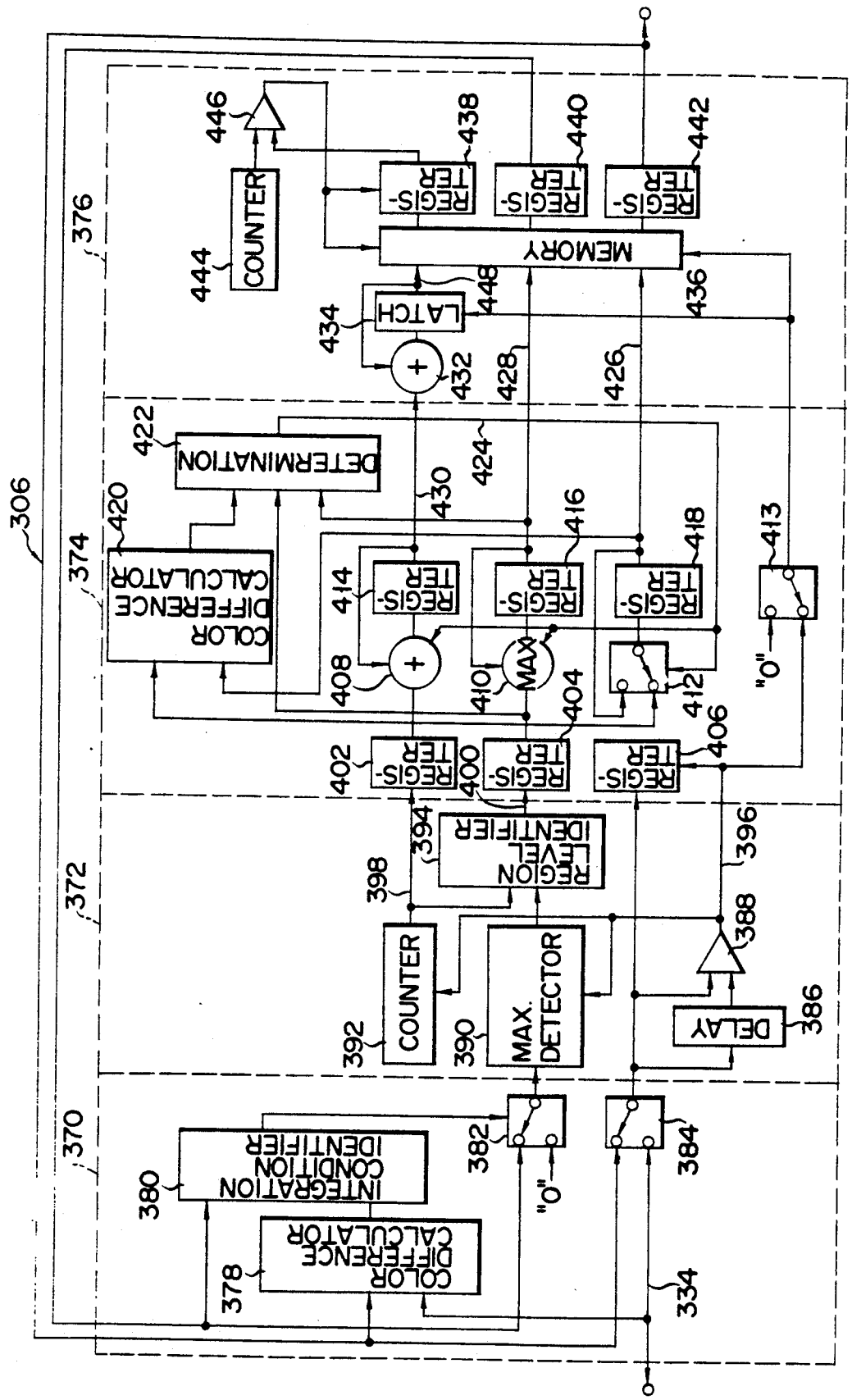
FIG. 21 is a diagram showing an internal circuit arrangement of the color region integration unit shown in FIG. 16.

As shown in FIG. 21, the color region integrator 306 may be constituted by a sub-scanning integration processor 370, a main scanning direction region generator 372, a main scanning direction integrator 374, and a pixel signal decoding circuit 376. The sub-scanning integrator 370 is for executing processing step 352 in FIG. 20A and realized by connecting a color difference calculator 378, an integration condition $S_i$ identifier 380, and switch circuits 382 and 384 as shown in FIG. 21. The color difference calculator 378 may include a look-up table. In response to the integration condition $S_i$ generated by the identifier 380, the switch circuits 382 and 384 function as selectors for selecting a color code signal and a region level signal. When the integration condition $S_i$ is true, the switch circuit 382 selects a color code and a region level of the previous raster; otherwise, the switch circuit 382 selects a color code and an initial value "0" of a region level of a current raster.

The main scanning direction region generator 372 is for generating a run Rj and is realized by connecting a delay circuit 386, a comparator 388, a maximum value detector 390, a counter 392, and a region level identifier 394 as shown in FIG. 21. The delay circuit 386 delays output signals from the signal selector 38 by one pixel. The comparator 388 compares pixel signals whose phases are shifted by one pixel and generates a run end point signal 396 which becomes true in a pixel in which a color code changes. When a pixel in which a color code changes, the counter 392 resets its count value in response to the run end point signal 396. An output signal 398 from the counter 392 therefore functions as a run length signal. The region level identifier 394 generates a region signal 400 representing an updated region level LRj in response to the output signals from the detector 390 and the counter 392.

The main scanning direction integrator 374 is for executing processing step 356 in FIG. 20C and is realized by connecting first-stage registers 402, 404, and 406, a run length adder 408, a maximum value detector 410, switch circuits 412 and 413, and second-stage registers 414, 416, and 418, a color difference calculator 420, and a main scanning direction integration condition determination circuit 422 as shown in FIG. 21. The color code signal 334, the run length signal 398, and the region level signal 400 of each run are stored in a corresponding pair of the first- and second-stage registers 402 to 418 in synchronism with the run end point signal 396. The color difference calculator 420 calculates a color difference between two adjacent runs in response to output signals from these registers. The determination circuit 422 receives the color difference signal thus obtained and region level signals from the runs and generates a main scanning direction integration signal 424. The circuits 408, 410, and 412 are controlled in response to the signal 424, thereby performing color integration of the runs. As a result, an integrated color code signal 426, an integrated color region signal 428, and an integrated run length signal 430 are generated.

The pixel signal decoding circuit 376 is for executing processing steps 358 and 360 in FIG. 20C and is constituted by connecting an adder 432, a latch circuit 434, a memory 436 having a two-line memory space, registers 438, 440, and 442, a counter 444, and a comparator 446 as shown in FIG. 21. The adder 432 accumulates the run length signals 430 and generates a run position signal 448 which represents end position coordinates in the main scanning direction of the run. The memory 436 stores the signals 426, 428, and 448 while sequentially incrementing its memory address, so that a color code, a region level, and run position data of each run Rj are written in the memory 436. In subsequent raster processing, the stored contents of the memory 436 are read out, and the readout data is temporarily stored in the registers 438, 440, and 442. The comparator 446 compares the count of the counter 444 with the run position signal 448 read out from the register 438. If the values are equal to each other, the stored contents at the next address of the memory 436 are read out. As a result, the registers 440 and 442 obtain the color code signals and the region level signals synchronized in units of pixels. Since the signals are delayed by one raster, they are fed back to the sub-scanning direction integrator 370 and used as signals of the previous raster. The memory has the two-line arrangement. Therefore, by alternately switching the two-line memory to data read access and data write access in units of rasters, conversion from a run to a pixel signal can be smoothly performed in continuous rasters without interruption.

Figure 22:
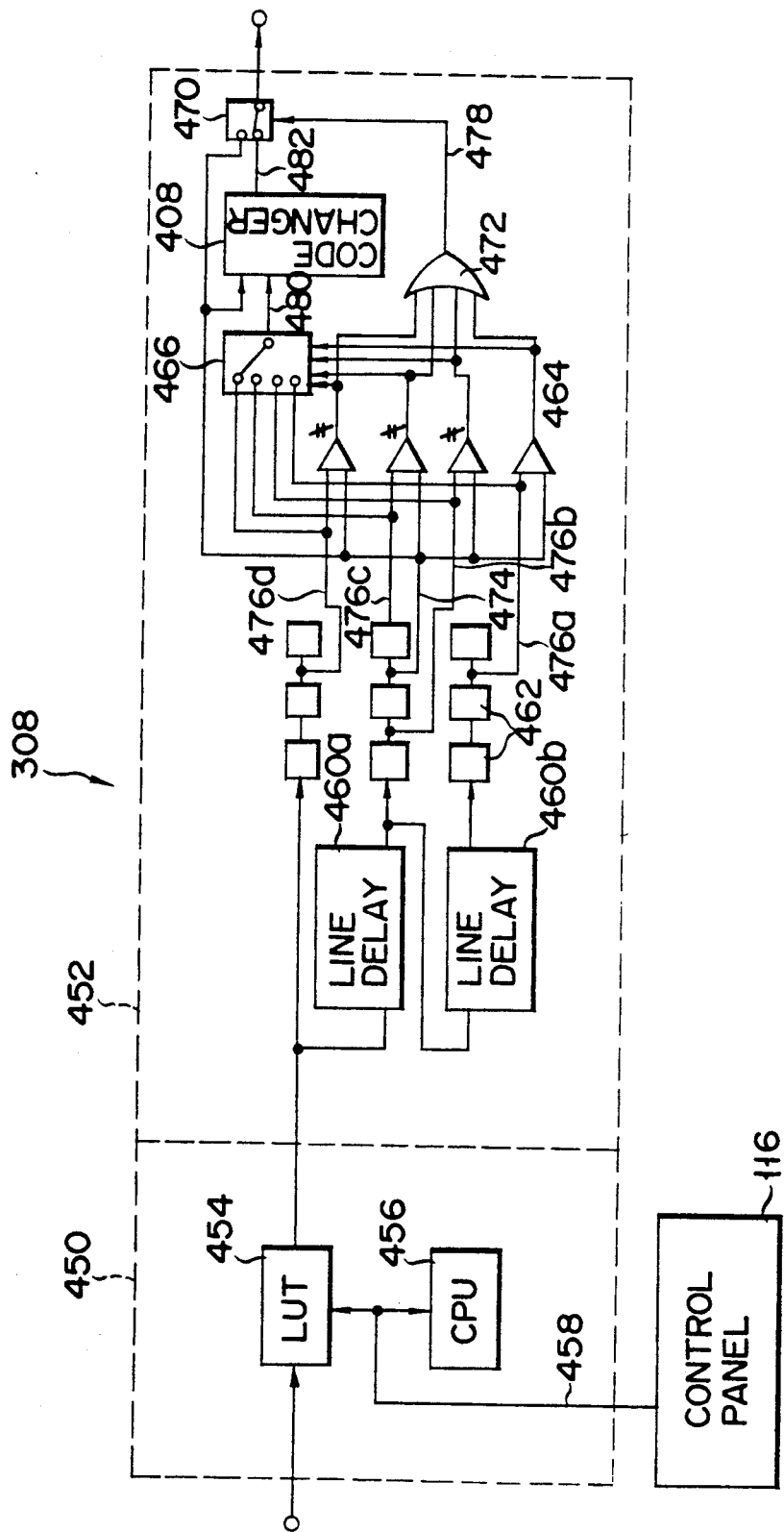
FIG. 22 is a diagram showing an internal circuit arrangement of a color editor shown in FIG. 16.

The code signal of the input image subjected to color blot correction in the above color region integration processing is supplied to a color editor 308 which executes not only a normal edit operation designated by an operator but also color change and/or image edge emphasis processing. As shown in FIG. 22, the color editor 308 includes a color changer 450 and an edge emphasis circuit 452. The color changer 450 has a look-up table circuit 454 and a CPU 456. The control panel 116 generates a signal 458 for designating color change by a manual operation by an operator, which is transmitted to the circuit 454 and the CPU 456. In response to the signal 458, the circuit 454 changes the color of the designated image region into the designated color. In this case, color region designation may be performed in the same manner as described above by using the sheet 204 shown in FIGS. 10A and 10B and the technique of directly writing the color frame as shown in FIGS. 11A to 11D on the input document.

The edge emphasis circuit 452 is for detecting adjacent pixels having different color codes to extract an image edge and is emphasizing its color change and constituted by two line delay circuits 460a and 460b, nine pixels delays 462 arranged to form a 3×3 matrix, comparators 464, a switch circuit 466, a color code changer 468, a switch circuit 470, and a 4-input OR gate 472. In the circuit 452, after the color code signal is delayed by the line delays 460 and the pixel delays 462, a color code signal 474 of a pixel of interest is compared with color code signals 476a to 476d of four peripheral pixels adjacent to the pixel of interest by the comparators 464. The OR gate 462 receives output signals from the comparators 464 and generates a logical output signal 478. At this time, in response to the comparison result of the comparators 464, the switch circuit 466 selectively outputs the color code signals 476a to 476d of the adjacent pixels. The changer 468 receives the color code signal 474 from the pixels of interest and an output signal 480 from the switch circuit 466 and executes color code change processing. In response to the output signal 478 from the OR gate 472, the switch circuit 470 selectively outputs one of the document color code signal 474 of the pixel of interest and the changed color code signal 480. With such an arrangement, the edge emphasis processing is embodied by a simple arrangement.

An output signal from the color editor 308 is supplied to an ink amount converter 310 which converts the edited color code signal into, e.g., ink amount signals Y, M, C, and BK of four colors by using an organized dither method or the like. As a result, the color printer 312 reproduces a color image having pseudo gradation.

If the color printer 312 is, e.g., a page sequential printing melt thermal transfer printer, assignment of the four color inks in the ink amount converter 310 is performed in such a manner that:

(1) for achromatic image components, only black ink is used and each of yellow Y, magenta M, and cyan C is zero; and (2) for chromatic image components, one of the color components Y, M, and C has an intermediate level between "0" and "1" levels, the remaining color components have "0" or "1" level, and the black ink is zero.

Figure 23:
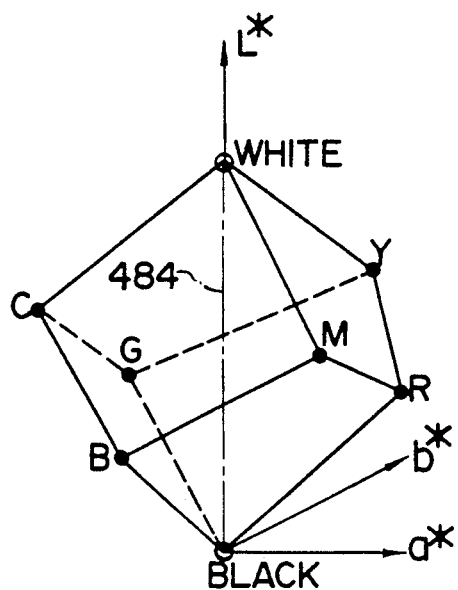
FIG. 23 is a diagram showing a color space model used in order to perform color assignment for a color printer shown in FIG. 16.

Such color assignment will be described below with reference to FIG. 23. In a color space model shown in FIG. 23, chain line 484 represents achromatic image components such as white, gray, and black. Black dots represent chromatic image components R, G, B, Y, M, and C. Colors present on the black dots and the ridge lines (indicated by thick lines) connecting the adjacent dots can be assigned. With such an arrangement, a color combination which tends to be unstable upon printing will not be assigned at all, and stable printing of a good color image can be promoted.

According to this embodiment having the above arrangement and operating as described above, even if a color blot or noise is mixed in the read color input image, colors of the image signal can be effectively corrected by performing the integration processing by the operation mode as shown in the flowcharts of FIGS. 20A and 20B. In addition, the circuit arrangement for this purpose is comparatively simple. Furthermore, since the color editor 308 additionally performs the color conversion and edge emphasis processing, reproduction quality of the color image can further be improved.

Figure 24:
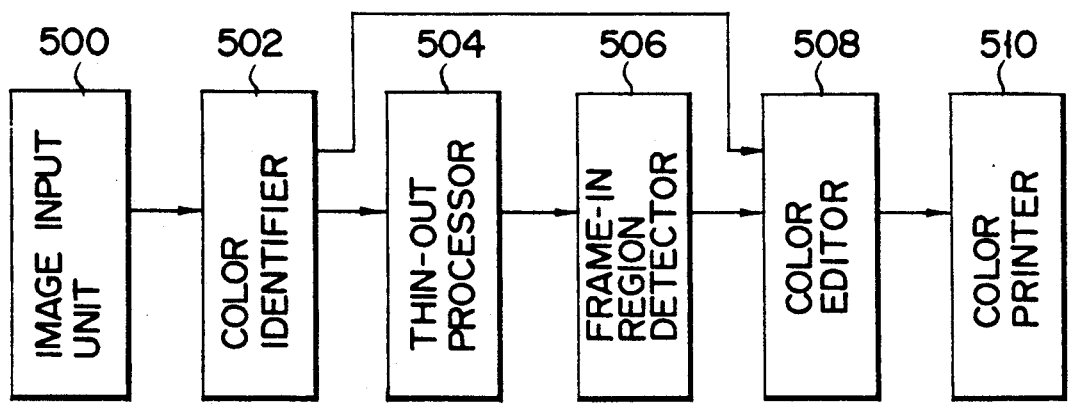
FIG. 24 is a block diagram showing a main part of an image signal processing apparatus according to still another embodiment of the present invention.

An image signal processing apparatus according to still another embodiment of the present invention is shown in FIG. 24, which includes a frame-in detection section suitably used in the color edit copying machine 10 described above. An image input unit 500 has substantially the same arrangement as that in the above embodiment and is connected to a color identifier 502. The color identifier 502 is connected to a color editor 508 via a pixel thin-out processor 504 and a frame-in region detector 506. The color identifier 502 is directly connected to the color editor 508. An output signal from the color editor 508 is supplied to and printed by a color printer 510. The color editor 508 and the color printer 510 have substantially the same arrangements as those in the above embodiment.

The color identifier 502 incorporates a look-up table (LUT) and identifies an achromatic document image and a color frame of an input document by using the LUT. When colors used in an input document are expressed in an Lab space (which is a pseudo three-dimensional space defined by three axes $a^*$, $b^*$, and $L^*$ perpendicular to each other), achromatic colors such as white, gray, and black are represented by dots distributed on an achromatic-color axis $L^*$ ($a = b = 0$) in the Lab space, which is divided as shown in FIGS. 25A and 25B, to thereby enable color identification. As shown in FIG. 25A, the Lab space is divided into six color regions of red (R), green (G), blue (B), yellow (Y), black (K), and white (W), wherein color signals of four colors, i.e., red, green, blue, and yellow represent color frames handwritten on the input document, and black represents a document image (character image) to be edited. The color identifier 502 represents a color determination result by a code and generates a color code signal. For example, in a color code signal to be supplied to thin-out processor 506, a code "0" is assigned to an achromatic color (i.e., black and white), and codes "1", "2", "3", and "4" are assigned to red, green, blue, and yellow, respectively. On the other hand, in a color code signal to be supplied to editor 508, color assignment may differ from the above case in that a code "1" is assigned to black, and a code "0" is assigned to the other colors. Although a color blot or noise is sometimes contained in a color-identified signal, they can be effectively removed by the color blot removing technique described in the above embodiment. An output signal from the color identifier 502 is supplied to the thin-out processor 504.

The thin-out processor 504 executes pixel thin-out processing in the main scanning direction for the identified frame color signal input thereto. This pixel thin-out processing is executed to reduce a calculation amount in the frame-in region detector 506 in a subsequent stage, thereby increasing a processing speed. In this embodiment, pixels aligned in the main scanning direction of the color frame signal are thinned out such that the total number thereof is reduced to $\frac{1}{4}$. In this case, the pixels are not simply, uniformly thinned out but thinned out so that chromatic pixels preferentially remain. For example, as shown in FIG. 26, if one chromatic pixel (e.g., red) is present in four neighboring pixels, this chromatic pixel is preferentially selected (see group A in FIG. 26), and the remaining pixels are omitted. If these four pixels are all achromatic pixels, they are simply thinned out in accordance with a uniform thin-out rule (see group B in FIG. 26). If four neighboring pixels contain two chromatic pixels B and G as in group C of FIG. 26 (this rarely happens normally), a pixel having a color most similar to that of a corresponding pixel of a previous array is selected from the chromatic pixels.

The color code signal upon thin-out processing is supplied to the frame-in region detector 506 which detects a color frame handwritten in an input image and identifies a designated frame-in region. A basic operation flow (algorithm) of frame-in region detection is shown in FIG. 27A; a raster K level determining step is shown in detail in FIG. 27B. Briefly, an attribute of either a background level or a frame level is given to each pixel of a current raster, and a level (i.e., a background or frame) of the current raster is determined on the basis of frame signals, frame levels, and background levels of all rasters adjacent to an original raster and a frame signal for the current raster, thereby checking whether the pixel belongs to the frame-in region or frame-out region. The processing is repeatedly executed in units of rasters, and a color frame region finally designated in the input image is detected.

First, as shown in FIG. 27A, at step 520, the 0th raster is arbitrarily set since no "previous raster" is present before the first raster. A frame level "0", i.e., the background level is given to the raster 0. Subsequently, at step 522, 1 is set in a raster number k. At step 524, level determination of the current raster k is performed. In this case, assume that a frame signal, a frame level, and a background level of the current raster are $P(x)$, $LF(x)$, and $LG(x)$, respectively, and a frame signal, a frame level, and a background level of the previous raster are $Po(x)$, $LFo(x)$, and $LGo(x)$, respectively. The frame signal is a binary signal of 0 or 1 in which 1 represents a frame and 0 represents a region other than the frame. "x" represents a position in the main scanning direction. After level determination of the raster k, determination of a frame-in and frame-out regions in an input image portion corresponding to the raster k is performed at step 526. Thereafter, at step 528, the raster number k is incremented by one. At step 530, whether all the rasters are completely processed is checked. If N at step 530, the flow returns to step 524.

The raster k level determining step will be described with reference to FIG. 27B. At step 540, the frame signal $P(x)$ of the current raster k is converted into a run expression. In this case, a series of region having the same signal value in each raster is called a "run". A run is represented by Ri (i=1, ..., n). Therefore, since each raster is divided into several runs and the level has only two types, background and frame, background runs and frame runs are alternately aligned.

FIGS. 28A to 28F show examples each representing a relationship between the current raster and the neighboring previous rasters, wherein a hatched portion represent a frame region, and therefore a non-hatched portion represent a background region. In each drawing, the lower half corresponds to a region of the current raster k, and the upper half corresponds to a region of the neighboring previous raster k−1.

Referring back to FIG. 27B, at step 542, "1" is set in the current raster Ri. At step 544, whether frame information RPi of the current raster Ri is "0" or "1" is checked. If the frame information RPi is "0", whether the previous raster is all frame runs is checked at step 546. On the other hand, if the frame information RPi is "1", whether the raster is all background runs is checked at step 548. The following processing is executed for each case at steps 550, 552, 554, and 556.

Figure 28A:
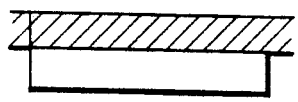
FIGS. 28A to 28F are diagrams showing several examples each representing a pair of a present raster and a previous raster adjacent thereto.
Figure 28B:
Figure 28C:
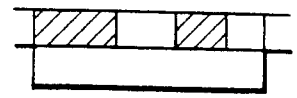
Figure 28D:
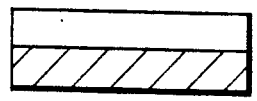
Figure 28E:
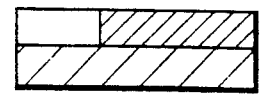
Figure 28F:
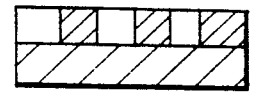

For example, as shown in FIG. 28A, if the previous raster has no background runs but only frame runs, the frame level LFo of the previous raster is incremented by one to obtain the determined background level RLi of the current raster at step 552. As shown in FIGS. 28B and 28C, if the previous raster has one or a plurality of background runs, a minimum value of the background levels LGo is obtained and set as the determined background level RLi of the current raster at step 550. As shown in FIG. 28D, if the previous raster has no frame runs but only background runs, the background level LG of the previous raster is set as the determined frame level RLi of the current raster. As shown in FIGS. 28E and 28F, if the previous raster has one or a plurality of frame runs, a maximum value of the frame levels is obtained and set as the determined frame level RLi of the current raster.

After the processing of one of steps 550, 552, 554, and 556 is executed in accordance with the situation, i is incremented by one at step 558. Steps 554 through 556 are repeatedly performed unless it is detected at step 560 that incremented i is larger than n. After the run Ri is processed from R1 to Rn, the run information is recovered to a normal pixel terminal image signal at step 562.

Figure 29A:
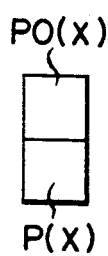
FIGS. 29A to 29C are schematic views showing a definition of a present raster and adjacent pixels of a previous raster.
Figure 29B:
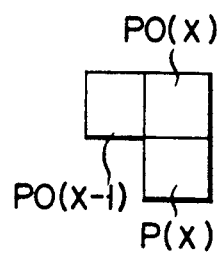
Figure 29C:
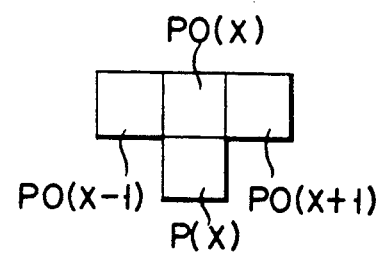

It should be noted that in this embodiment, the expression "a run of a previous raster is adjacent to a run of a current raster" means that one of pixels constituting the current raster is adjacent to one of pixels constituting a corresponding run of the previous raster. A pixel adjacent to a pixel P(x) of the current raster means a pixel Po(x) of the previous raster at the same position in the main scanning direction as shown in FIG. 29A. This definition of a pixel neighboring relationship can be modified as shown in FIG. 29B or 29C. For example, in FIG. 29B, a pixel Po(x) of a previous raster directly corresponding to a pixel P(x) of a current raster and a pixel Po(x−1) immediately before the pixel Po(x) are defined as "neighboring pixels". In FIG. 29C, a pixel Po(x) of a previous raster directly corresponding to a pixel P(x) of a current raster and pixels Po(x−1) and Po(x+1) immediately before and after the pixel Po(x) are defined as "neighboring pixels".

Figure 30:
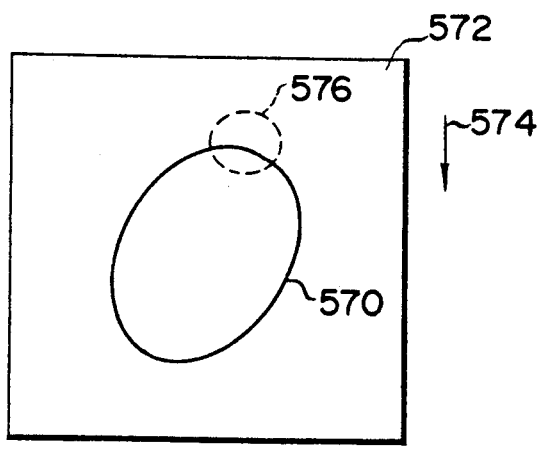
FIG. 30 is a plan view of an input image on which a color frame is handwritten.

By repeatedly executing the processing in steps 550 to 556, a color frame handwritten in the input document and its frame-in region can be correctly discriminated. For example, as shown in FIG. 30, assume that a loop-like color frame 570 is written in an input document 572. In FIG. 30, an arrow 574 represents a sub-scanning direction. In the above processing, since the same run has the same pixel level, image portions to be connected in the main scanning direction have the same level. When the processing in steps 550 and 552 is performed, image portions to be connected in the subscanning direction have the same level. As a result, once a color frame portion is found on the input image 572, the color frame level is continued in both the scanning directions. In addition, as in a color frame portion 576, if a previous raster has all background runs and a frame level is found for the first time in a current raster, i.e., if an upward projecting frame component is detected, the processing at step 552 is executed as in the example shown in FIG. 28D. That is, a value obtained by incrementing the frame level LFo of the previous raster by one is set as the background level of the current raster. Therefore, the background level inside the frame is higher than the background level outside the frame by one. This means that each time a projecting end of the loop-like color frame appears, the background level of the frame-in region is incremented by one. Therefore, as in multiple loop input document 572, by referring to the background level of the frame-in region to check whether the background level is an odd or even number, determination of the frame-in region can be correctly and efficiently performed. That is, if the outermost background level of the input image is "0" and the background level at a certain region is an odd number, a frame-in region is determined. If the background level at the certain region is an even number, a frame-out region is determined.

Examples of various color frames will be described below with reference to FIGS. 31A through 37B. When an input document is scanned in a sub-scanning direction 574 as described above and a color frame is a simple round loop as indicated by a thick line 580 in FIG. 31A in the input document, a raster region to above the horizontal line 582 indicated by a broken line has a background level "0". A frame region is encountered for the first time at the raster 582. This portion is shown in FIG. 31B in an enlarged scale, wherein the frame region is hatched as in FIGS. 28A to 28F. A frame run 584a is generated at the raster 582 for the first time. Since a previous raster of the run 584a has no frame portion, the processing at step 554 shown in FIG. 27B is executed as in the example shown in FIG. 27D to set "0" as the frame level of the run 584a. The processing at step 556 in FIG. 27B is executed as in the example shown in FIG. 28E to successively assign the frame level "0" of the run 584a to continuous rasters 584b and 584c from the raster 582 to a raster indicated by a horizontal line 586 of a broken line shown in FIG. 31A. In the raster 586, a background run 588 surrounded by frame runs 584d and 584e are produced. The processing at step 552 in FIG. 27B is executed as in the example shown in FIG. 27A to set a level value obtained by 584c by one, i.e., "1" as a background level of the background run 588. This background level is succeeded in the following rasters. Since the level of the raster 588 is an odd number, this raster is determined as a frame-in region. Therefore, in the input image shown in FIG. 31A, the frame-in region 590 is correctly identified from a frame-out region 592.

A case in which a modified loop-like color frame having a downward recess 602 is written in an input document as shown in FIG. 32A will be described below. In this case, rasters between broken lines 604 and 606 are processed as in the example shown in FIG. 31B. An upper changing portion of a recess 602 is encountered at the raster 606. This portion is shown in FIG. 32B in an enlarged scale. At this time, since a run 608 is in contact with a previous raster having background level 1", the processing at step 554 shown in FIG. 27B is executed as in the example shown in FIG. 28D to set "1" in a frame level of a run 609. Thereafter, a background run 612 surrounded by frame runs is produced at a raster 610. A background level of the background run 612 is set to be a value obtained by incrementing the frame level of the previous raster 611 by one, i.e., "2" by executing the processing at step 552 in FIG. 27B as in the example shown in FIG. 28A. This background level is succeeded in the following rasters until a raster 614 shown in FIG. 32A is encountered. At the raster 614, the processing at step 550 shown in FIG. 27B is executed as in the example shown in FIG. 28C to reset "0" in the background level of the run 609. As a result, the background level of the frame-in region 616 of the color frame 600 is set at "1", and that of the frame-out region 618 is set at "0" or "2". On the basis of this fact, the frame-in region cf the modified color frame can be correctly identified.

The above color region identification technique can also be effectively applied to a thick doughnut-like color frame 620 or to a doughnut-like frame 624 in which an island pattern 622 is present as shown in FIG. 33. In addition, this technique can be effectively applied to identify double or triple coaxial loop frames as shown in FIG. 34. For example, in the case of triple frames, three loop color frames 630, 632, and 634 are written as shown in FIG. 35. A region 636 outside the outermost color frame 630 has background level "0". A region 638 between color frames 630 and 632 has background level "1" as in the example shown in FIG. 31B. A region 640 between color frames 632 and 634 has background level "2" as in the example shown in FIG. 32B. Similar processing is developed and repeated to set background level "3" in a frame-in region 642 of the innermost color frame 634. At this time, the frame level of the outermost color frame 630 is "0", the frame levels of the color frames 632 and 634 are "1" and "2", respectively. In this manner, as the number of multiple frames is increased, the frame and background levels are incremented by one, and color frame detection can be effectively performed on the basis of this information.

When a color frame is cut, for example, when a color frame 650 is cut at its lower projecting portion as shown in FIG. 36, its frame-in region 652 can be detected in the same manner as in FIG. 31A. However, when a color frame is cut at its upper projecting portion as represented by a reference numeral 654, the above identification technique does not always effectively work. In this case, color frame shape correction (frame region interpolation processing) must be performed beforehand.

As shown in FIG. 37A, when a color frame has a hair-like pattern 656 inside the frame, a frame-in region 658 can be effectively identified by the above algorithm since this color frame has the same frame level "1" throughout the entire portion and the frame-in region 658 has the background level "1" throughout the entire region. When a color frame has a hair-like pattern 660 projecting outside the frame as shown in FIG. 37B, although background levels in a frame-in region 662 are all "1"s, i.e., uniform, a triangular region 666 surrounded by the hair 660 and a raster 664 has background level "1" while an input document is scanned. However, when the raster 664 is encountered, the triangular region 666 is found to be continued to the outermost background region 668. Therefore, the background level of the triangular region 666 is reset to be "0". As a result, the triangular region 666 can be distinguished from the true frame-in region 662.

Figure 38:
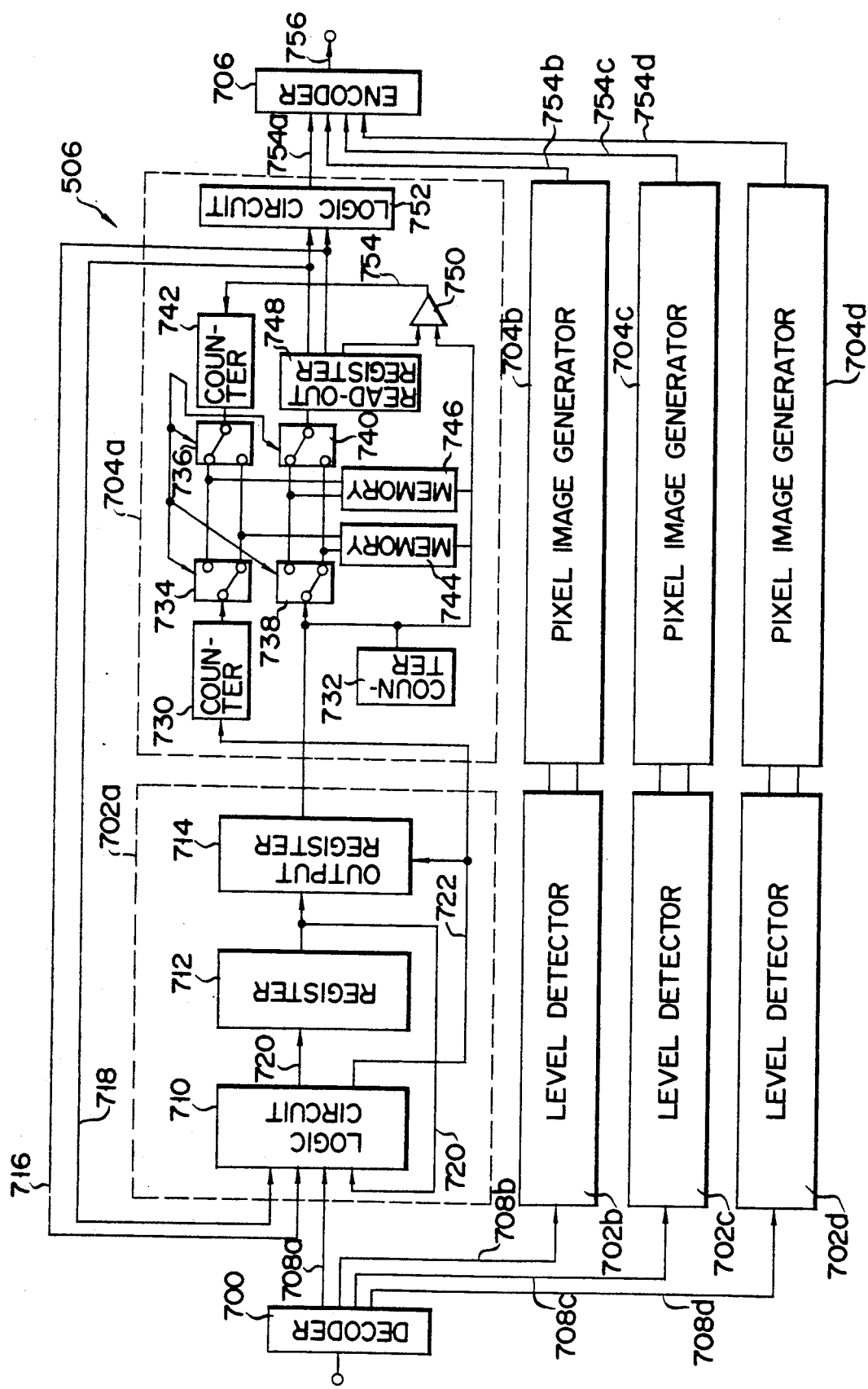
FIG. 38 is a diagram showing an internal circuit arrangement of the frame-in region detector shown in FIG. 24.

A circuit arrangement for performing the color frame region identification operation in the above manner is shown in detail in FIG. 38. That is, the color frame-in region identifier 506 (see FIG. 24) comprises a decoder 700, level detecting circuits 702a to 702d, pixel image generating circuits 704a to 704d, and an encoder 706. The output signal from the thin-out processor 504 shown in FIG. 24 is decoded by the decoder 700 to obtain frame signals 708a to 708d representing the presence/absence of red, green, blue, and yellow components. These color frame signals 708 are supplied to the circuits 702a to 702d which have the same circuit arrangement, and only one of the circuit arrangements is shown in a broken-li..e block 702a in FIG. 38.

The level detecting circuits 702a to 702d are for determining a level of a current raster, and each level detecting circuit has a logic circuit 710, an internal state register 712, and an output register 714. The logic circuit 710 receives a frame signal 708 of a current raster, a frame signal 716 of a previous raster, a level signal 718 of the previous raster, and an output signal 720 of the register 712 and generates (1) an internal state signal 720 having a 2-bit signal component representing a connection state and a 4-bit signal component representing a level state and (2) a 1-bit run end signal 722. The register 712 receives the signal 720 and temporarily stores the contents therein. These circuits 710 and 712 therefore constitute a state transition circuit having four states S1, S2, S3, and S4 and a 4-bit level state LS in accordance with combinations of 2-bit connection state data.

An input/output relationship of the logic circuit 710 is shown in TABLE 1 below. The TABLE 1 shows a state transition of a level determination unit.

TABLE 1

| Input | | | | Output | | |
|---|---|---|---|---|---|---|
| Internal State of Immediately Preceding Pixel | Level State of Immediately Preceding Pixel | Frame Signal of Previous Raster | Frame Signal of Current Raster | Next Internal State | Next Level State | Run End Signal |
| S0 | L | 0 | 0 | S0 | Min(L,L') | 0 |
| S0 | L | 0 | 1 | S1 | L' | 1 |
| S0 | L | 1 | 0 | S0 | L | 0 |
| S0 | L | 1 | 1 | S3 | L' | 1 |
| S1 | L | 0 | 0 | S0 | L' | 1 |
| S1 | L | 0 | 1 | S1 | L | 0 |
| S1 | L | 1 | 0 | S2 | L' + 1 | 1 |

TABLE 1-continued

| Input | | | Output | | | |
|---|---|---|---|---|---|---|
| Internal State of Immediately Preceding Pixel | Level State of Immediately Preceding Pixel | Frame Signal of Previous Raster | Frame Signal of Current Raster | Next Internal State | Next Level State | Run End Signal |
| S1 | L | 1 | 1 | S3 | L' | 0 |
| S2 | L | 0 | 0 | S0 | L' | 0 |
| S2 | L | 0 | 1 | S1 | L' | 1 |
| S2 | L | 1 | 0 | S2 | L | 0 |
| S2 | L | 1 | 1 | S2 | L' | 1 |
| S3 | L | 0 | 0 | S0 | L' | 1 |
| S3 | L | 0 | 1 | S3 | L | 0 |
| S3 | L | 1 | 0 | S2 | L' + 1 | 1 |
| S3 | L | 1 | 1 | S3 | Max(L,L') | 0 |

An internal state LS of a pixel in which the run end signal has logic level "1", i.e., a pixel in which a current raster changes from a frame to a background or vice versa is stored in the output register 714. This storage state represents run level information. This level signal indicates a background or frame level of the pixel. In the above TABLE 1, S0, S1, S2, and S3 of the internal state ST correspond to a structure consisting of states in which (1) a current raster is of a background and a pixel of a background is present in a previous raster, (2) a current raster is of a frame and a previous raster has all background runs, (3) a current raster is of a background and a previous raster has all frame runs, and (4) a current raster is of a frame and a pixel of a frame is contained in a previous raster, respectively. These internal states are determined when the run end signal is generated. When state transition is executed in accordance with the TABLE 1, the states S0, S1, S2, and S3 correspond to steps 550, 552, 548, and 556 in FIG. 27B, respectively, at the end of each run.

The level signals determined by the level detectors 702 are defined in units of runs, and a level value of the level signal is finally determined at the last image of the corresponding run. Such a level signal in units of runs is converted into a normal signal in units of pixels by the pixel image generating circuits 704 in the next stage. As shown in FIG. 38, each of the pixel image generating circuits 704 is constituted by connecting an address counter 730, a pixel position counter 732, switch circuits 734, 736, 738, and 740 interlocked with each other to perform switching, an address counter 742, memories 744 and 746, a read-out register 748, a comparator 750, and a logic circuit 752.

After the address counter 730 is initialized to be zero, each time a final pixel of a run is generated, a frame signal of the run, its level signal, and position coordinate data of the final pixel at the run are stored as one word in one of the memories 744 and 746. In response to this storage operation, the address counter 730 is incremented by one. The pixel position counter 732 is reset at the start of the raster and is incremented by one each time a pixel coordinate is increased in the main scanning direction. Therefore, an output signal from the counter 732 represents a current pixel position. The above operation is repeatedly executed for each run to the end of the current raster. As a result, information about frame signals, level signals, and final pixel positions for all the runs in one raster are sequentially stored in the memory 744 or 746. This information is read out and output as a signal in units of pixels while the above processing is executed for the next raster.

More specifically, after the address counter 742 is reset, the stored information in the memory (744 or 746) is temporarily stored in the read-out register 748. The comparator 750 compares the signal representing the run final pixel position output from the register 748 with the output signal from the pixel position counter 732 and outputs a comparison result signal 754 when the signals become equal to each other. The signal 754 is supplied to the address counter 742. In response to the signal 754, the address counter 742 increments its count by one. With such a series of processing, the frame signal and the level signal are output from the read-out register 748 in synchronism with the pixel position. The logic circuit 752 calculates logical AND and OR between the frame and level signals to check whether the background level of the pixel region is an odd or even number, thereby checking whether the region is a frame-in region. The above processing is independently performed for each color component, and frame-in identification signals 754a, 754b, 754c, and 754d of four colors are simultaneously obtained. These signals are supplied to the encoder 706. The encoder 706 generates a region color signal 756 in accordance with the priority order between the frame colors. An input/output relationship of the encoder 706 is presented in TABLE 2 below.

TABLE 2

| Red Frame | Green Frame | Blue Frame | Yellow Frame | Output Signal |
|---|---|---|---|---|
| 1 | * | * | * | Red |
| 0 | 1 | * | * | Green |
| 0 | 0 | 1 | * | Blue |
| 0 | 0 | 0 | 1 | Yellow |
| 0 | 0 | 0 | 0 | White |

The region color signal 756 is subjected to color edit processing in the color editor 508 shown in FIG. 24 and color-printed by the color printer 510 in substantially the same manner as in the above embodiments. As a result, the input image is reproduced as an edited color hard copy.

According to this embodiment, by using the simple circuit arrangement as shown in FIG. 38 and executing the processing flows shown in FIGS. 27A and 27B, a frame-in region can be correctly identified at high speed even if a color frame handwritten on an input document for region designation is complicated in shape and has a multiple structure.

Figure 39:
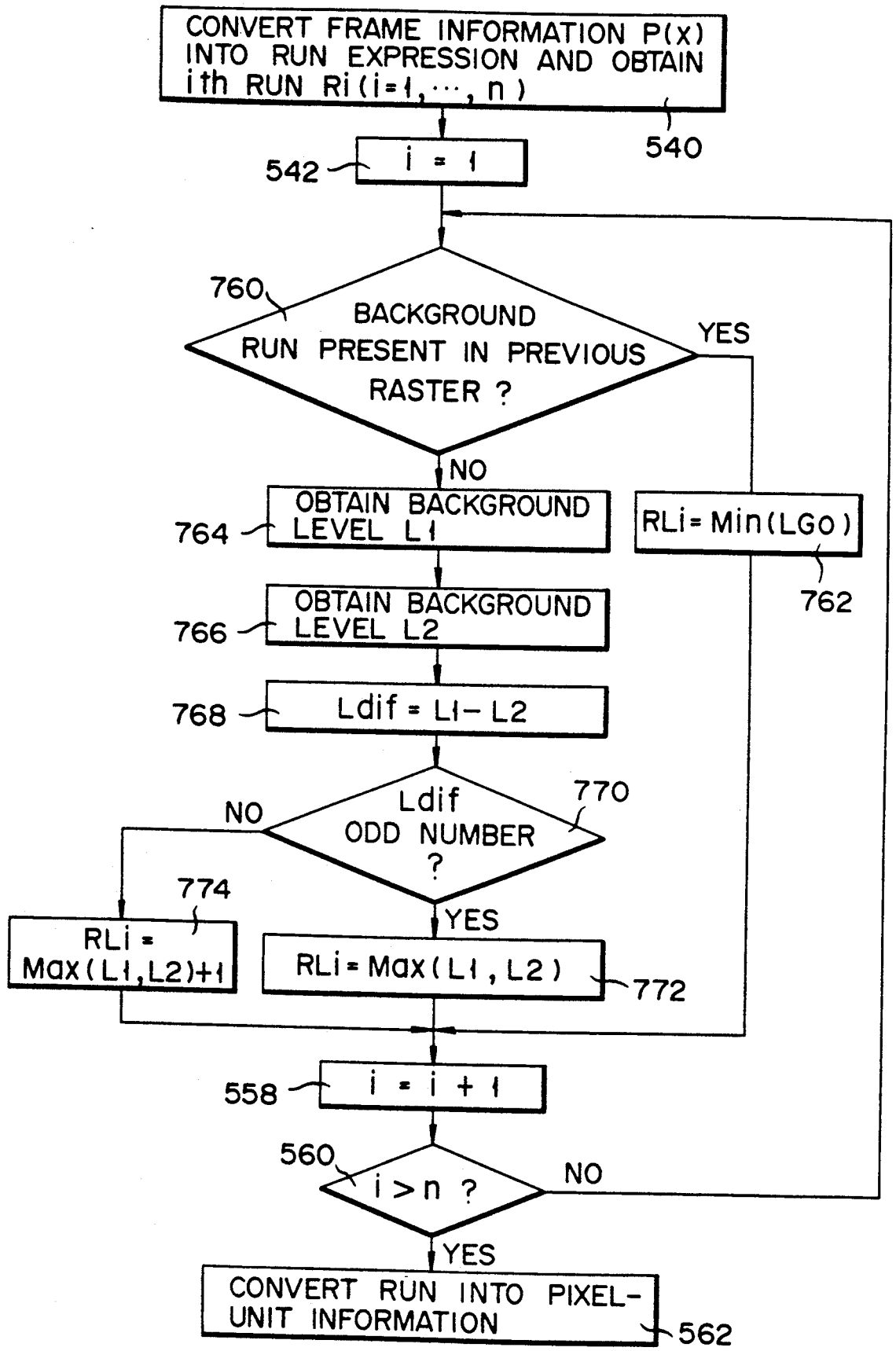
FIG. 39 is a flowchart for explaining a modification of a frame-in region identification algorithm shown in FIGS. 27A and 27B.

The color frame-in region identification algorithm shown in FIGS. 27A and 27B can be modified as shown in FIG. 39 wherein the same reference numerals as in FIG. 27B denote the same steps and a detailed description thereof will be omitted. FIGS. 40A to 40C show region of a relationship between a current raster and a neighboring previous run, wherein a hatched portion represents a frame region and therefore a non-hatched portion represents a background region as in FIGS. 28A to 28F. In each drawing, a lower half represents a region of a current raster, and an upper half corresponding to a region of a previous raster adjacent to the current raster.

According to this algorithm, an attribute as a background level is given to background pixels, and a background level of a background portion of a current raster is determined on the basis of a predetermined background level of the current raster in addition to a frame signal and a frame level of a previous raster adjacent to a current raster and a frame signal of the current raster. A frame-in region is identified by using the predetermined background level. The above processing is repeatedly performed for each raster, thereby identifying the color frame-in regions of the entire input image.

As shown in FIG. 39, at step 760, whether one or a plurality of background runs are present in a previous raster is checked. If Y at step 760, a maximum value of background levels of the background runs is calculated and set as a background level RLi of a current run at step 762. As shown in FIG. 40C, if no background run is present in the previous raster, i.e, if the previous raster has frame runs only, the following processing is performed. At step 764, a background level L1 of a background run located at the right side along the main scanning direction of a run Ri and closest to the run Ri is obtained. At step 766, a background level L2 of a background run located at the left side along the main scanning direction of a run Ri and closest to the run Ri is obtained. Subsequently, at step 768, a difference Ldif between the background levels L1 and L2 is calculated. At step 770, whether the differential background level Ldif is an odd or even number is checked. If an odd number is determined, a maximum value of the background levels L1 and L2 is found out and set as a background level RLi of a current run. On the other hand, if the differential background level Ldif is determined to be an even number, a maximum value of the background levels L1 and L2 is found out and incremented by one, and the addition result is set as the background level RLi of the current run, at step 774. The background level thus obtained is utilized in the color frame region identification processing in the same manner as described above with reference to FIG. 27B. That is, if the background level is an even number, the color fame region is a frame-out region. If the background level is an odd number, the region is a frame-in region.

An image signal processing apparatus according to still another embodiment of the present invention is shown in FIG. 41, wherein the same reference numerals as in the arrangement shown in FIG. 24 denote the same parts and a detailed description thereof will be omitted.

As shown in FIG. 41, a color frame-in region detector 800 and an attribute determination unit 802 are provided between an image input unit 500 and a color editor 508. A color identifier 502 identifies one or a plurality of color frames handwritten on a monochromatic input document by separating achromatic document image components and chromatic frame line components of an input image, thereby generating a color identification signal including a color frame signal. The color frame-in region detector 800 identifies and detects designation regions surrounded by the color frames in response to the output signal from the color identifier 502.

For example, in a case as shown in FIG. 42 wherein various color frames 806, 808, 810, 812, 814, and 816 are handwritten on document paper 804 by an operator by using four different colors (these color frames do not cross each other but have an inclusive relationship), the color frame-in region detector 800 performs frame-in region identification for each frame color and outputs individual color frame-in region identification results as shown in FIGS. 43A to 43D. A basic algorithm of the processing may be substantially the same as described above with reference to FIGS. 27A and 27B or FIG. 39.

An output signal from the color frame-in region detector 800 is supplied as a color frame-in region detection signal to the attribute determination unit 802. The unit 802 determines a proper attribute for each color frame. For example, when four colors are used in handwritten frames, the unit 802 adds attribute data of "blue", "red", "green", and "yellow" to regions (frame-in regions) designated by the different color frames. Attribute data of "black" is given to the other region (frame-out region) of the input image. These attribute codes are assigned with specific edit functions in accordance with the frame color/edit function correspondence relationship registered by an operator by using the sheet 204 shown in FIG. 10B in the first embodiment shown in FIG. 1. In the following description, these attributes of blue, red, green, yellow, and black will be represented as "B", "R", "G", "Y", and "K". The attribute determination unit 802 hierarchically deals with the attribute codes and stores attribute codes of frame-in regions from the outermost region to a certain frame-in region of an input document as history information. This history information is utilized to determine an attribute of the frame-in region.

Figure 44A:
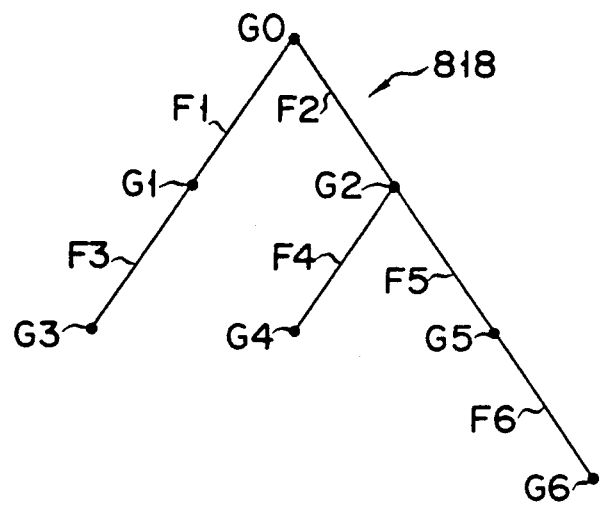
FIGS. 44A to 45B are diagrams showing a color frame and a hierarchical structure of in-frame regions of the color frame for use in attribute determination processing executed by an attribute determination unit shown in FIG. 41, attribute information determined in the in-frame regions, and input image plan views corresponding thereto.
Figure 44B:
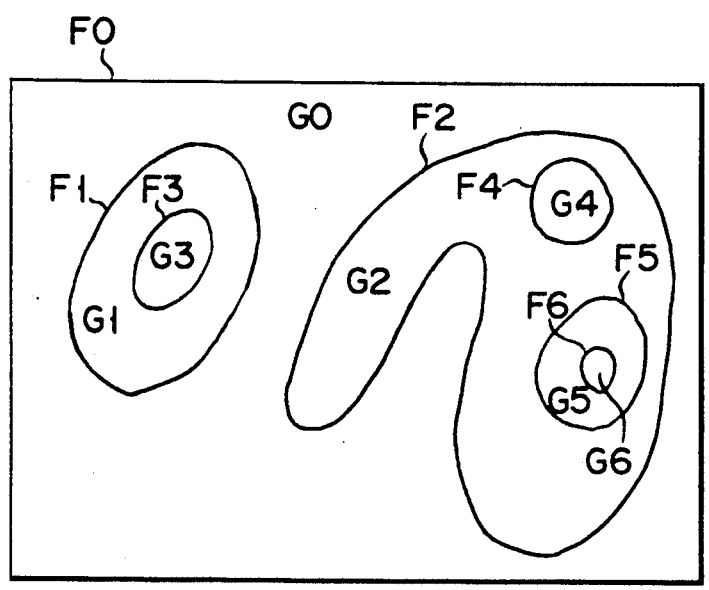

The processing of the attribute determination unit 802 will be described in detail below with reference to the input image shown in FIG. 42. FIG. 44A shows a hierarchical structure of attributes of color frames of the input image as a "tree structure" 818. Reference symbols "F0", ..., "F6" denote color frames, and reference symbols "G0", ..., "G6" represent color frame-in regions (see FIG. 44B). In the tree structure shown in FIG. 44A, each frame-in region Gi is considered as a "node", and each frame Fi is considered as a "branch". As is apparent from FIG. 44B, a region (frame-in region) inside a certain color frame Fi is Gi. The color frame F5 is included in the color frame F2 and at the same time includes the color frame F6. In the tree structure 828, this relationship is represented such that the node G5 is located below the node G2 and above the node G6.

Figure 45A:
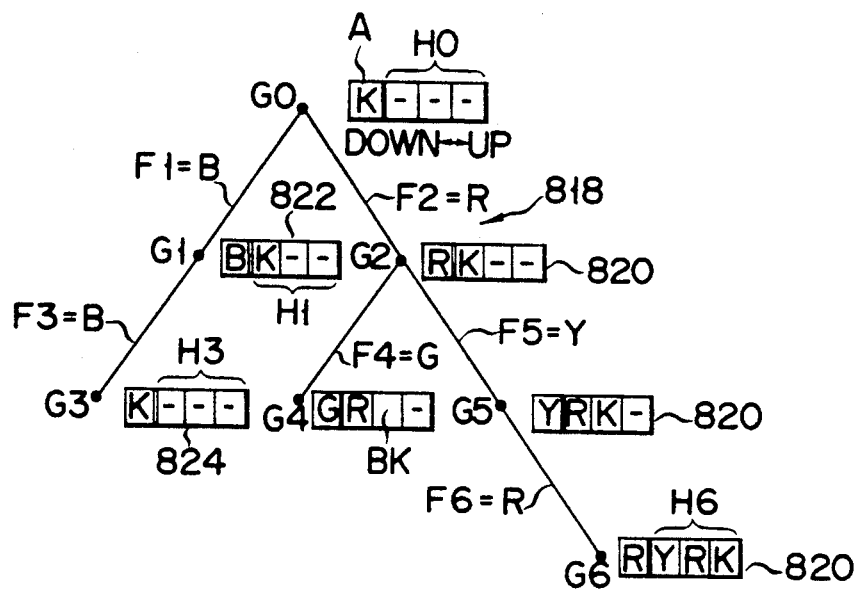

The attribute determination unit 80 defines frame history information Hi for each (Gi) of image regions containing the outermost region and frame-in regions. As shown in FIG. 45A, the history information is stored in an upper portion of a register stack. Definition of the history is sequentially performed from the top to the bottom (inwardly from the outermost region G0 of the input image) of the tree structure 818 shown in FIG. 44A. More specifically, an attribute of the outermost region G0 of the input image is set to be black, and the content of its history H0 is cleared. When an attribute AGj of a region G(i−1) just outside a certain region Gi (i.e., a region including the region Gi) is predetermined, the attribute AGi of the region Gi is basically determined as follows on the basis of a relationship between a frame color Fi and the attribute AGj:

(Case 1) When the frame color Fi differs from the attribute AGj, the frame color Fi is determined as an attribute of the region Gi, and the attribute AGj is "pushed" to frame history Hj of the region Gj to obtain the history Hi of the region Gi; or (Case 2) When the frame color Fi is the same as the attribute AGj, attribute information is "popped" from the frame history Hj of the region Gj to obtain the frame history Hi of the region Gi.

Figure 45B:
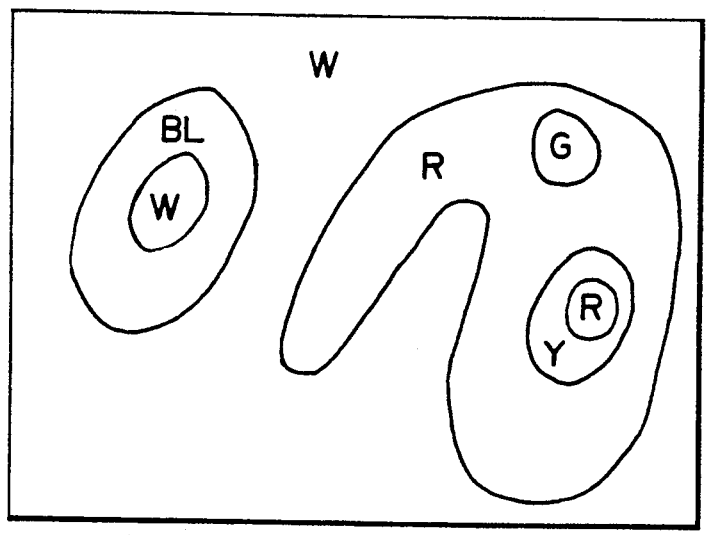

The attribute determination results obtained in accordance with the above algorithm are shown in FIG. 45A. FIG. 45B schematically shows a distribution of the attributes of the tree structure 818 determined as described above. As is apparent from a branch component extending in a lower right direction of the tree structure 818, an attribute AG0 (=K) of the outermost region G0 is sequentially shifted (pushed) to an upper word position in the memory stacks 820 of the regions G2, G5, and G6, i.e., succeeded. For example, the processing of case 1 is performed for the innermost region G6. As a result, the region G6 has the history of the attributes of the regions G0, G2, and G5 as H6. The processing of case 2 is performed for the region G3. In this case, since both of the frame color F3 and the attribute AG1 of the region G1 are "blue", the frame history H1 of the region G1 is shifted in a reverse order (popped), and the past attribute information K is recovered and determined as the attribute AG3 of the region G3.

When the frame history content is cleared in the above attribute determination algorithm, since the attribute AGi of the region Gi always becomes black (=K), the frame color Fj always differs from the attribute AGj if another frame is present in the region Gi. Therefore, the processing of case 2 cannot be executed for the region Gi surrounded by the color frame Fi. Therefore, the above pop processing is not executed when the frame history is empty (cleared). determination of all attributes can be effectively performed regardless of any change in color frame write arrangement.

Figure 46:
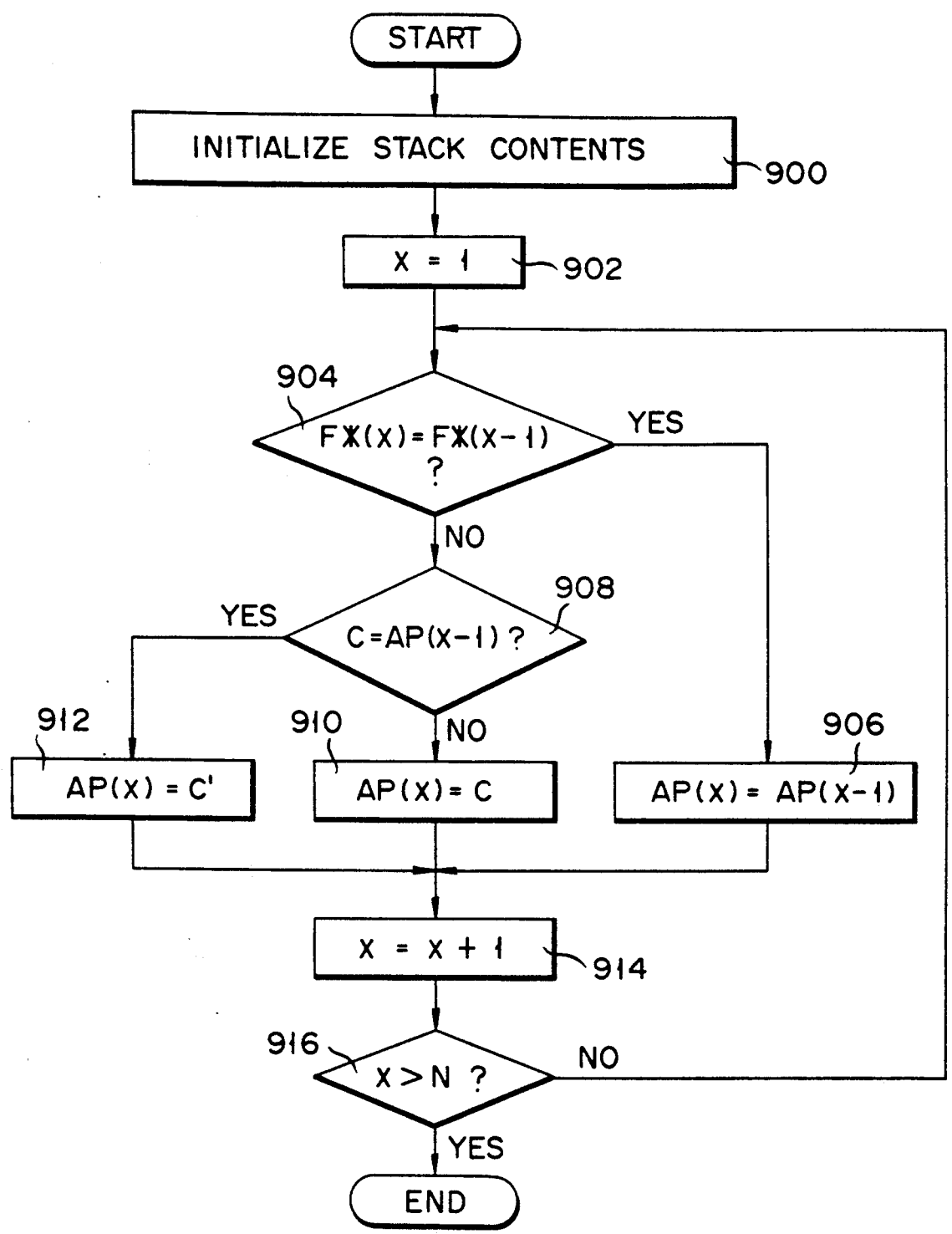
FIG. 46 is a flowchart for explaining the attribute determination processing performed for a raster scanning signal of an input image.

FIG. 46 is a flowchart for explaining a series of processing representing the above attribute determination algorithm performed by the attribute determination unit 802 as processing for a raster scan signal of a read input image. Register stacks used in this processing are similar to those shown in FIG. 45A. Each of the stacks stores frame-in signals FR(x), FG(x), FB(x), and F0(x) (where x is a pixel coordinate of a raster in the main scanning direction, and x=1, ..., N) of different color frame components contained in a current raster and attribute history down to the pixel. On the basis of the stack information, the attribute AP(x) of the pixel P(x) is calculated.

As shown in FIG. 46, at step 900, all the stack contents are initialized. At this time, assume that the 0th pixel is present before the first raster pixel and its attribute is white (=W). At step 902, "1" is set in a pixel coordinate. Subsequently, at step 904, a frame-in signal F*(x−1) (where "*" is R, G, B, or Y) of a previous pixel P(x−1) is compared with a frame-in signal F*(x) of a current pixel P(x) for each of a plurality frame colors contained in a current raster, thereby checking whether they are the same for all the frame colors. If the following relations are satisfied (if the current raster does not cross a frame line):

$$\left.\begin{array}{rcl} FR(x) &=& FR(x-1) \\ FG(x) &=& FG(x-1) \\ FB(x) &=& FB(x-1) \\ FY(x) &=& FY(x-1) \end{array}\right\} \quad (3)$$

at step 906, the attribute AP(x−1) of the previous pixel is set as the attribute AP(x) of the current pixel. If the above conditions are not satisfied for a certain frame color, a frame color C of the change frame color is compared with the attribute AP(x−1) of the previous pixel to check whether the both are the same, at step 908. If N at step 908, the attribute AP(x−1) of the previous pixel is pushed in a stack and the frame color C is set as the attribute AP(x) of the current pixel, at step 910. If Y at step 908, the attribute is popped from the above stack to obtain a frame color C' and the obtained frame color C' is set as the attribute AP(x) of the current pixel, at step 912. Subsequently, at step 914, the pixel coordinate value x is incremented by one. At step 916, the updated pixel coordinate is compared with N. The above processing started from step 904 is repeatedly executed as long as the updated pixel coordinate value is smaller than N.

When the above attribute determination processing is performed for a certain raster 820 of an input image 804 shown in FIG. 47A, a tree structure as shown in FIG. 47B is obtained. Referring to FIG. 47A, an arrow 822 represents a main scanning direction, and an arrow 824 represents a sub-scanning direction. The raster 820 includes region pixel components 826a to 826k and frame line components 828a to 828j which are alternatively produced. In a raster tree structure 830 shown in FIG. 47B, the region pixel components 826 are represented by nodes (black dots), and the frame line components 828 are represented by branches (solid lines), as in the description presented above.

Figure 47C:
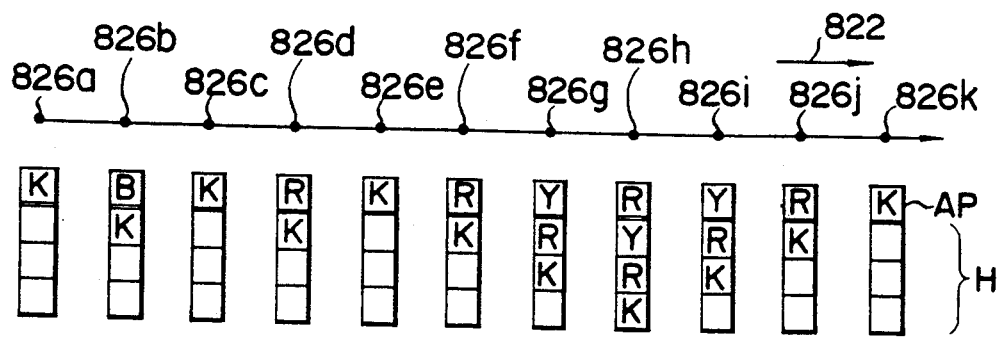

Attributes of the region pixels 826a to 826k are sequentially determined along the raster 820. Determination of an attribute of the frame pixel 826c is executed with reference to the past frame colors down to the pixel 826c (i.e., branches 828a and 828b in the tree structure 820 shown in FIG. 47B) in accordance with the processing flow shown in FIG. 46. The attribute information AP determined for each of the frame line pixels 826 and the history storage state in the stacks are shown in FIG. 47C. In the tree structure 830, if attribute determination advances downward along arrows indicated by broken lines, processing at step 906 in FIG. 46 is executed. On the other hand, if attribute determination turns upward along the broken-line arrows in the tree structure 830, i.e., if the raster crosses a frame line and is located outside the frame, processing at step 910 or 912 in FIG. 46 is executed. Therefore, in the tree structure 830, when attribute determination starts from the node 826a, goes down to the node 826b along the branch 828a, and then turns up to the node 826c along the branch 828b, the nodes 826a and 826c become the same in their stack contents, as shown in FIG. 47C. This fact explicitly indicates that the region pixels 826a and 826c belong to the same image region. For the same reason, the stack contents of the nodes 826c and 826e become the same. Therefore, it becomes apparent that the region pixels 826a, 826c, and 826e belong to the same image region. This property does not depend on a locus along the branch pattern of the tree structure 830 of the raster 820. This is because even if the above route, in the tree structure 830, in which the processing starts from the node 826a, goes down to the node 826b along the branch 828a, then turns up to the node 826c along the branch 828b is changed to another route in which the processing starts branch 826b, and then turns up to the node 826a along the branch 828a, the fact that the stack contents of the nodes 826a and 826c become the same is kept unchanged.

According to the above embodiment, since not only attribute information of each region pixel but also past history information are stored in a stack of the region pixel, attribute determination can be correctly executed for the following pixels. In addition, by only comparing attribute information of region pixels aligned on a certain raster to detect the same attribute, a distribution state of frame-in regions can be correctly obtained with a minimum memory capacity. When the above processing is repeatedly performed for all rasters in an input image, identification of two-dimensionally spread color frame-in regions can be efficiently performed. Therefore, even if various color frames are complicatedly written in an input image, occurrence of frame-in identification errors can be minimized.

Figure 48:
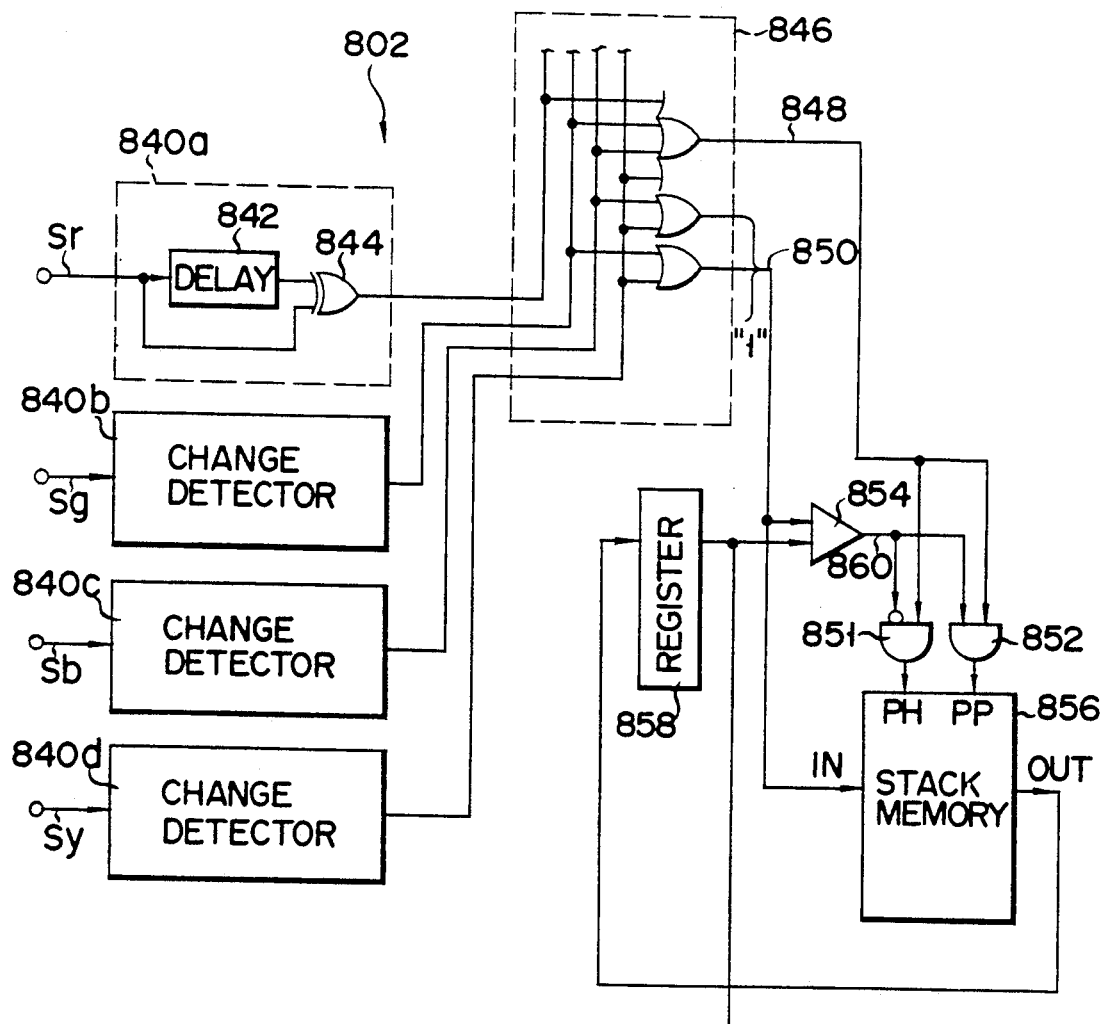
FIG. 48 is a diagram showing an internal circuit arrangement of the attribute determination unit shown in FIG. 41.

FIG. 48 shows a hardware arrangement for executing the above attribute determination processing, which corresponds to the internal circuit arrangement of the attribute determination unit 802. Four change detectors 840a to 840d are provided in accordance with the number of frame colors to be used. The detectors 840a to 840d are supplied with four color frame-in signals Sr, Sg, Sb, and Sy from the color frame-in region detector 800, respectively. Each of the signals has logic level "1" when its pixel is in a corresponding color frame, and has logic level "0" when its pixel is out of the frame. Each of the detectors 840 includes a delay 842 and a logic circuit 844. The delay 842 delays an input signal by one pixel and outputs a delayed color frame-in signal. The logic circuit 844 calculates an exclusive logical sum of the delayed signal and the original signal. Therefore, the change detector 840 functions to detect a change point of a logical level of the input signal.

The change detectors 840a to 840d are connected to an encoding circuit 846 which generates a 1-bit frame-crossing signal 848 representing whether a change point is detected for each frame color and a 2-bit color code signal (frame color signal) 850 representing a code of a changed frame color. The signal 848 is supplied to logical gates 851 and 852. The logical gates 851 and 852 are connected to a push terminal PH and a pop terminal PP of a stack memory 856, respectively. The signal 850 is supplied to the first input of a comparator 854 and the input of a push-pop processing circuit 856. An output signal from the circuit 856 is stored in an attribute register 858. The comparator 854 receives a read-out signal at the second input thereof and compares the received signal with the signal 850 received at the first input thereof. A comparison result signal 850 is supplied to the logical gates 851 and 852.

The frame-crossing detection signal 848 and the comparison result signal 860 are used in determination at steps 904 and 908 in FIG. 46. The stack memory 856 has a memory space defined by a product of 3-bit memory units and a selected number of words. The 3-bit memory units store the attribute information determined as described above as a color code via an attribute register 858. The register 858 is zero-cleared when, the first pixel is generated in each raster.

The "push-pop" operation in attribute determination described with reference to FIG. 46A or 47C is executed as follows by the stack memory 856.

When the frame-crossing signal 848 has logic level "1" and the comparison result signal 860 has logic level "0", the content (attribute information) of the attribute register 858 is pushed, and the frame color signal 850 is written in a memory address designated by a pointer of the register 858. At this time, the pointer is incremented by one. When both the frame-crossing signal 848 and the comparison result signal 860 have logic level "1", the content (attribute information) of the attribute register 858 is popped and written at a memory address designated by the pointer of the register 858. At this time, the pointer is decremented by one. The above operation is repeatedly performed for a current raster, and a stored content AC of the attribute register 858 is generated as a finally determined attribute signal 862 from an output terminal 864. This operation is executed for each raster in real time in synchronism with raster scanning of an input image. Therefore, the above attribute determination processing can be executed at high speed with a simple circuit arrangement.

Although the invention has been described with reference to specific embodiments, it shall be understood by those skilled in the art that numerous modifications may be made that are within the spirit and scope of the invention.

For example, color fluorescent pens which have become popular in recent years can be used to write color frames in an input image. In this case, although a basic concept of a color frame detection technique is similar to that described above, the color converter must be slightly changed. Fluorescent pen color ink of this type has a higher saturation than that of normal ink of the same color regardless of its high lightness. Therefore, if color conversion in the above embodiments is simply executed, a minus color density component is produced in converted colors. For example, a minus density component is produced in a cyan density of a frame color written by a magenta fluorescent pen. Therefore, by modifying the color converter to assign an independent color code different from a normal ink color to such a minus component, read errors can also be minimized in color frame detection for a color frame written with a fluorescent pen.

What is claimed is:

1. A color image signal processing apparatus for use in an image reproduction system, said apparatus comprising:
 (a) image input means for optically sensing an image on input paper and generating an electrical image signal;
 (b) memory means for storing in a one-to-one correspondence manner colors used in color frames written in the input image so as to designate a partial image region thereof and specific image edit functions which are assigned to the frame colors and desired to be executed by an operator;
 (c) detecting means for detecting, when a closed loop-shaped frame of a selected color is written in the input image, a shape and color of the color frame in response to the image signal and for generating a detection result signal;
 (d) function determining means, connected to said detecting means and said memory means, for accessing said memory means in response to the detection result signal to determine an image edit function corresponding to a first selected ink color of the detected color frame, and for generating an operation mode set signal;

(e) signal processing means, connected to said function determining means, for executing an image signal processing corresponding to the image edit function in response to the operation mode set signal, thereby to generate an edited image signal; and (f) image output means, connected to said signal processing means, for generating an image reproduced in response to the edited image signal;

wherein said memory means stores image edit functions and edit parameters selected by the operator as specific image edit function designation data.

2. The apparatus according to claim 1, wherein, when another image edit function data different from the specific image edit function data is assigned to the ink color of the color frame, said memory means updates stored contents thereof to store said another image edit function data.

3. The apparatus according to claim 2, further comprising:

(g) edit function registering means for optically sensing an edit function registration sheet to read color marks written thereon and generating electrical edit function registration data, thereby allowing independent registration of an image edit function desired to be executed by the operator, said edit function registration data being supplied to said memory means and stored therein.

4. The apparatus according to claim 3, wherein said memory means stores a first ink color used in a first color frame to be written on first input paper so as to designate a source image region, a second ink color used in a second color frame to be written on second input paper so as to designate a partial image region of the second input paper to function as a target image region in which the source image is to be merged, and edit function designation data for image merging synthesis between the source image region and the target region.

5. The apparatus according to claim 3, wherein said image output means outputs said edit function registration data.

6. The apparatus according to claim 5, wherein said edit function registration sheet is positioned in adjacent to a non-image region of the input paper, said sheet having a data registration area which is substantially same in width as said non-image region of said input paper.

7. A color image signal processing apparatus for use in an image reproduction system, said apparatus comprising:

(a) image input means for optically sensing an input image and generating an electrical image signal;

(b) first converting means, connected to said input means, for color-converting the image signal to generate a quantized color code signal;

(c) signal processing means for receiving the color code signal, for performing signal processing including at least one of image correction processing and image edit processing for the signal, and for generating a processed color code signal;

(d) second converting means, connected to said signal processing means, for converting the processed color code signal into an ink amount signal by using a selected conversion method; and (e) image output means, connected to said second converting means, for reproducing the input image and generating a reproduced image in response to the ink amount signal;

wherein said signal processing means comprises correcting means, connected to said image input means and said first converting means, for extracting a high-frequency component from the color image signal and performing high-frequency emphasis correction for the color code signal in accordance with the extracted high-frequency component.

8. The apparatus according to claim 7 wherein said signal processing means comprises:

color region integrating means, connected to said first converting means, for calculating a color difference between different neighboring image regions of the input image in response to the color code signal, and when the color difference is smaller than a preset reference level, integrating the image regions into one region.

9. The apparatus according to claim 7, wherein said signal processing means comprises:

correcting means, connected to said image input means and said first converting means, for extracting a high-frequency component from the color image signal, performing high-frequency emphasis correction for the color code signal in accordance with the high-frequency component, and generating a high-frequency-emphasized color code signal; and color region integrating means, connected to said correcting means, for calculating a color difference between different neighboring image regions of the input image in response to the high-frequency-emphasized color code signal, and when the color difference is smaller than a reference level preset to correspond to a degree of color variation which tends to occur in an input image, integrating the image regions into one color region so as to have the same color code.

10. A color image signal processing apparatus for use in an image reproduction system, said apparatus comprising:

(a) image input means for optically sensing an input image in a raster scanning manner, and for generating an electrical image signal having raster components, the input image including an original image and a color frame written in the input image so as to designate a specific region of the original image;

(b) color converting means, connected to said input means, for color-converting the image signal to generate a quantized color code signal;

(c) identifying means, connected to said converting means, for adding, in response to the color code signal, an attribute having one of a first level representing a frame and a second level representing a background, and for identifying a frame portion and a background portion of pixels of a current raster by using attribute information of a previous raster adjacent to a current raster, thereby detecting a region designated by the color frame of the input image as a frame-in region and generating a frame-in region identification signal;

(d) editing means, connected to said converting mean and said identifying means, for performing editing desired by an operator for the specific region of the input image and generating an edited image signal in response to the frame-in region identification signal; and (e) image output means, connected to said editing means, for reproducing the input image and generating a reproduced image in response to the edited image signal;

wherein said identifying means comprises level determining means for dividing a relative distribution relationship of the first and second levels between the current raster and the previous raster into a selected number of state patterns, and when one of the state patterns is produced, executing level assignment processing to be executed for each of the pixels of the current raster.

11. The apparatus according to claim 10, wherein said level determining means divides each of the current and previous rasters into a first pixel group of a series of pixels having the first level and a second pixel group of a series of pixels having the second level, determining a relative positional relationship between the first and second pixel groups in the current and previous rasters, and performing level assignment processing corresponding to a determination result for a certain pixel group to be determined of the current raster.

12. The apparatus according to claim 11, further comprising:

(f) thin-out means, connected to said color converting means and said identifying means, for performing thin-out processing of the color code signal in units of a selected number of pixels in such a manner that a specific type of color pixels perferentially remain, and for generating a color code signal from which a reduced number of bits are thinned out, the thin-out signal being supplied to said identifying means.

13. A color image signal processing apparatus for use in an image reproduction system, said apparatus comprising:

(a) image input means for optically sensing an input image in a raster scanning manner and for generating an electrical image signal having raster components, the input image including an original image and a color frame written in the input image so as to designate a specific region of the original image;

(b) color converting means, connected to said input means, for color-converting the image signal to generate a quantized color code signal;

(c) frame-in region detecting means, connected to said converting means, for tracing, in response to the color code signal, a selected route in a reverse order to distinguish frame pixels located on the color frame from remaining pixels corresponding to background pixels, for forming a hierarchical structure representing a relative distribution of the pixels, referring to a color code of a continuous frame pixel of a certain background portion in the hierarchical structure and determining an attribute of the certain background pixels, and for detecting the specific region of the input image on the basis of the determined attribute, thereby generating a frame-in region detection signal;

(d) editing means, connected to said converting means and said frame-in region detecting means, for performing edition desired by an operator for the specific region of the input image and generating an edited image signal in response to the frame-in region identification signal; and (e) image output means, connected to said editing means, for reproducing the input image and generating a reproduced image in response to the edited image signal;

wherein said frame-in region detecting means comprises memory means for storing attributes of specific pixels, which may include other background and frame pixels, passed during tracing to the certain background pixel along the selected route as history information together with the attribute determined for the certain background pixel portion, the history information being used in attribute determination of another pixel adjacent to the certain background pixel portion.

14. The apparatus according to claim 13, wherein, when another background pixel portion is produced next to the certain background pixel portion so as to sandwich a frame pixel portion therebetween in the hierarchical structure, said frame-in region detecting means shifts the stored contents of said memory means in a selected direction in said memory means to detect an attribute appearing in a specific memory address of said memory means and assigns the attribute as an attribute of the produced background pixel portion.

15. The apparatus according to claim 14, wherein said memory means includes a stack memory.

* * * * *